United States Patent
Ware et al.

(10) Patent No.: US 10,223,299 B2
(45) Date of Patent: Mar. 5, 2019

(54) HIGH CAPACITY MEMORY SYSTEM WITH IMPROVED COMMAND-ADDRESS AND CHIP-SELECT SIGNALING MODE

(71) Applicant: RAMBUS INC., Sunnyvale, CA (US)

(72) Inventors: Frederick A. Ware, Los Altos Hills, CA (US); Abhijit Abhyankar, Sunnyvale, CA (US); Suresh Rajan, Fremont, CA (US)

(73) Assignee: Rambus Inc., Sunnyvale, CA (US)

( * ) Notice: Subject to any disclaimer, the term of this patent is extended or adjusted under 35 U.S.C. 154(b) by 230 days.

(21) Appl. No.: 15/101,870

(22) PCT Filed: Dec. 18, 2014

(86) PCT No.: PCT/US2014/071311
§ 371 (c)(1),
(2) Date: Jun. 3, 2016

(87) PCT Pub. No.: WO2015/095612
PCT Pub. Date: Jun. 25, 2015

(65) Prior Publication Data
US 2016/0314085 A1     Oct. 27, 2016

Related U.S. Application Data

(60) Provisional application No. 61/917,742, filed on Dec. 18, 2013, provisional application No. 61/986,054, filed on Apr. 29, 2014.

(51) Int. Cl.
*G06F 13/16*     (2006.01)
*G06F 11/20*     (2006.01)
(Continued)

(52) U.S. Cl.
CPC .......... *G06F 13/1673* (2013.01); *G06F 13/00* (2013.01); *G06F 13/4243* (2013.01)

(58) Field of Classification Search
None
See application file for complete search history.

(56) References Cited

U.S. PATENT DOCUMENTS

| | | |
|---|---|---|
| 6,742,098 B1 | 5/2004 | Halbert et al. |
| 9,727,409 B2 * | 8/2017 | Shin .................. G06F 11/0793 |

(Continued)

OTHER PUBLICATIONS

Notification Concerning Transmittal of International Preliminary Report on Patentability dated Jun. 30, 2016 re: Int'l Appln. No. PCT/US14/071311. 9 Pages.

(Continued)

*Primary Examiner* — Hyun Nam
(74) *Attorney, Agent, or Firm* — Lowenstein Sandler LLP

(57) ABSTRACT

A memory controller and buffers on memory modules each operate in two modes, depending on the type of motherboard through which the controller and modules are connected. In a first mode, the controller transmits decoded chip-select signals independently to each module, and the motherboard data channel uses multi-drop connections to each module. In a second mode, the motherboard has point-to-point data channel and command address connections to each of the memory modules, and the controller transmits a fully encoded chip-select signal group to each module. The buffers operate modally to correctly select ranks or partial ranks of memory devices on one or more modules for each transaction, depending on the mode.

19 Claims, 60 Drawing Sheets

(51) Int. Cl.
*G06F 13/00* (2006.01)
*G06F 13/42* (2006.01)

(56) References Cited

U.S. PATENT DOCUMENTS

| | | |
|---|---|---|
| 2005/0071600 A1 | 3/2005 | Bungo |
| 2005/0108463 A1 | 5/2005 | Hargis et al. |
| 2008/0031072 A1 | 2/2008 | Rajan et al. |
| 2008/0080261 A1* | 4/2008 | Shaeffer .................. G11C 5/025 |
| | | 365/189.05 |
| 2010/0262790 A1 | 10/2010 | Perego et al. |
| 2012/0117338 A1 | 5/2012 | Vaidyanath et al. |
| 2012/0250264 A1 | 10/2012 | Osanai et al. |
| 2013/0194881 A1* | 8/2013 | Woo .......................... G11C 7/00 |
| | | 365/191 |
| 2013/0254495 A1 | 9/2013 | Kim et al. |
| 2015/0363258 A1* | 12/2015 | Shin .................... G06F 11/0793 |
| | | 714/3 |

OTHER PUBLICATIONS

International Search Report and Written Opinion, PCT Application No. PCT/US2014/071311 dated May 20, 2015.

\* cited by examiner

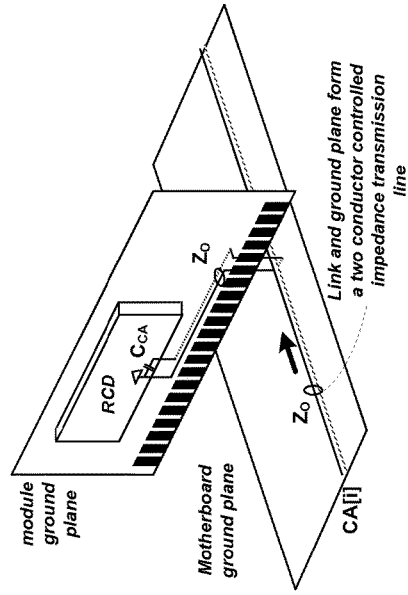
Fig. 1a - DQ and CA links – Standard topology
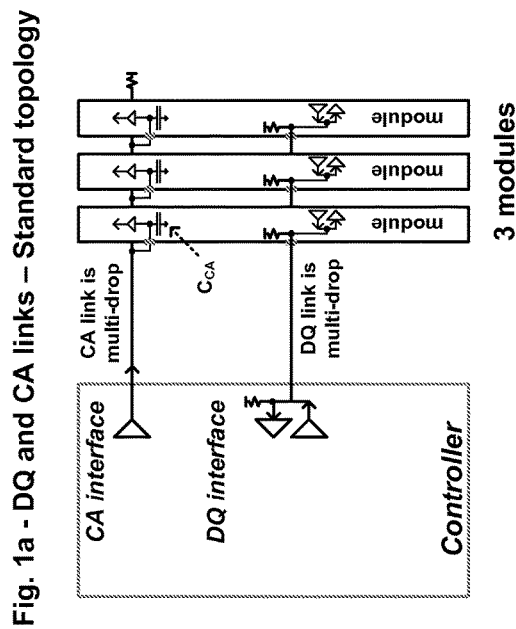
Fig. 1b - CA link detail
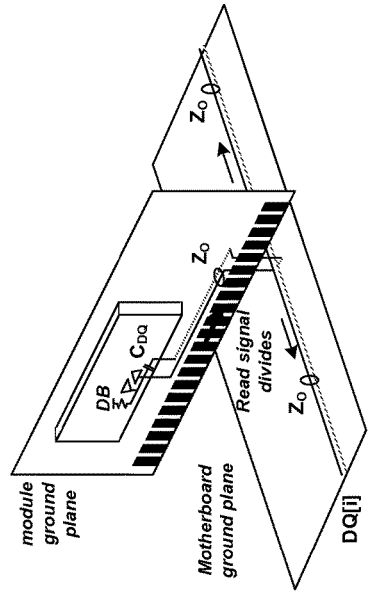
Fig. 1d - DQ link detail - read
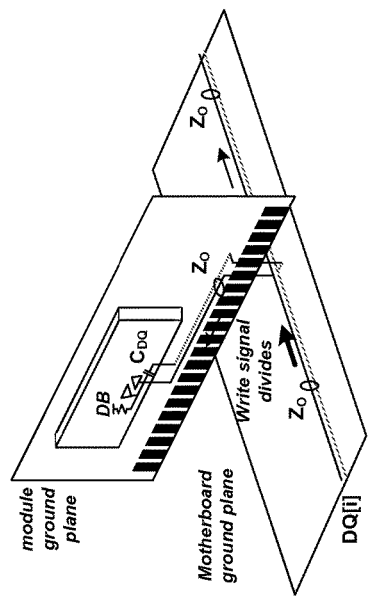
Fig. 1c - DQ link detail - write

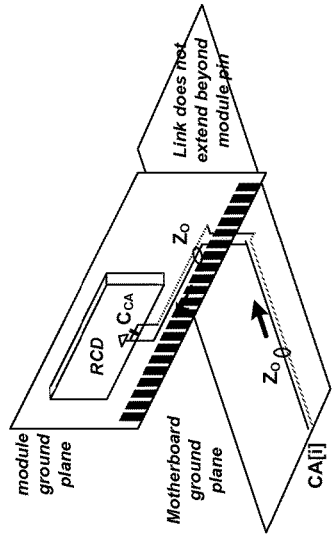
Fig. 1e - DQ and CA links – Improved topology (3 module)
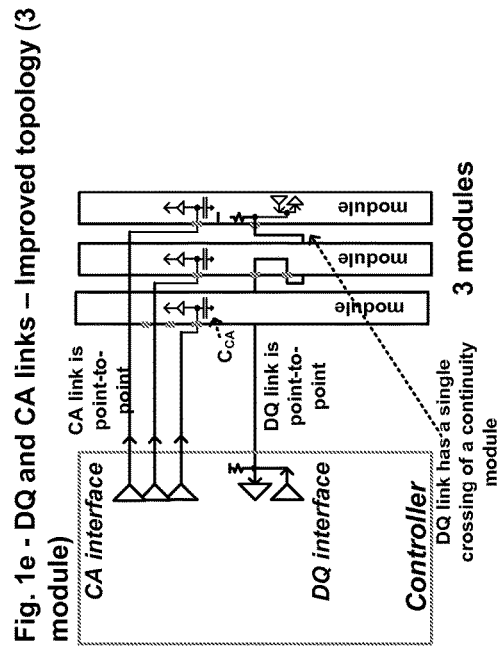
Fig. 1f - CA link detail
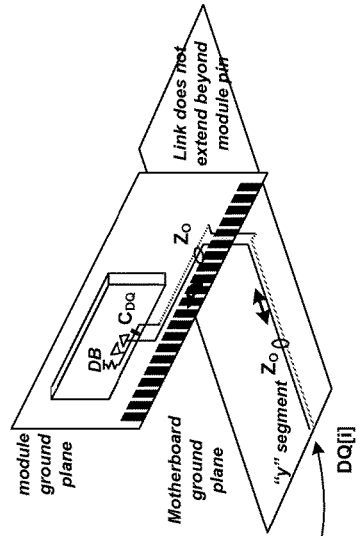
Fig. 1g - DQ link detail – continuity module
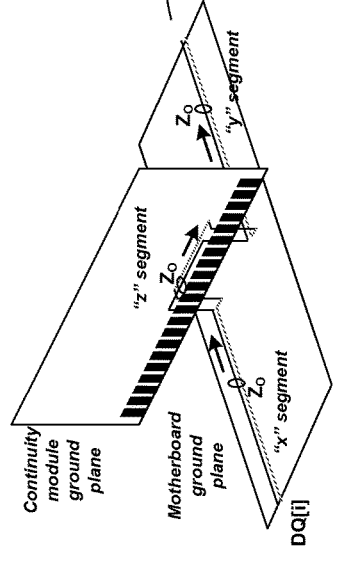
Fig. 1h - DQ link detail – read/write

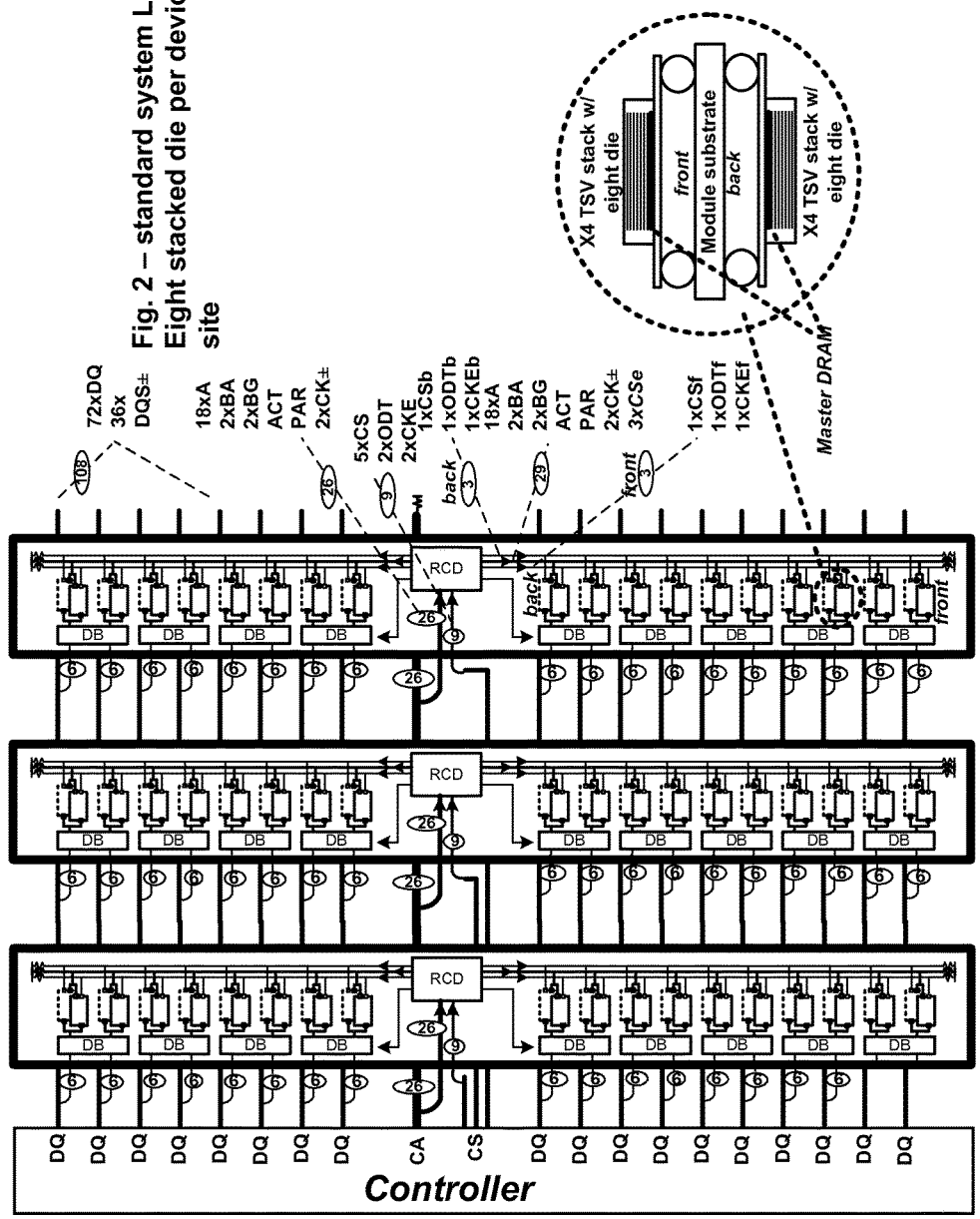
Fig. 2 – standard system L8
Eight stacked die per device site

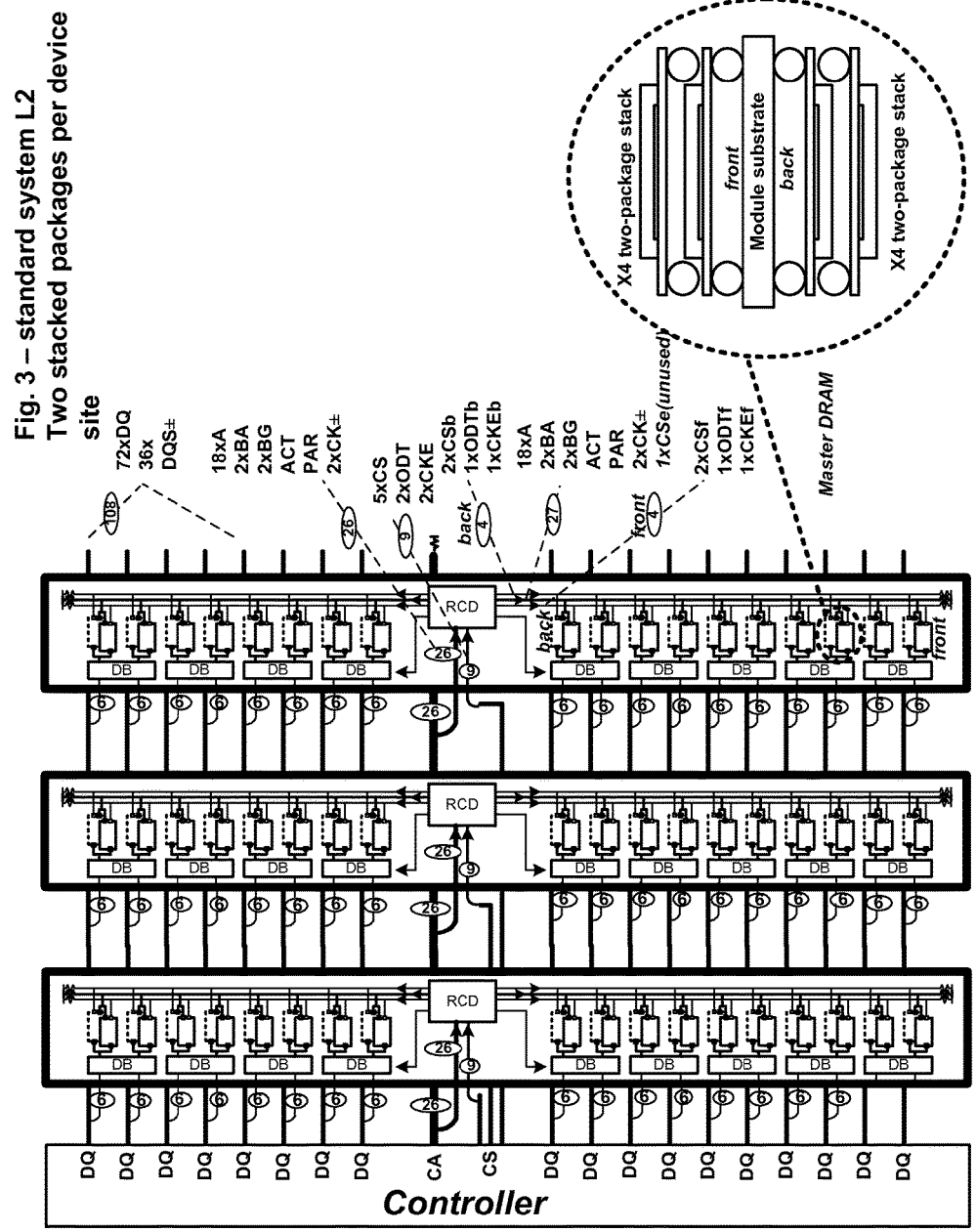
Fig. 3 – standard system L2
Two stacked packages per device site

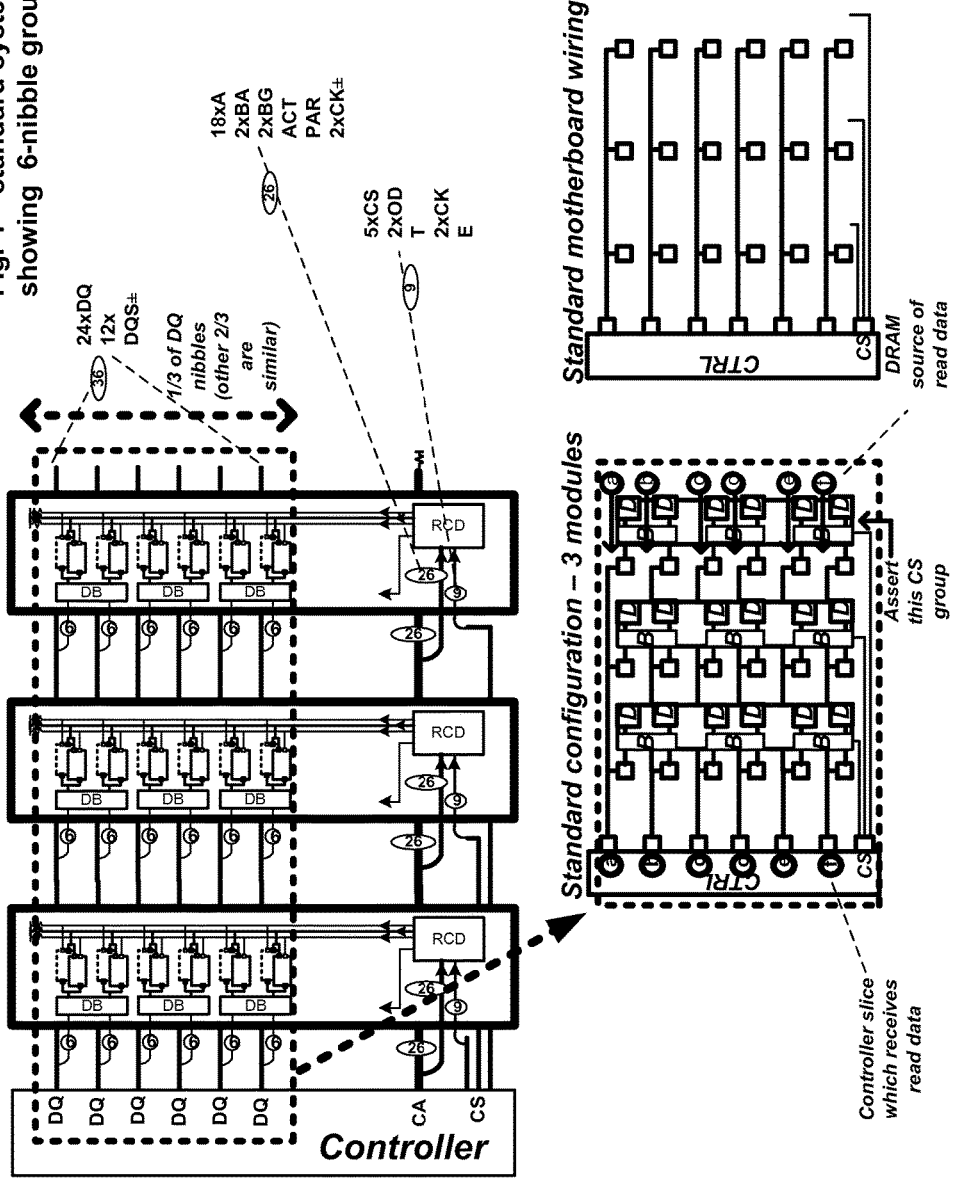

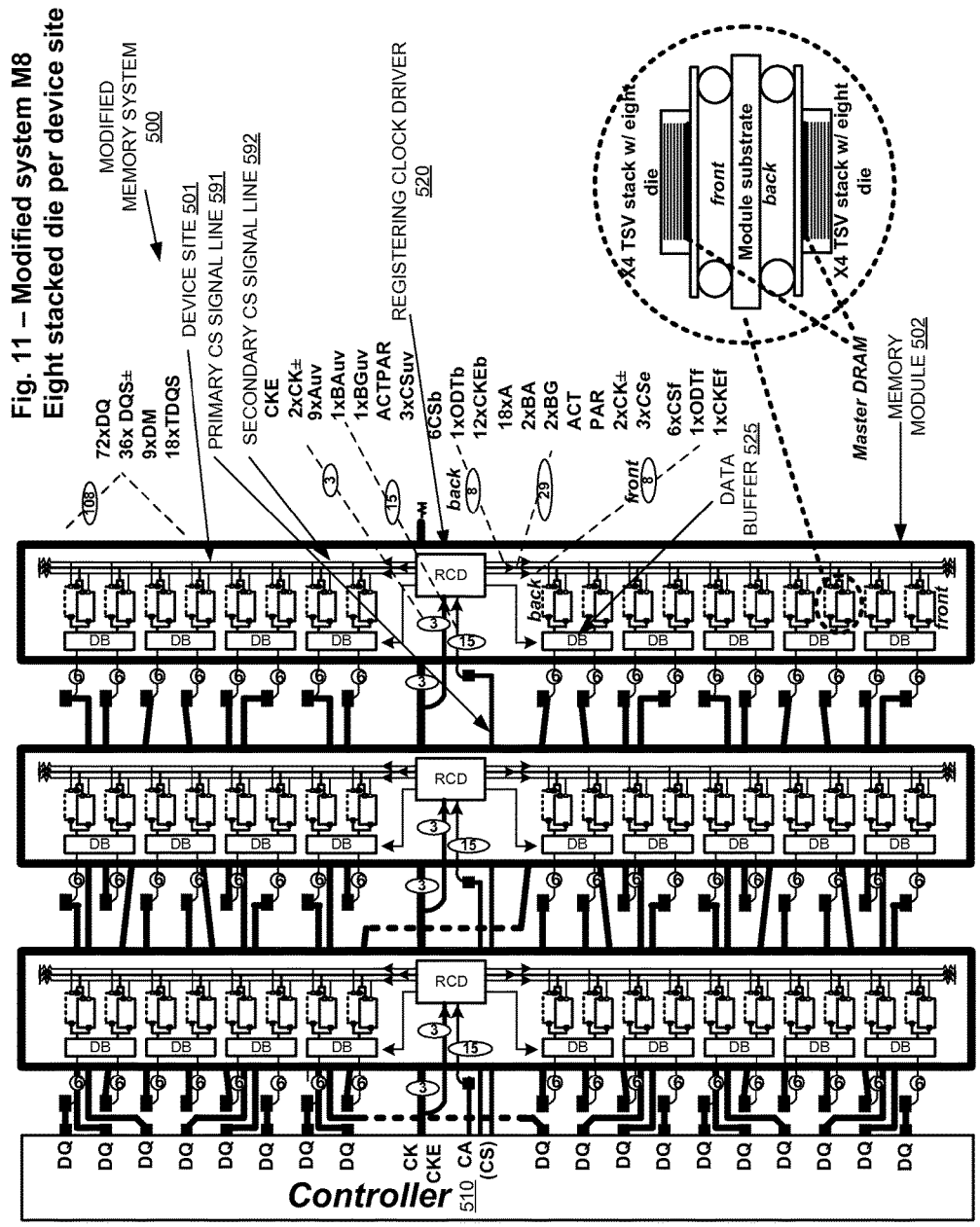
Fig. 11 – Modified system M8
Eight stacked die per device site

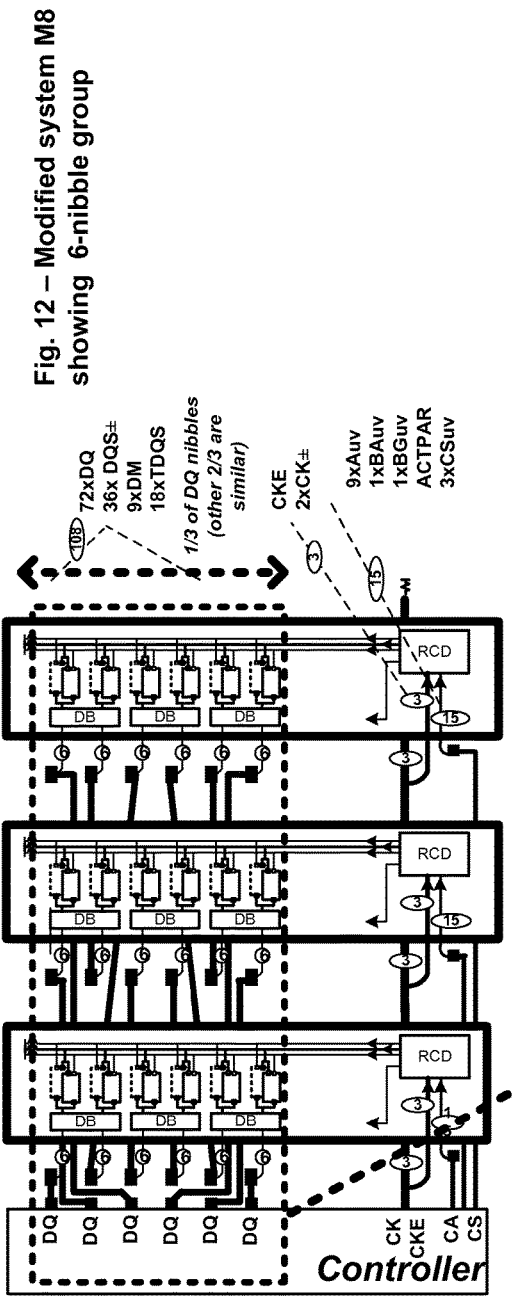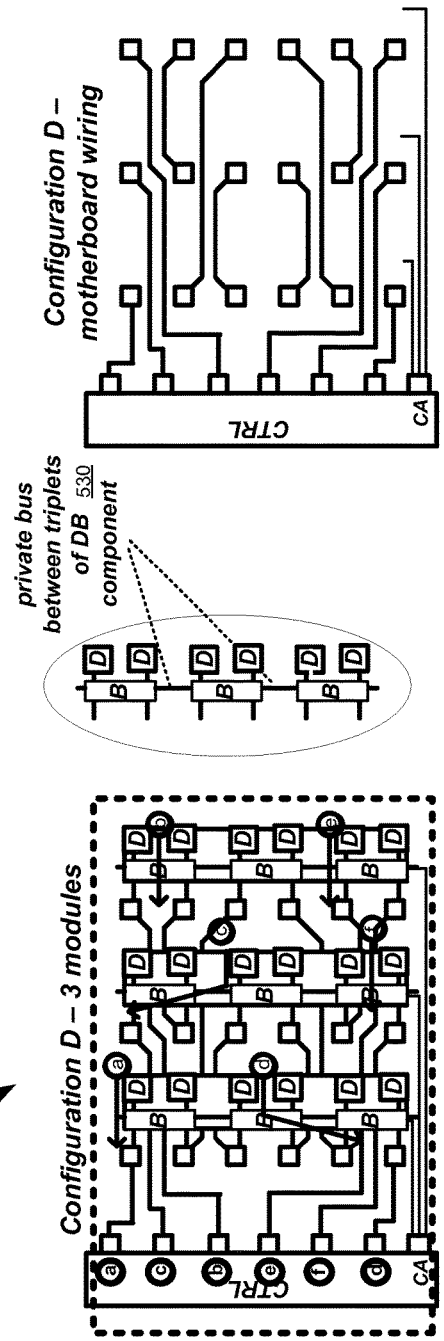
Fig. 12 – Modified system M8 showing 6-nibble group

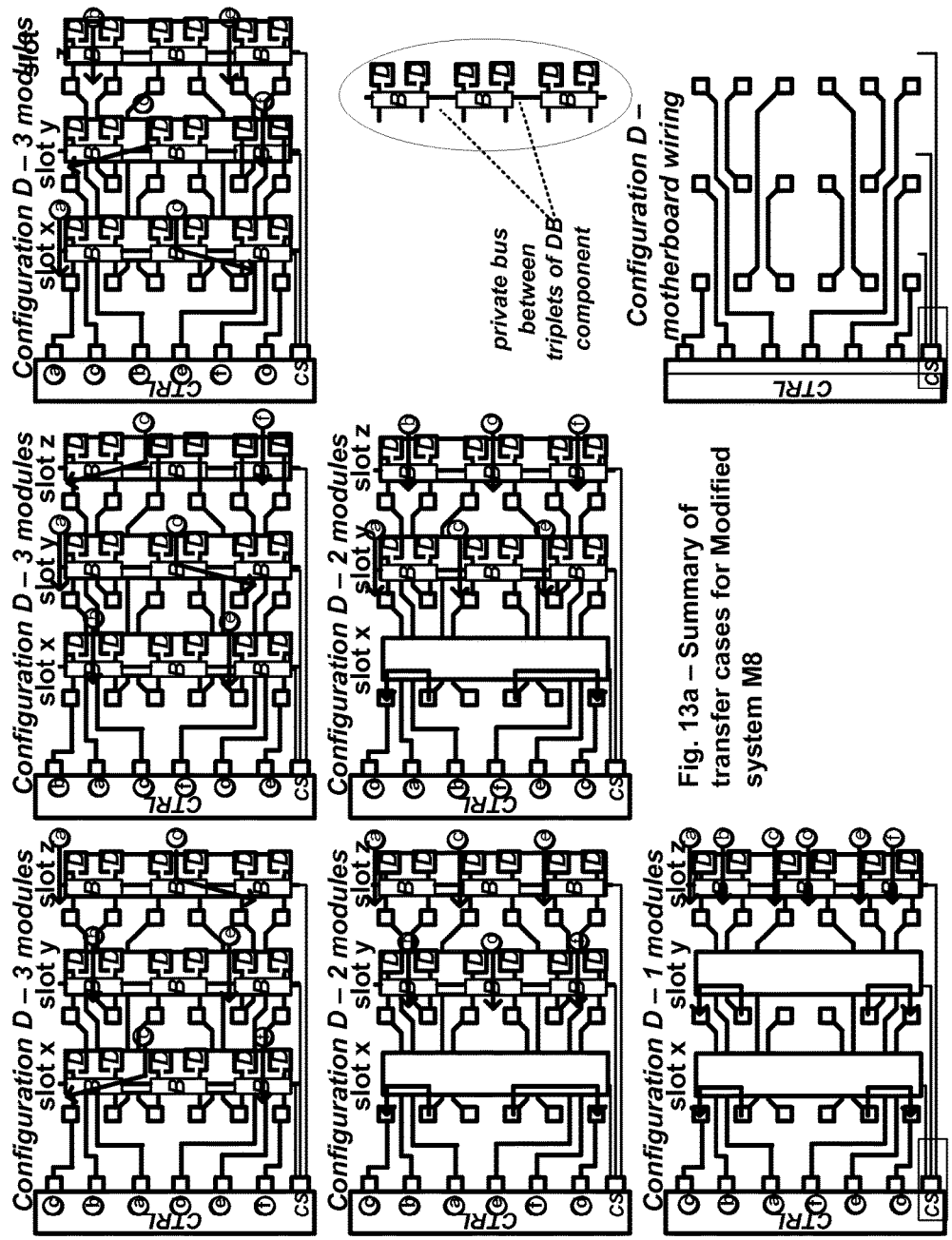

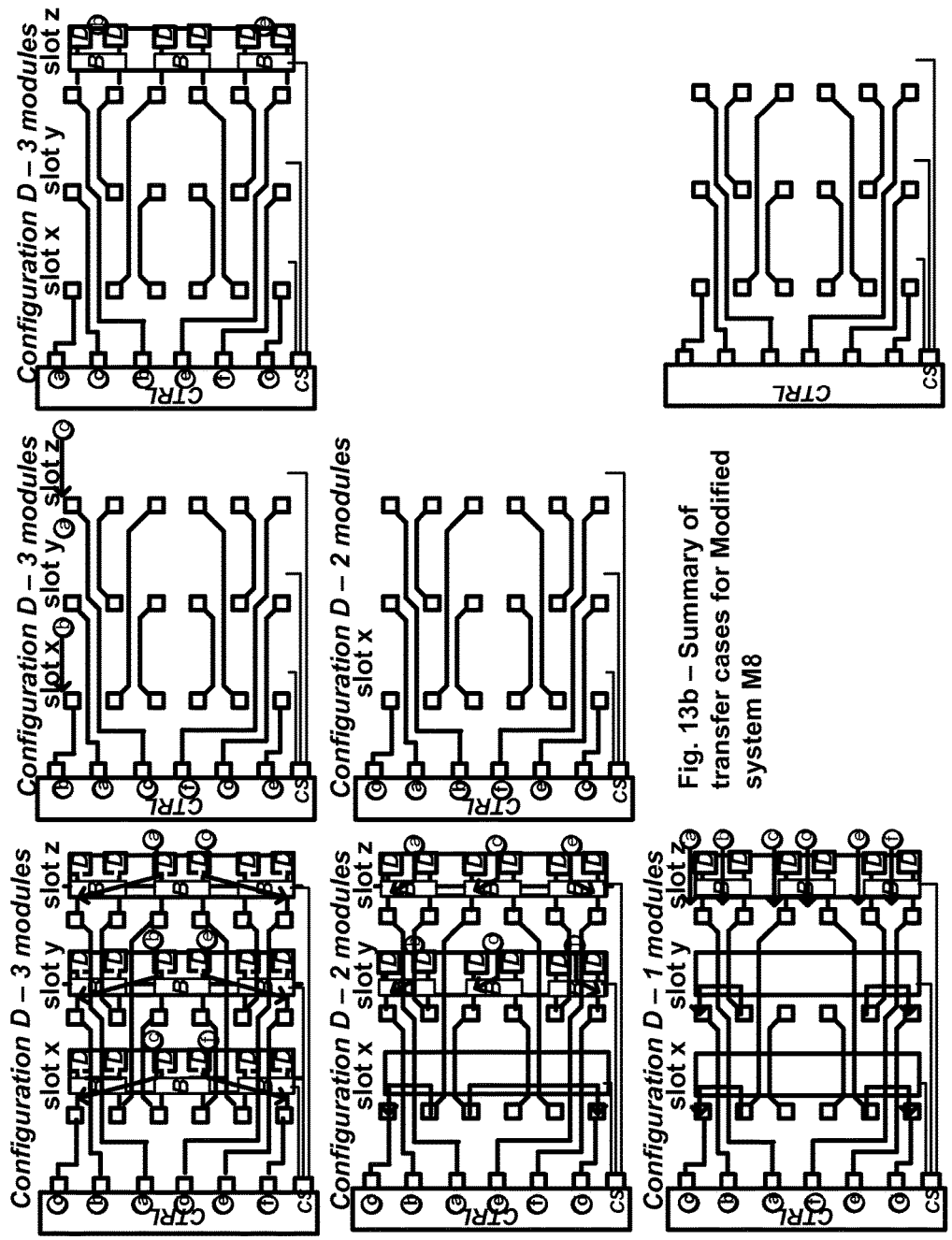
Fig. 13b – Summary of transfer cases for Modified system M8

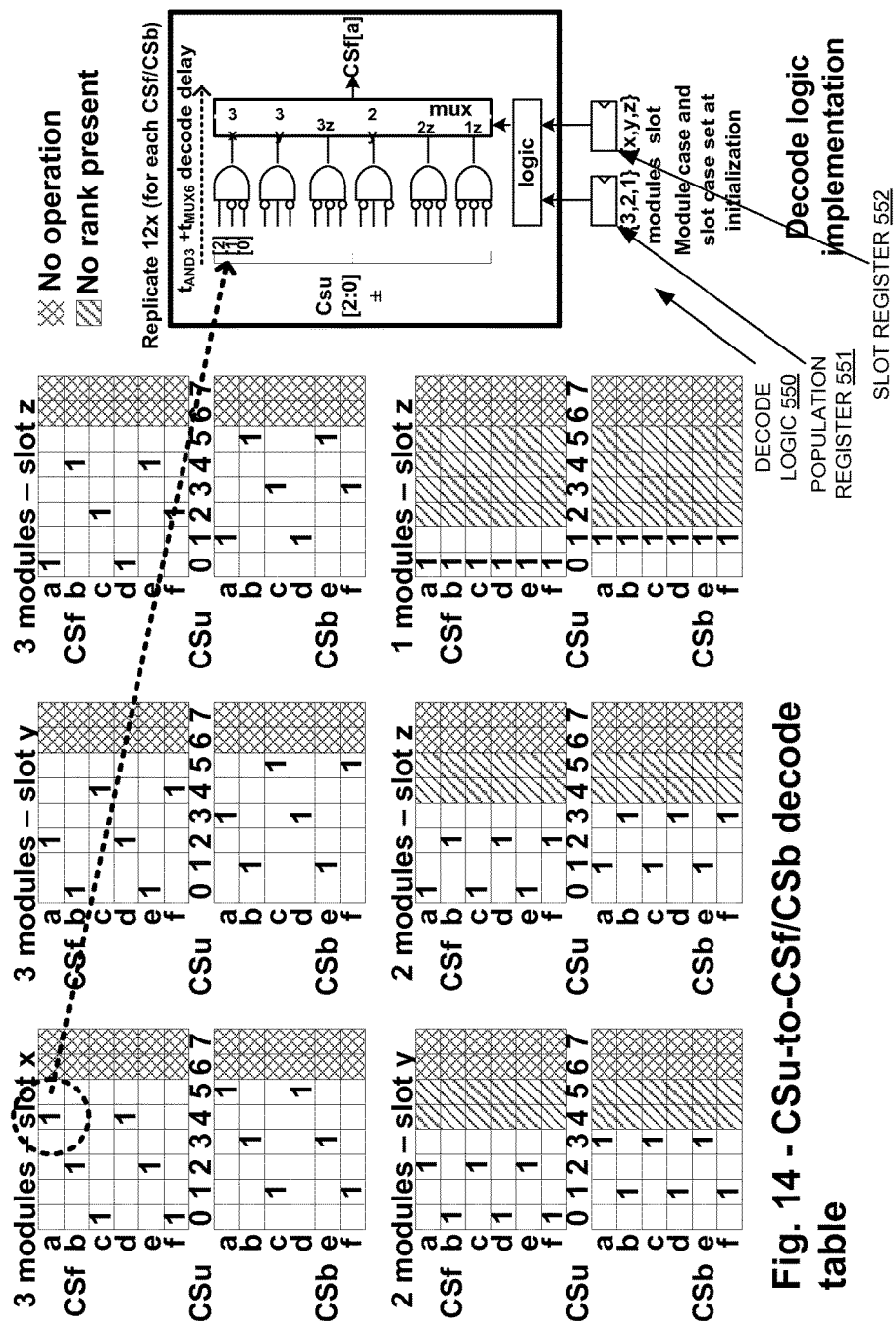
Fig. 14 - CSu-to-CSf/CSb decode table

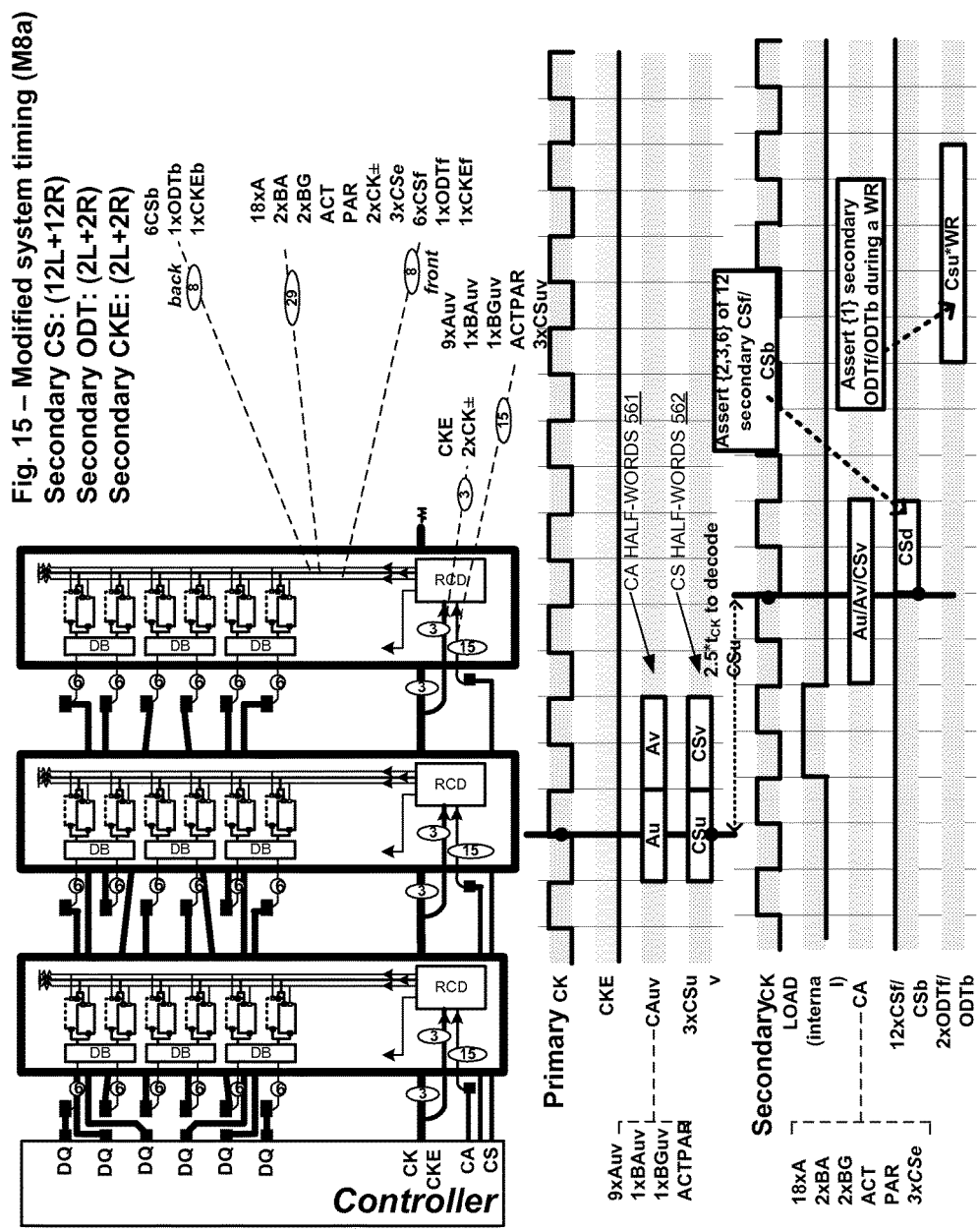

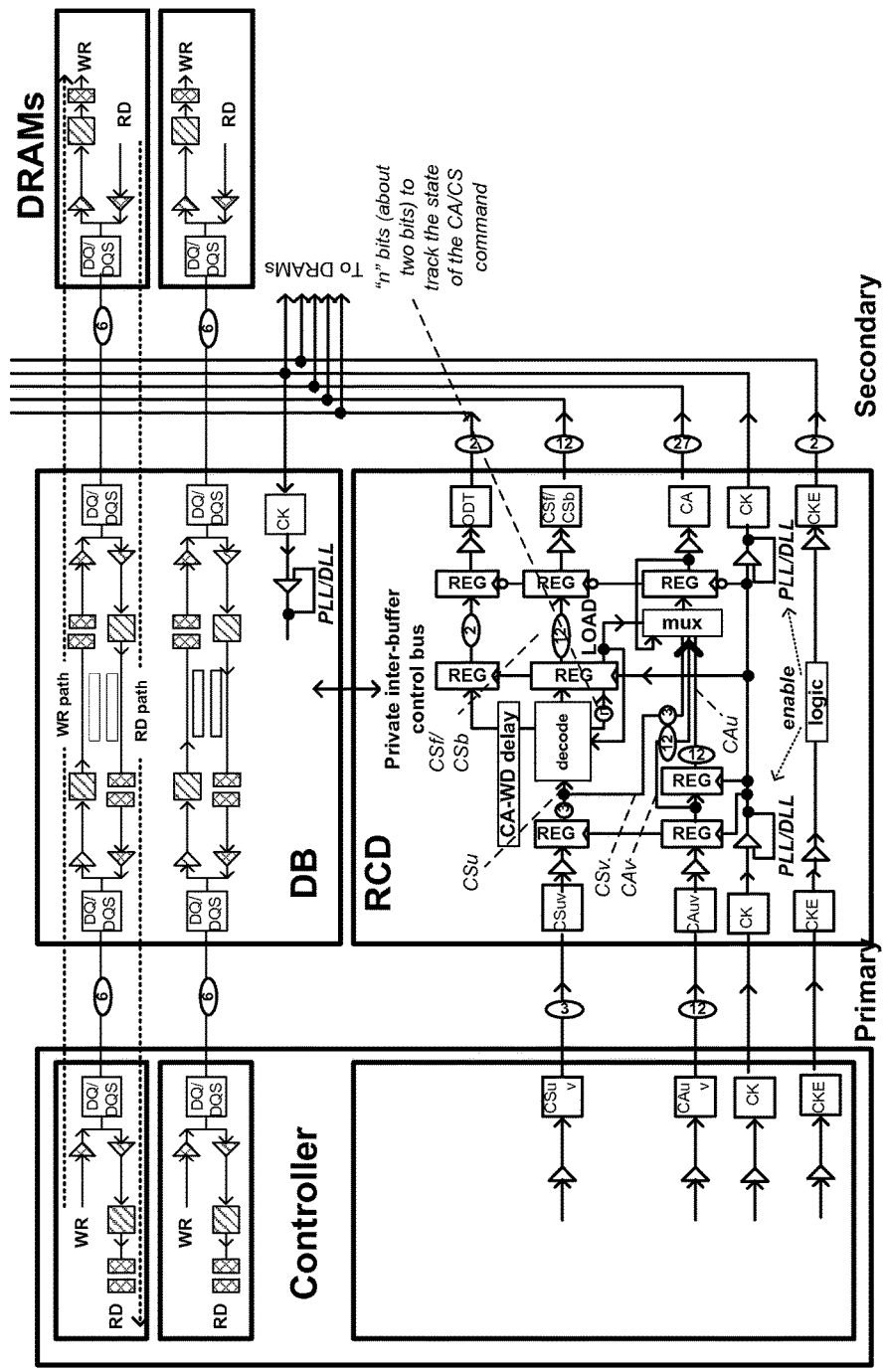
Fig. 16 – Detail for Modified system (M8a)

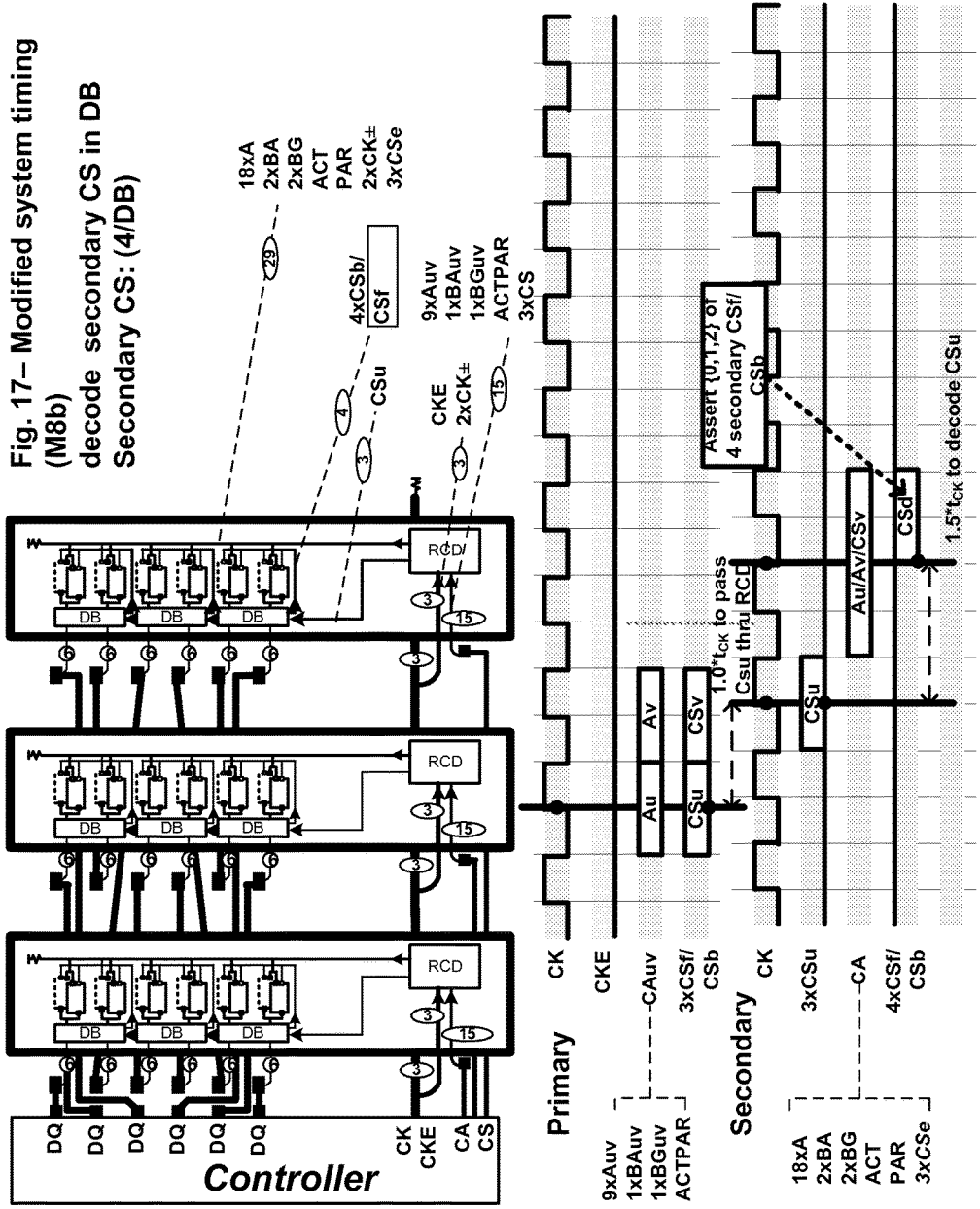

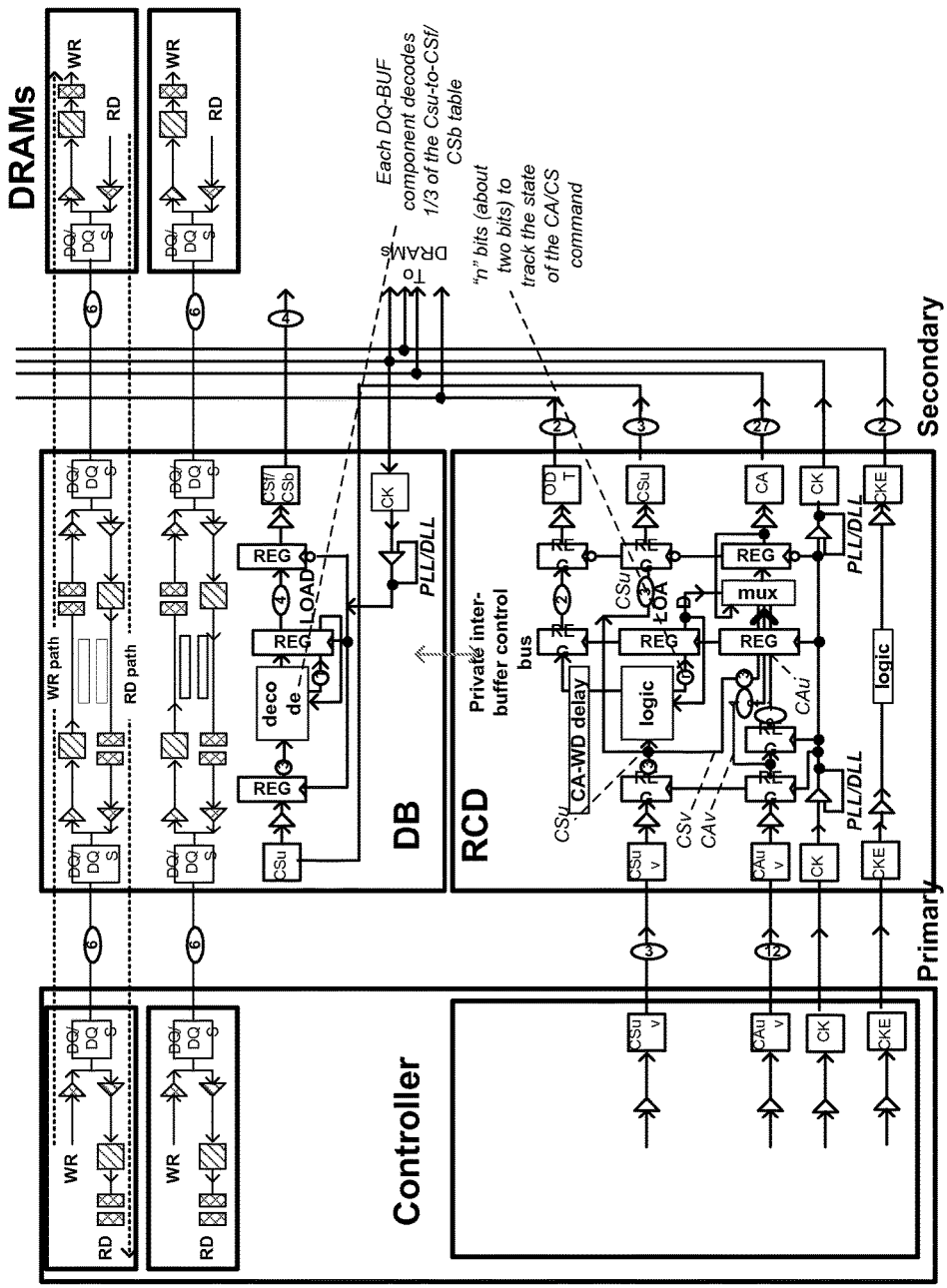
Fig. 18 – Detail for Modified system (M8b)

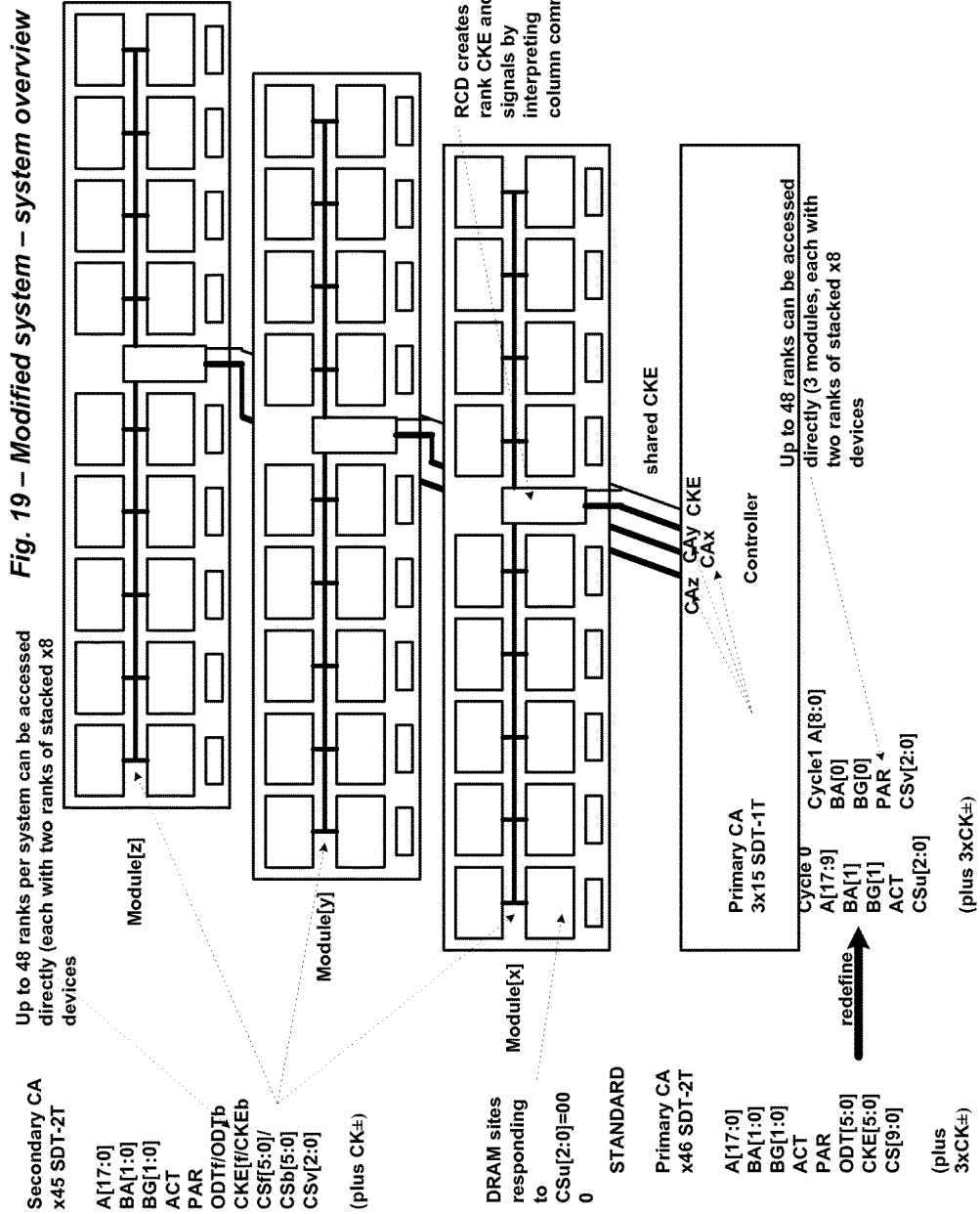
Fig. 19 – Modified system – system overview

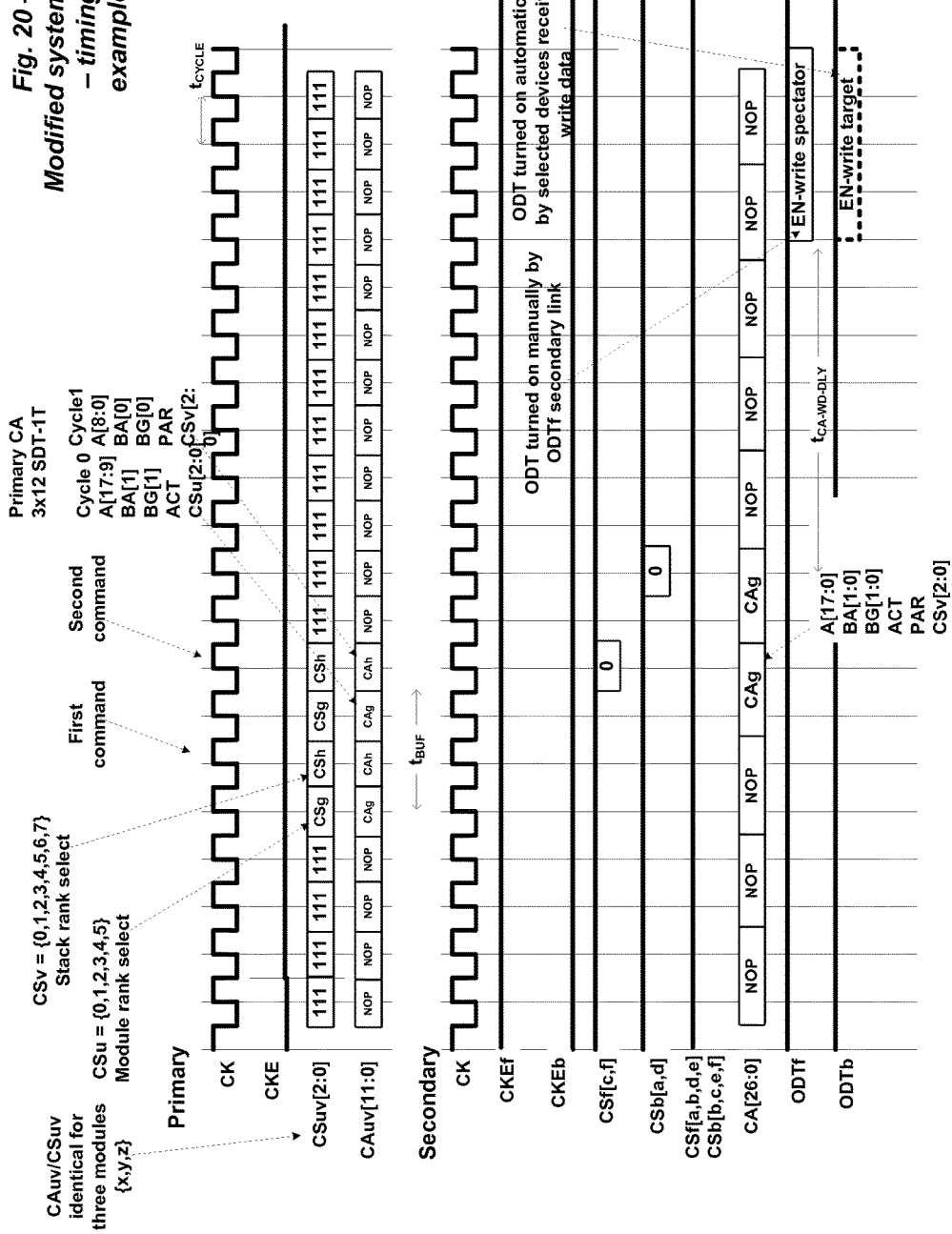
Fig. 20 – Modified system – timing example

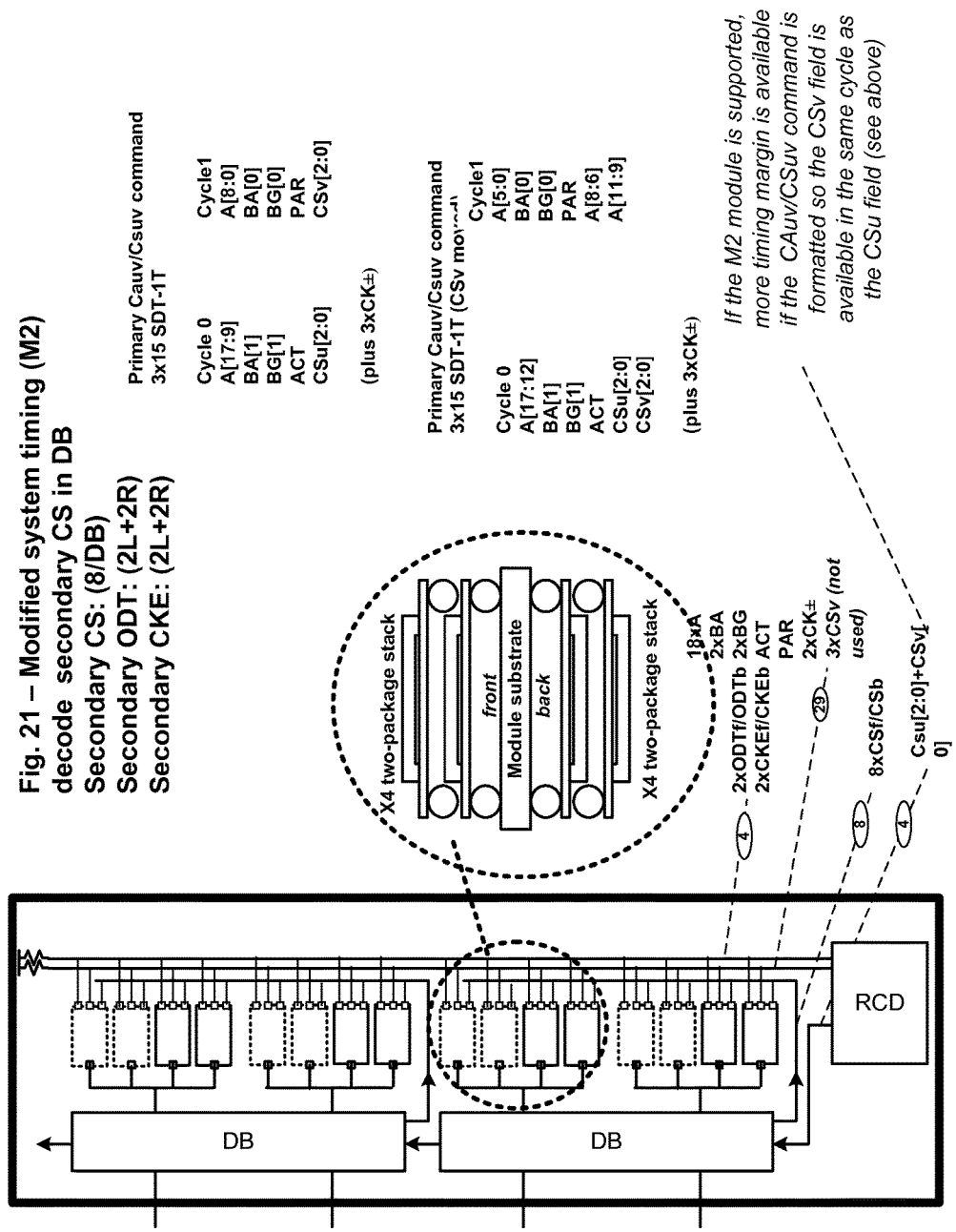

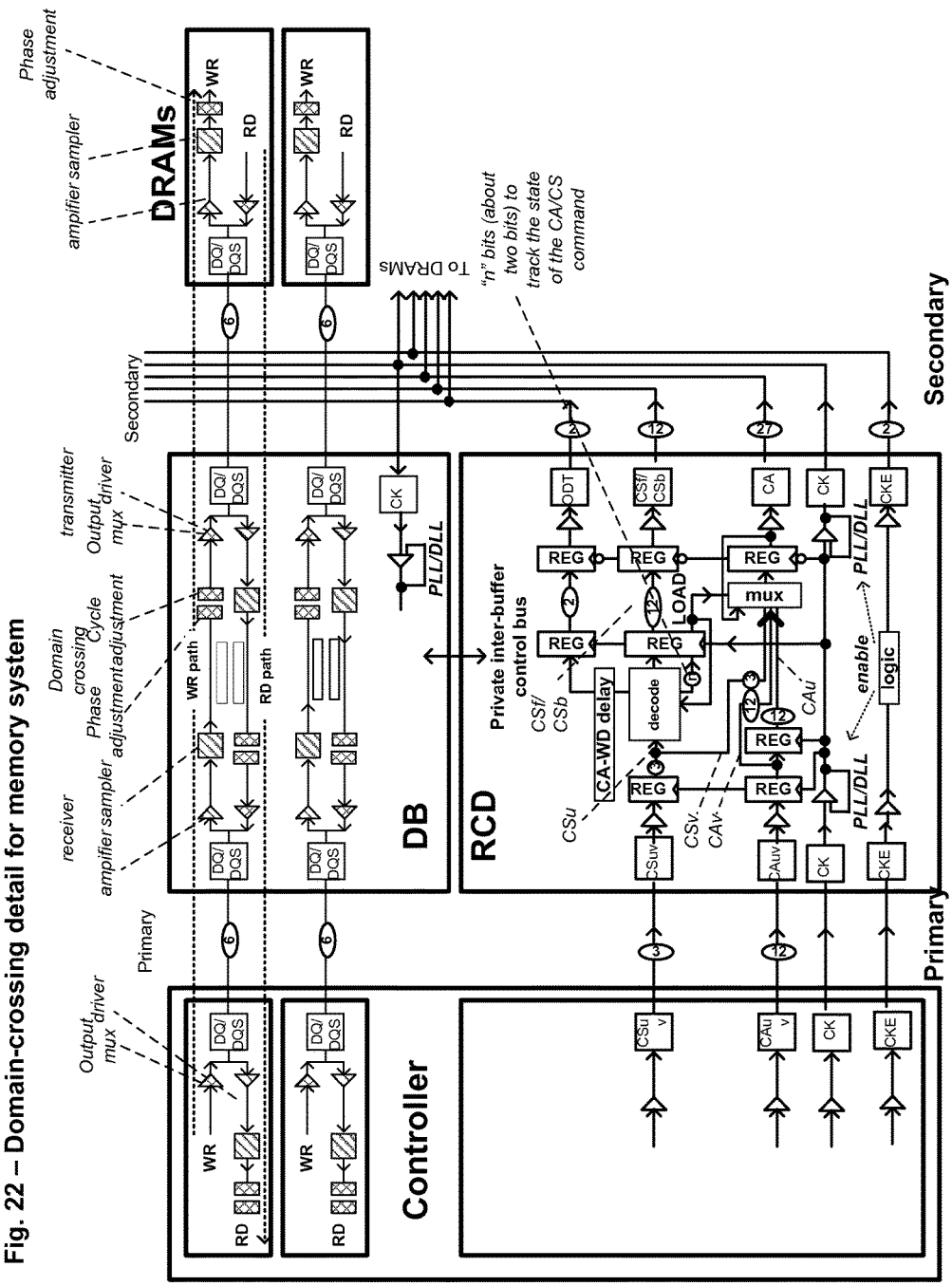
Fig. 22 – Domain-crossing detail for memory system

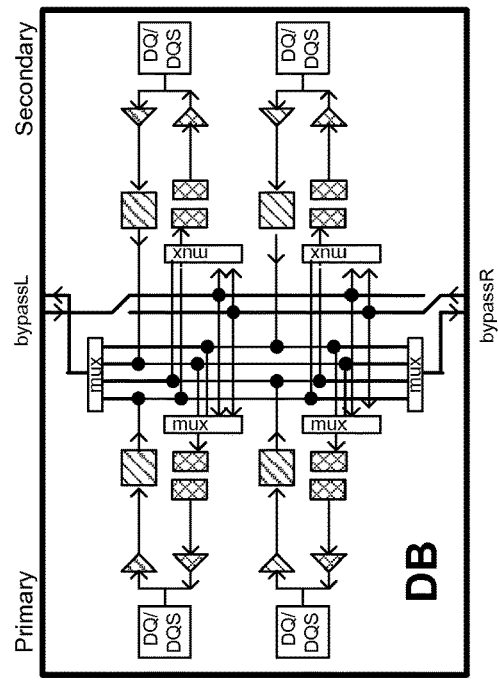
Fig. 23b – Add synchronous lateral bypass paths between DB components
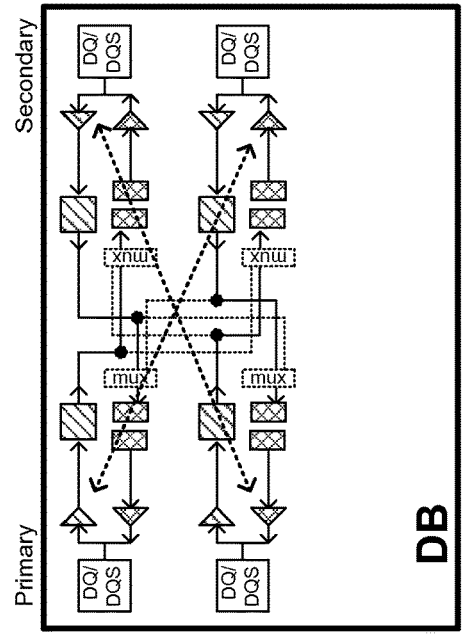
Fig 23a – Add RD/WR paths between both primary and both secondary ports

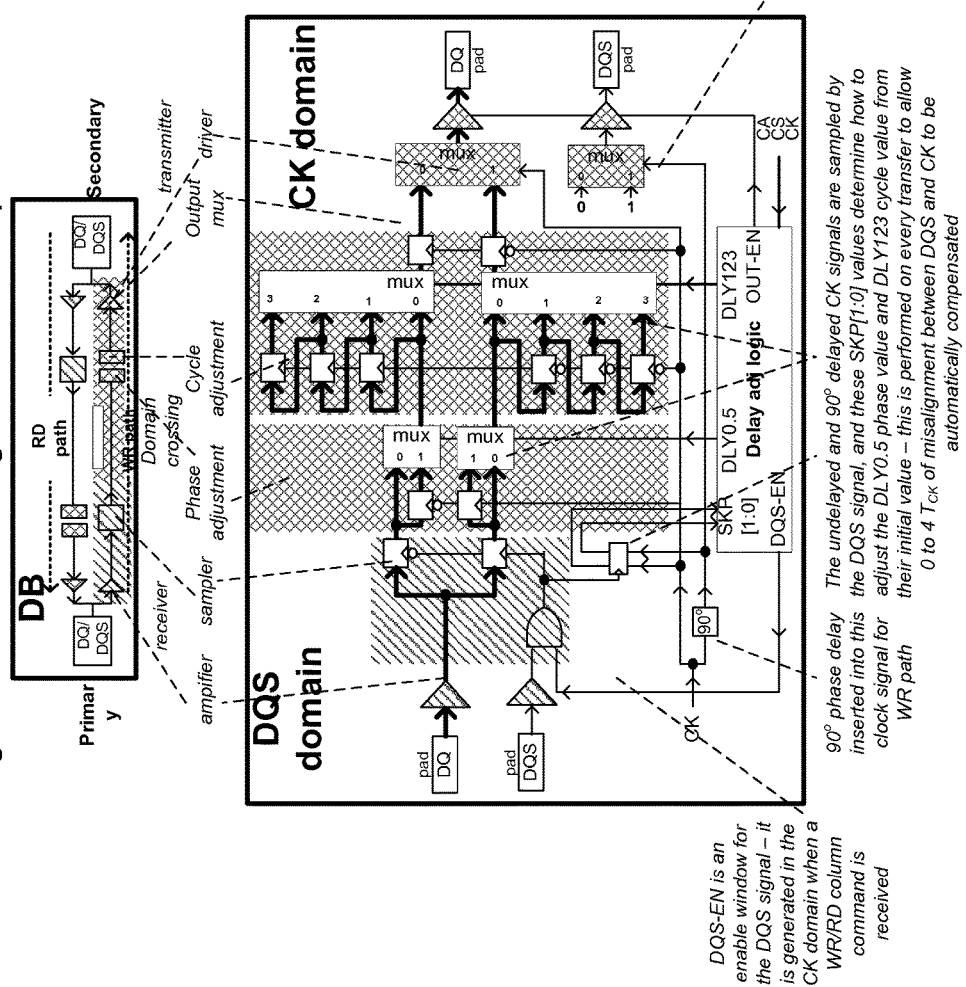
Fig. 24 – Domain-crossing detail for DB component

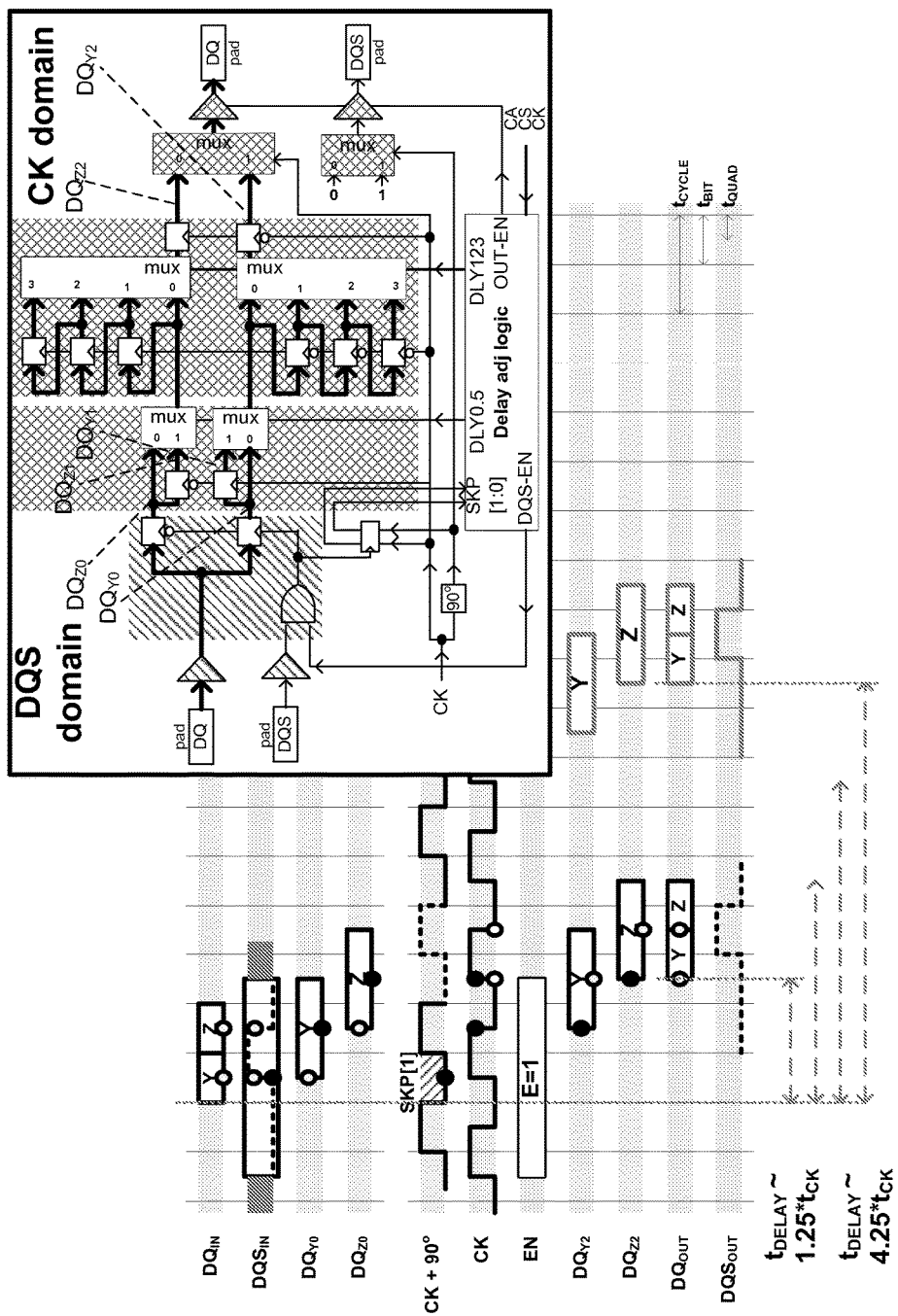
Fig. 25 – WR timing detail for DB (SKP[1]=0)

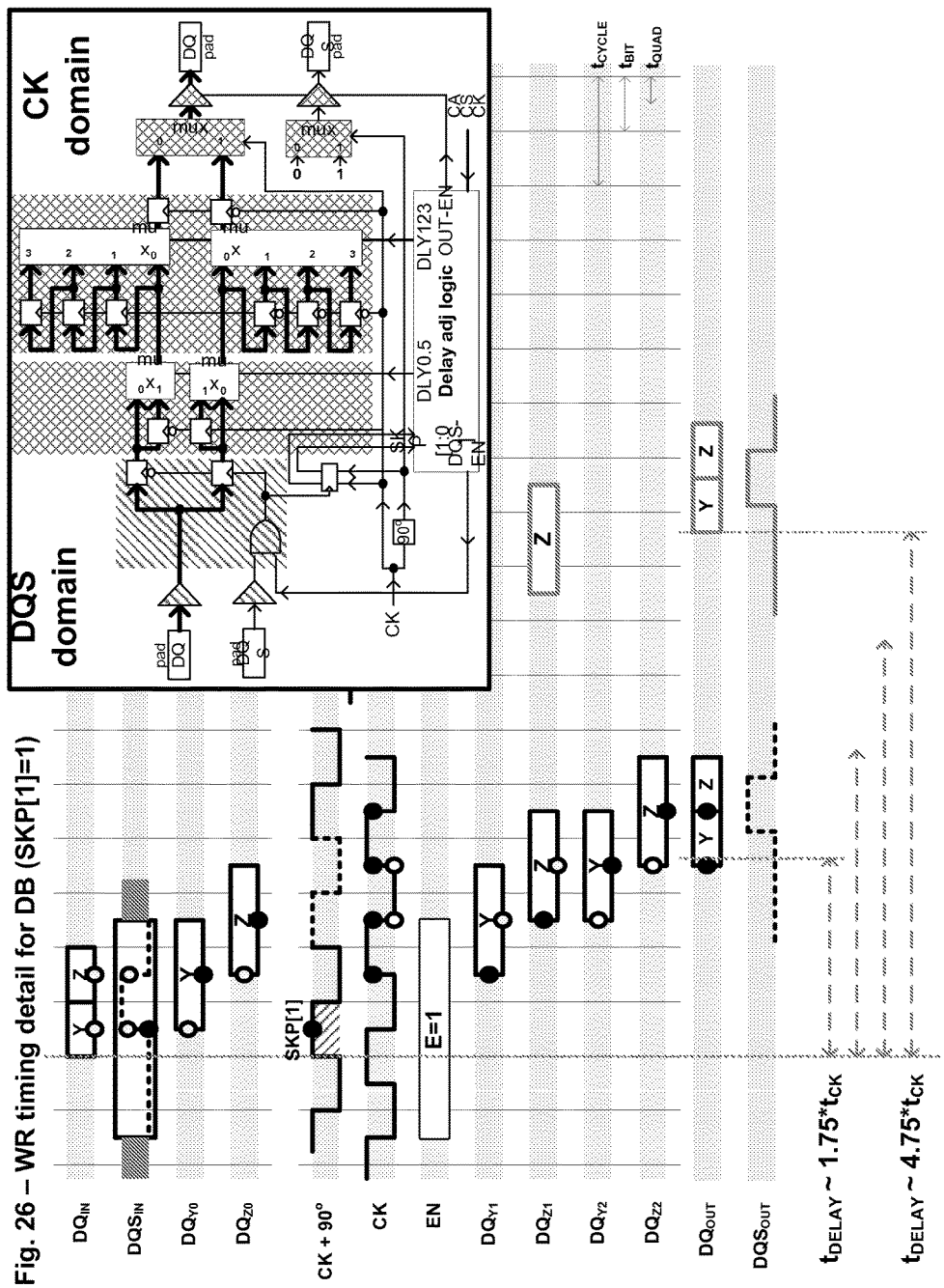

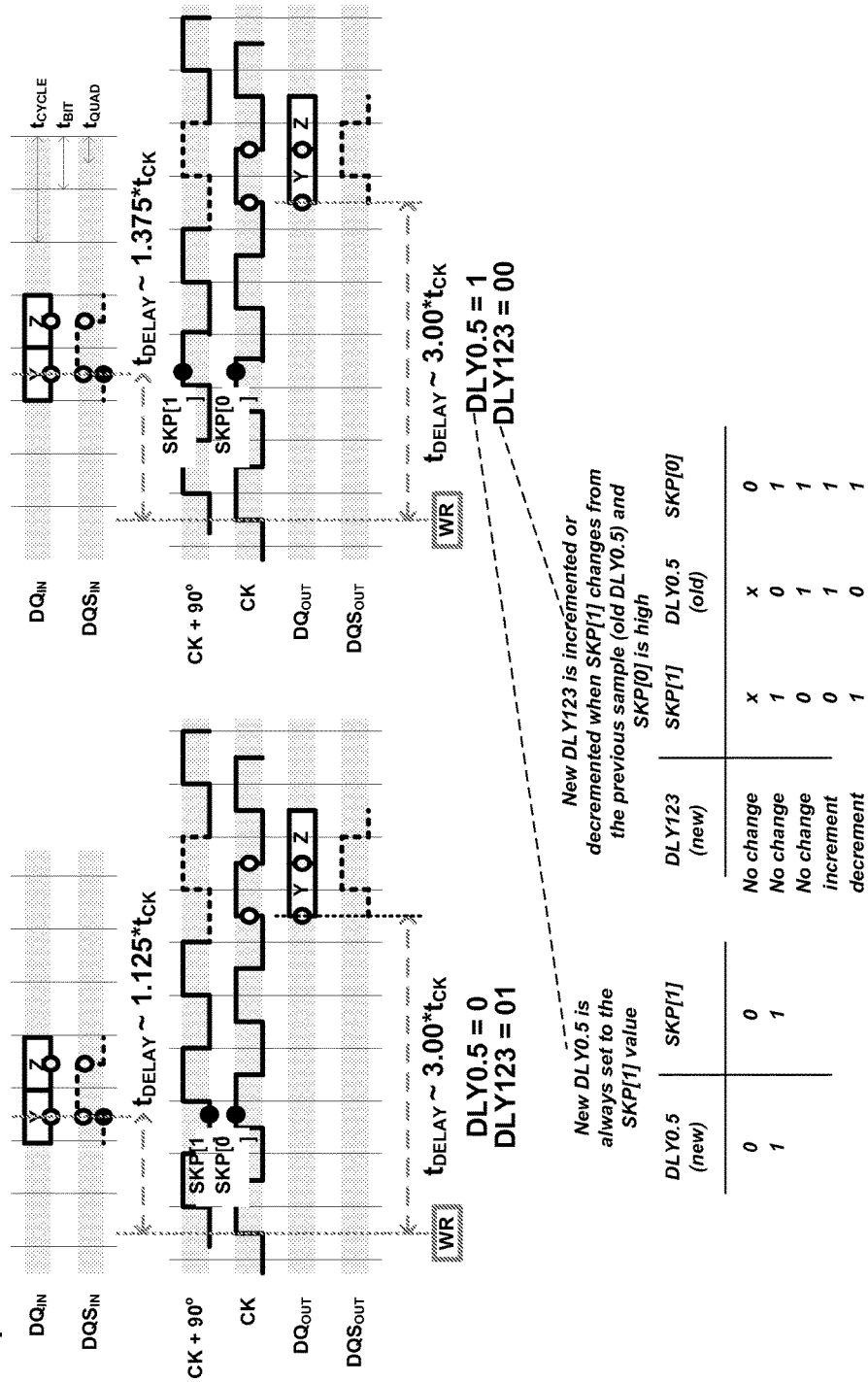
Fig. 27 – Delay adjust logic automatically tracks timing drift of DQ/DQS input

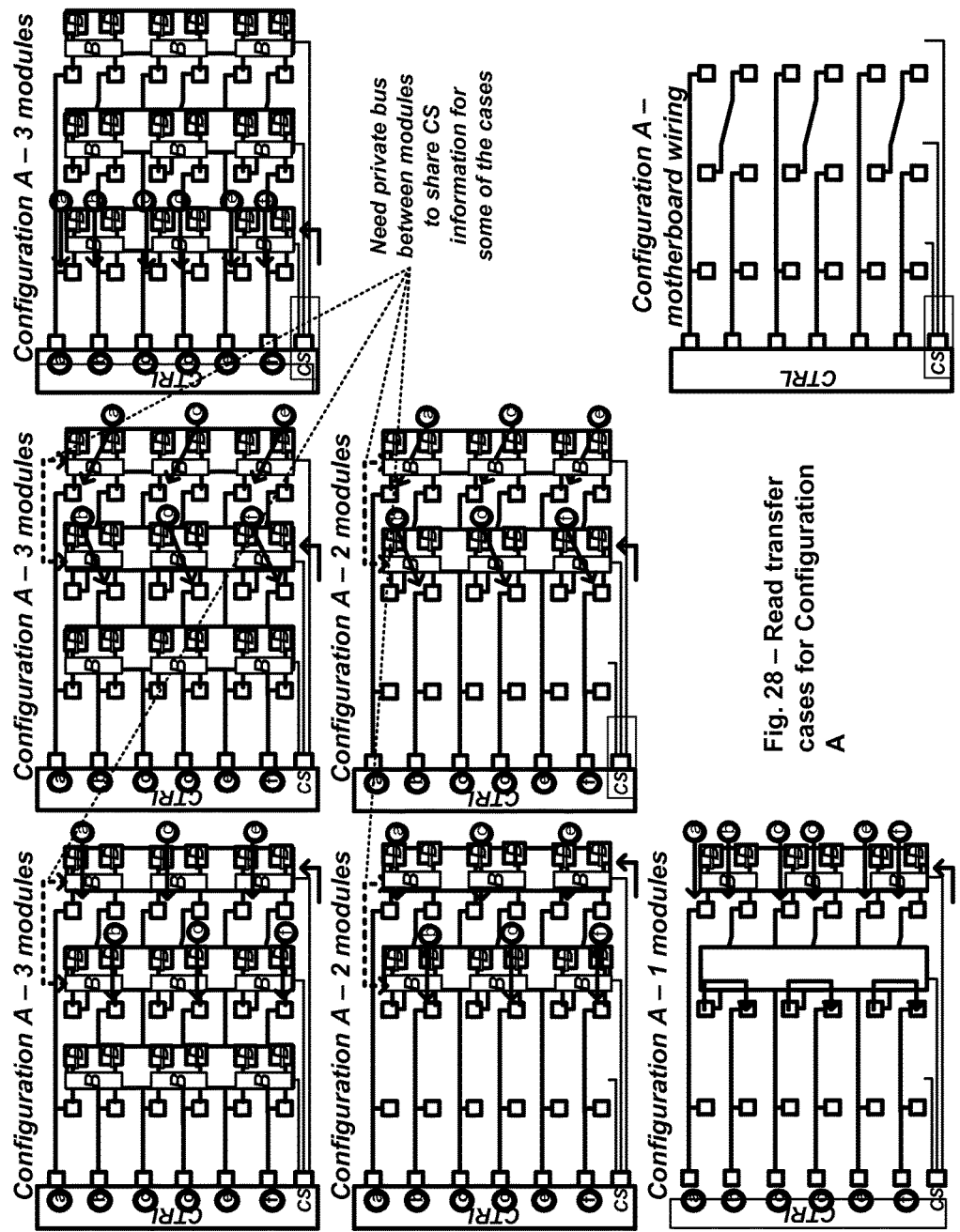
Fig. 28 – Read transfer cases for Configuration A

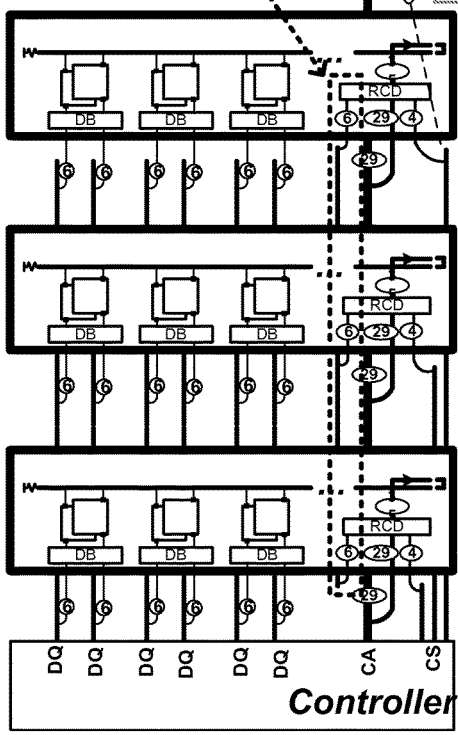
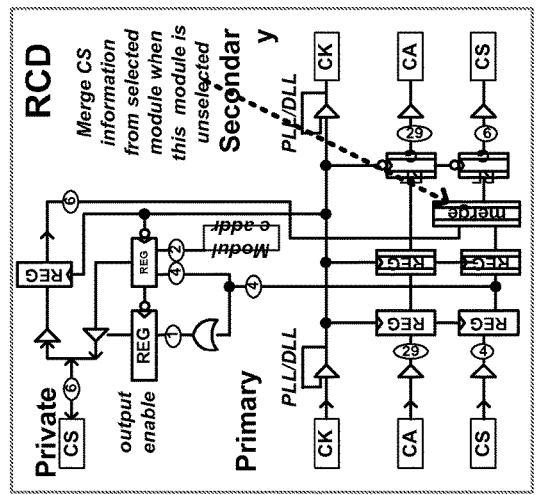
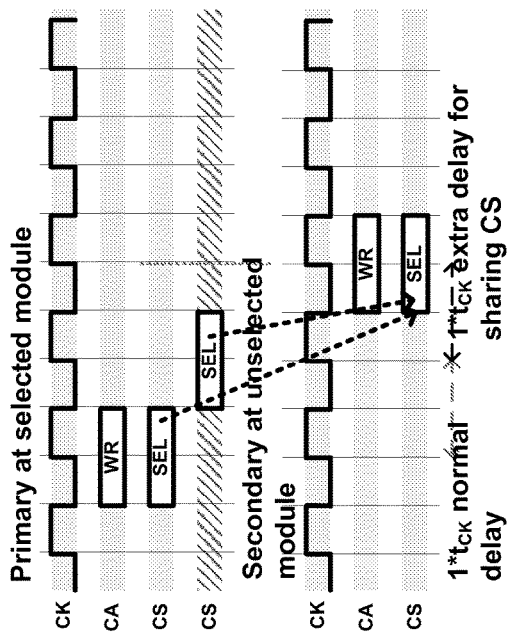
Fig. 29 – Private bus for sharing CS

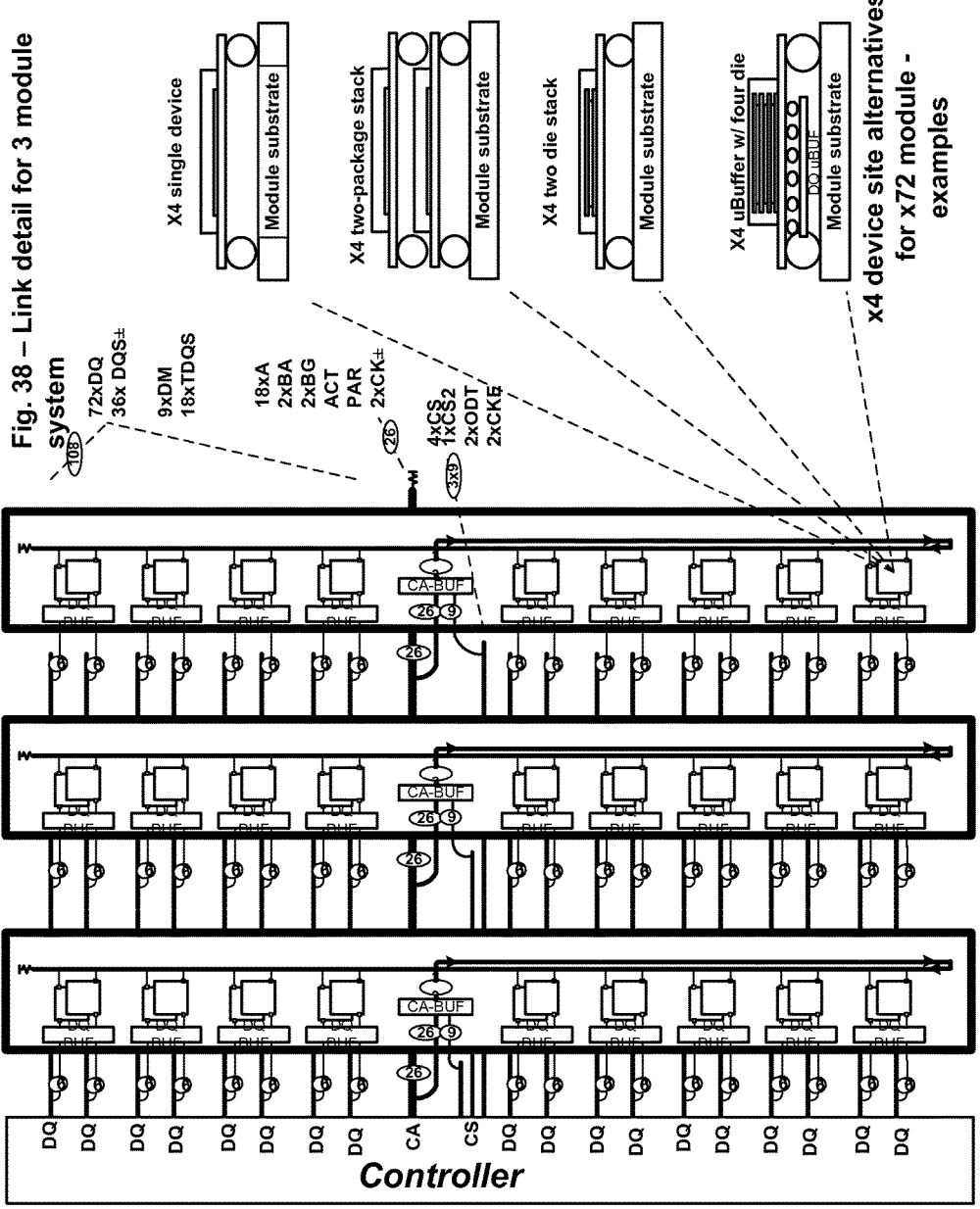
Fig. 38 – Link detail for 3 module system

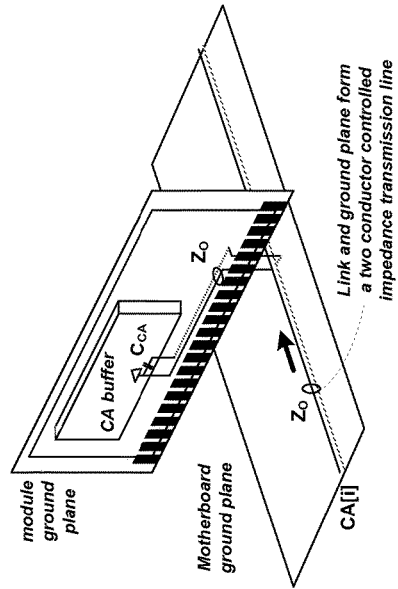
Fig. 39b - CA link detail
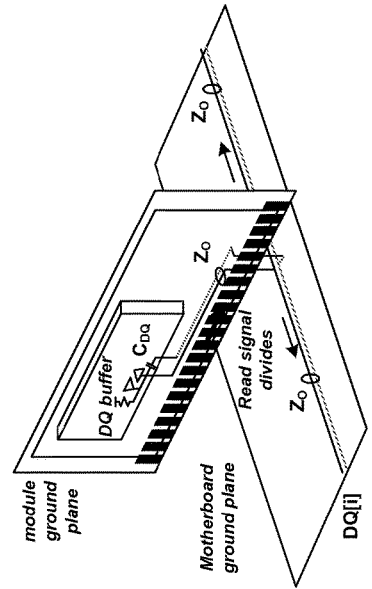
Fig. 39d - DQ link detail - read
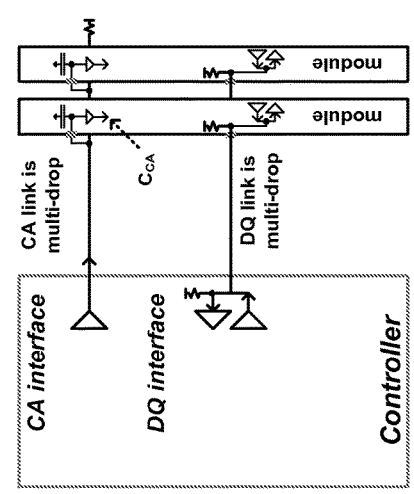
Fig. 39a - DQ and CA links – Standard topology
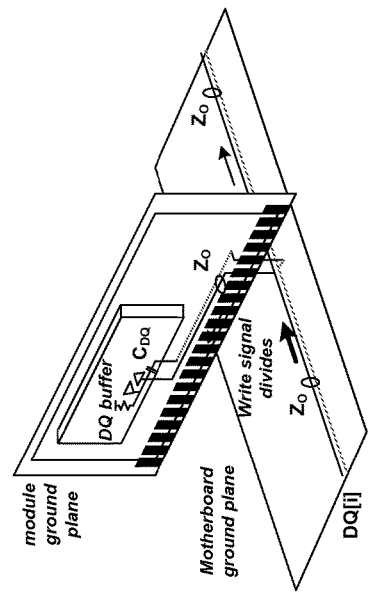
Fig. 39c - DQ link detail - write

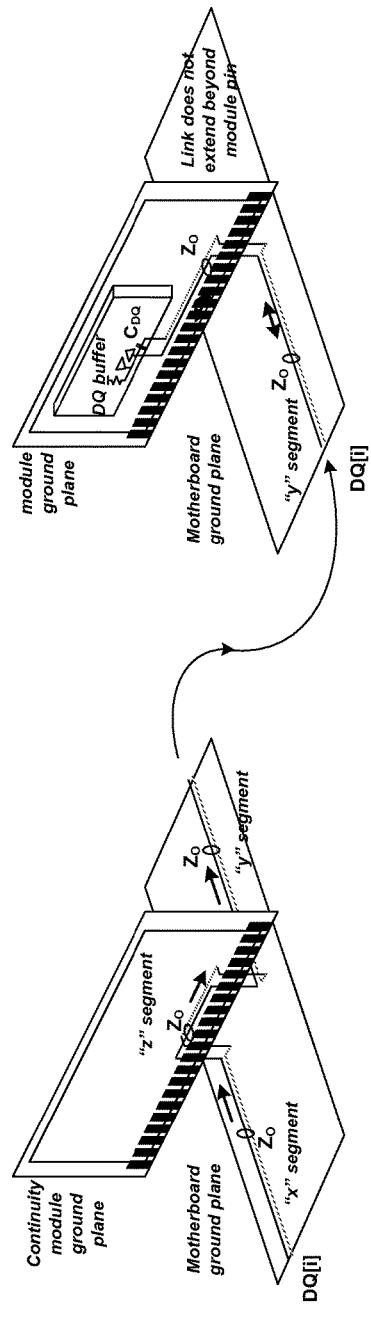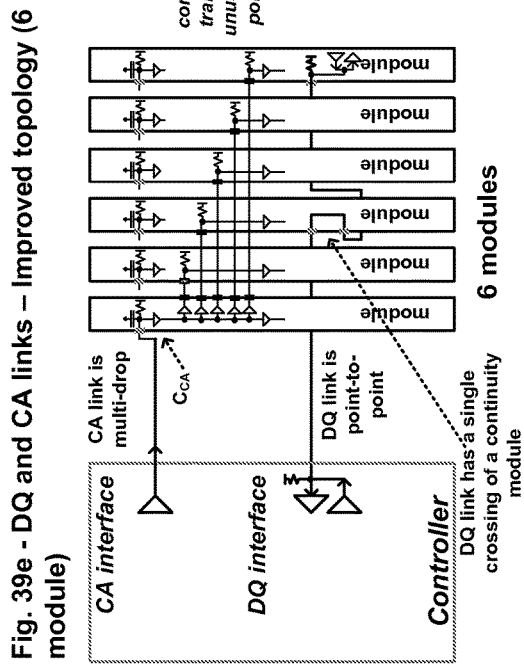

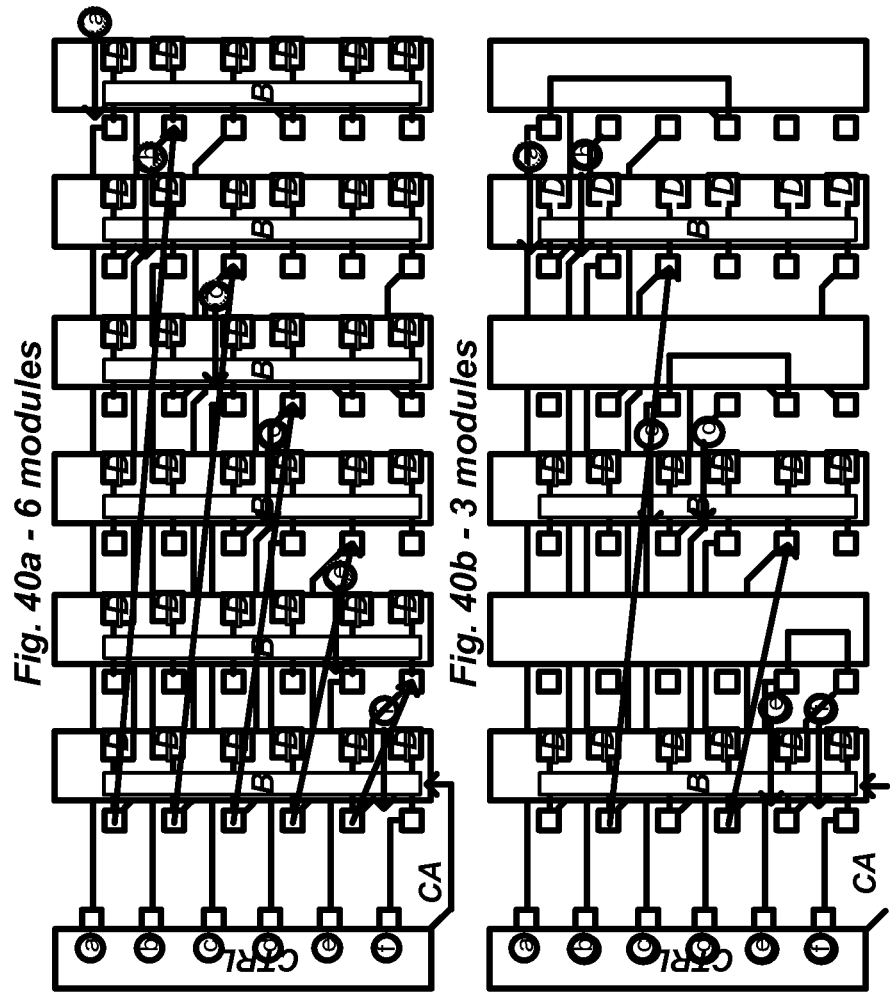

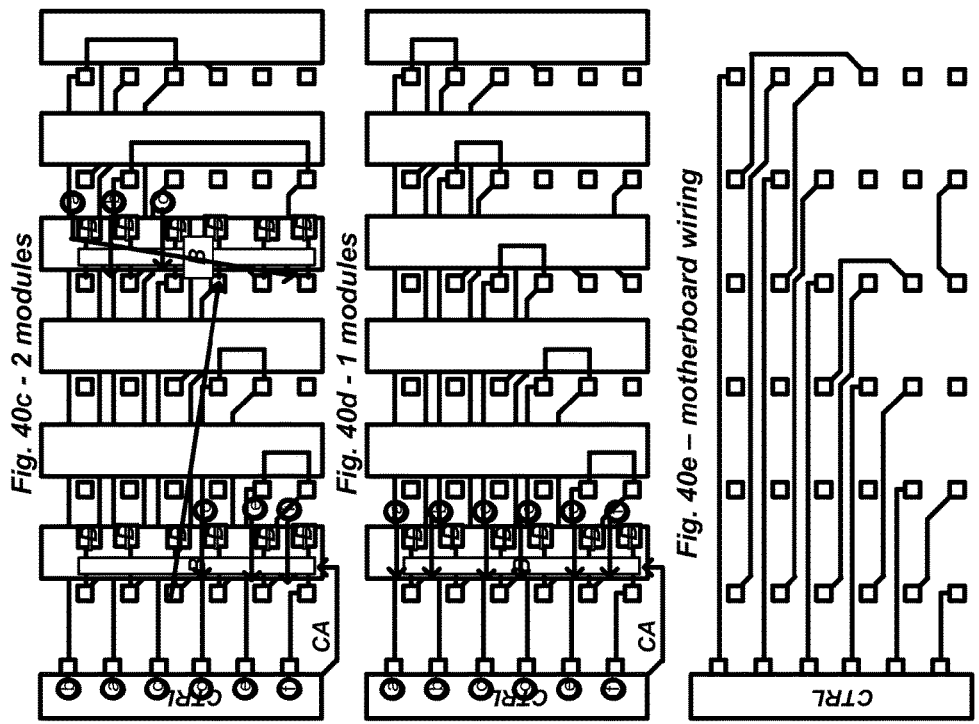

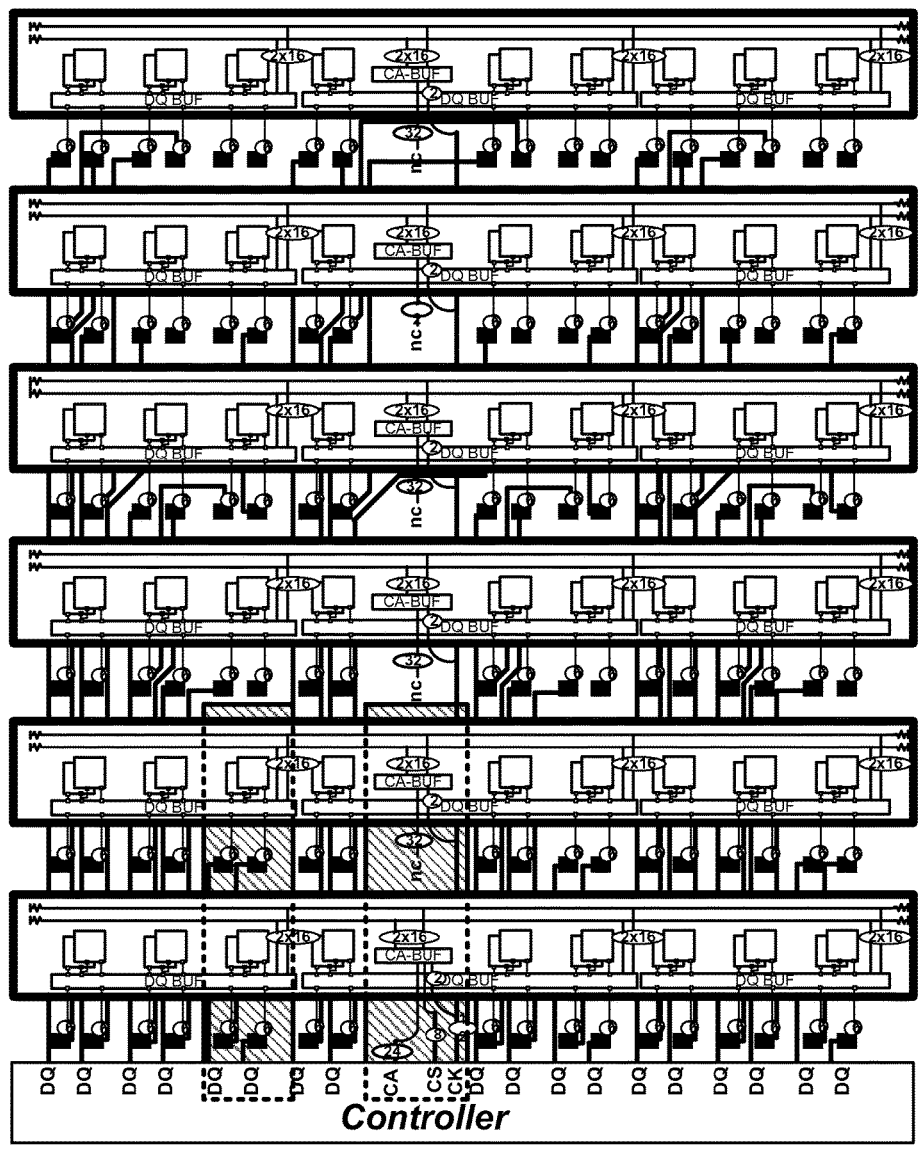
Fig. 41 – Link detail for 6 module system

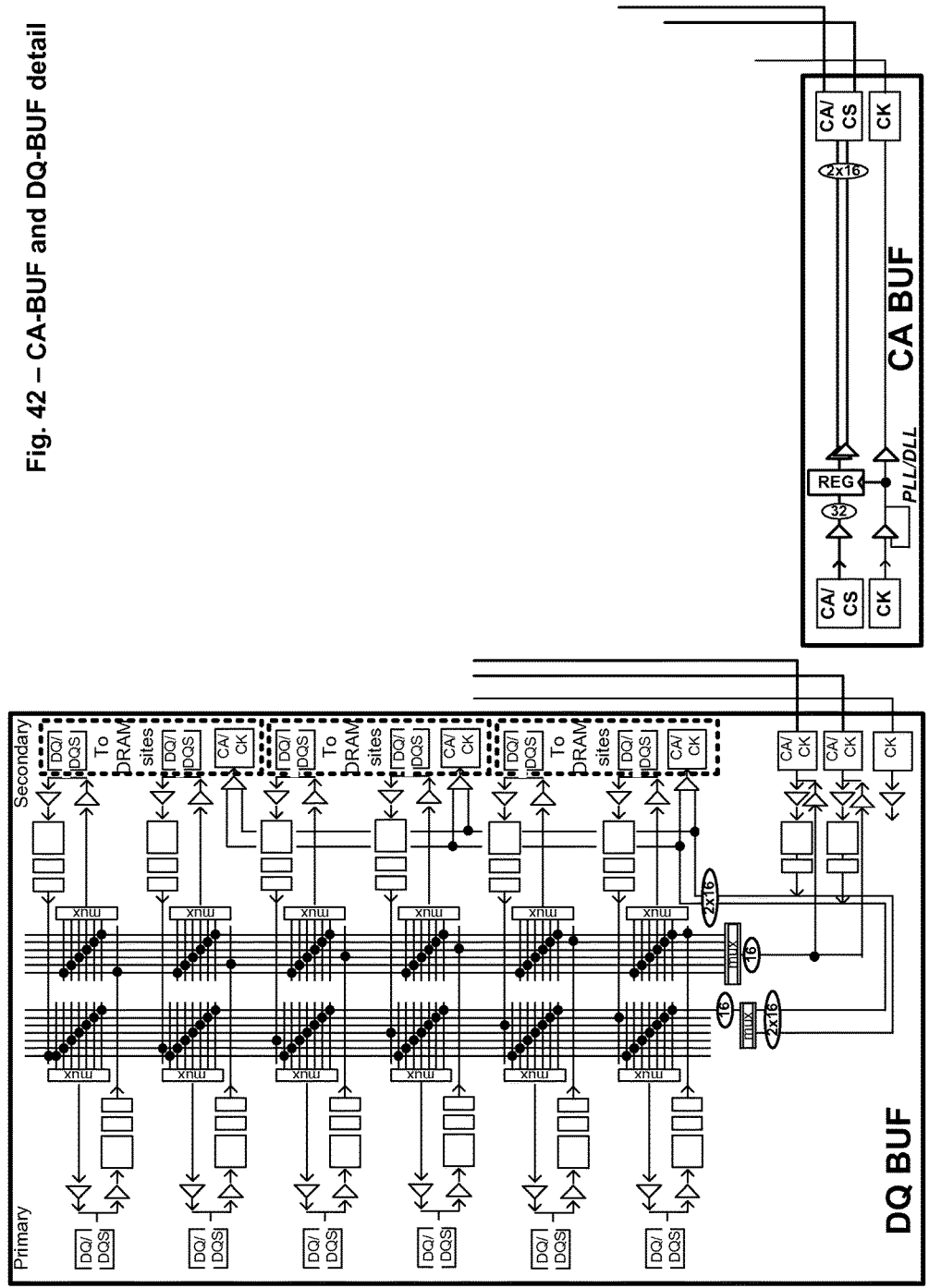
Fig. 42 – CA-BUF and DQ-BUF detail

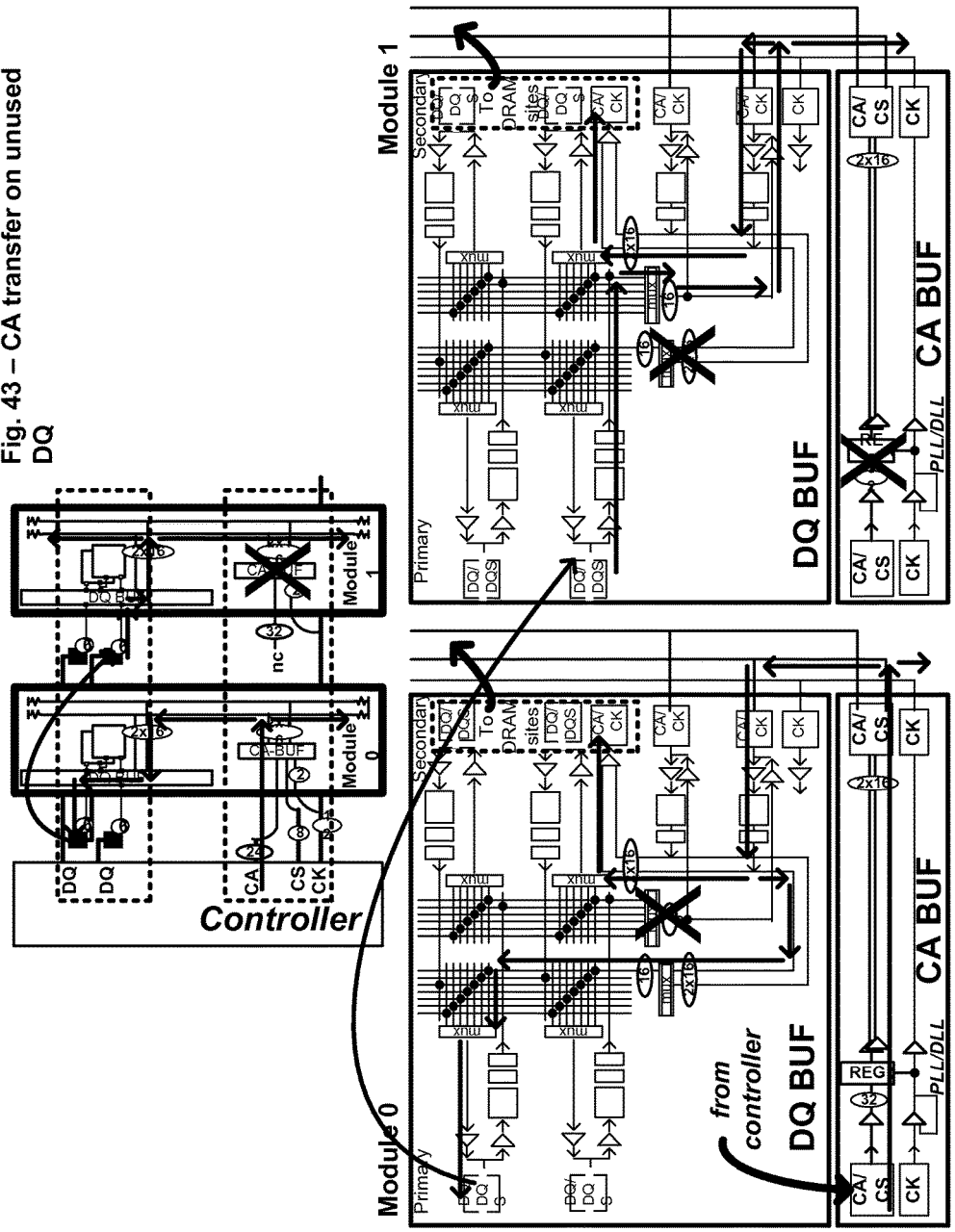
Fig. 43 – CA transfer on unused DQ

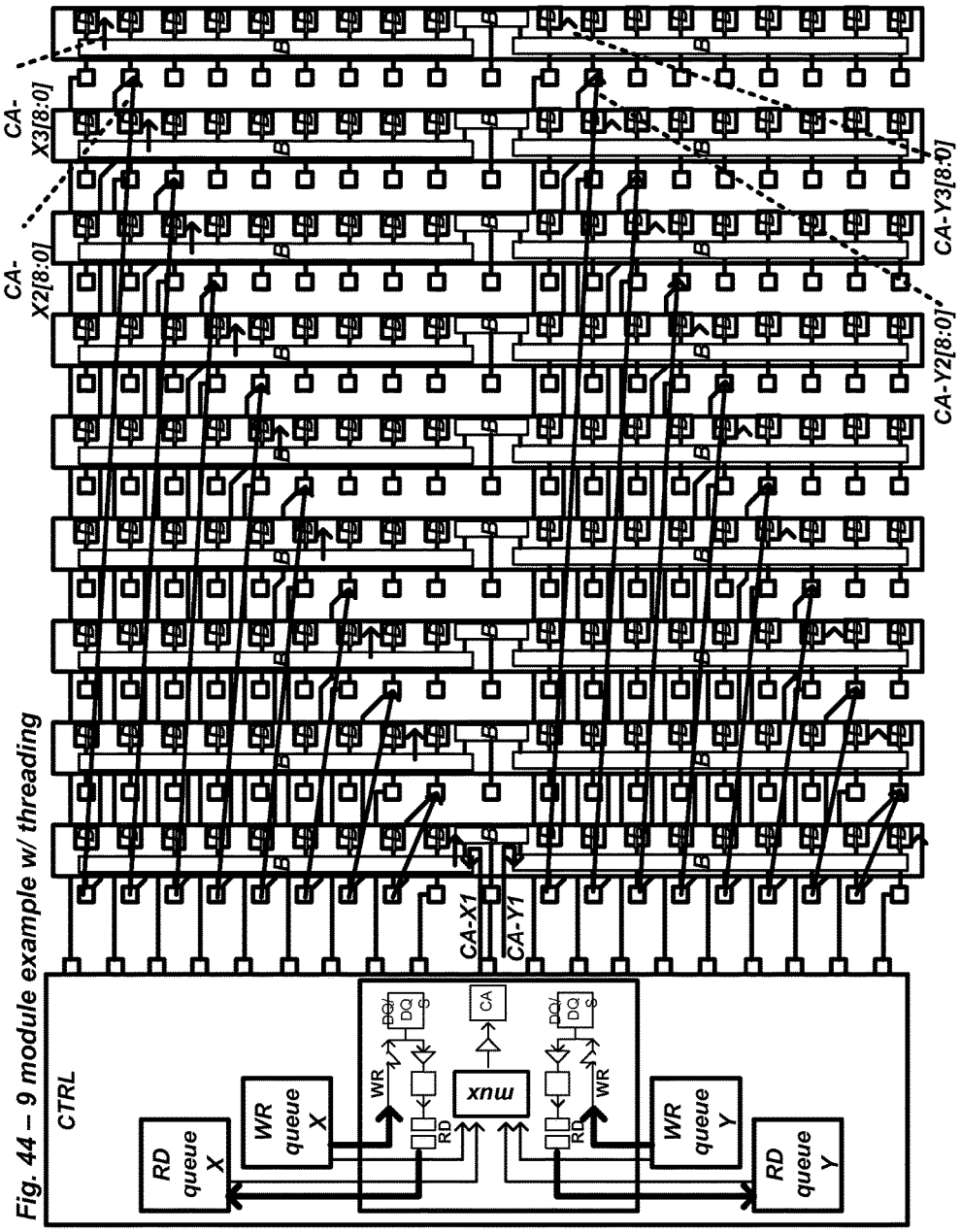
Fig. 44 – 9 module example w/ threading

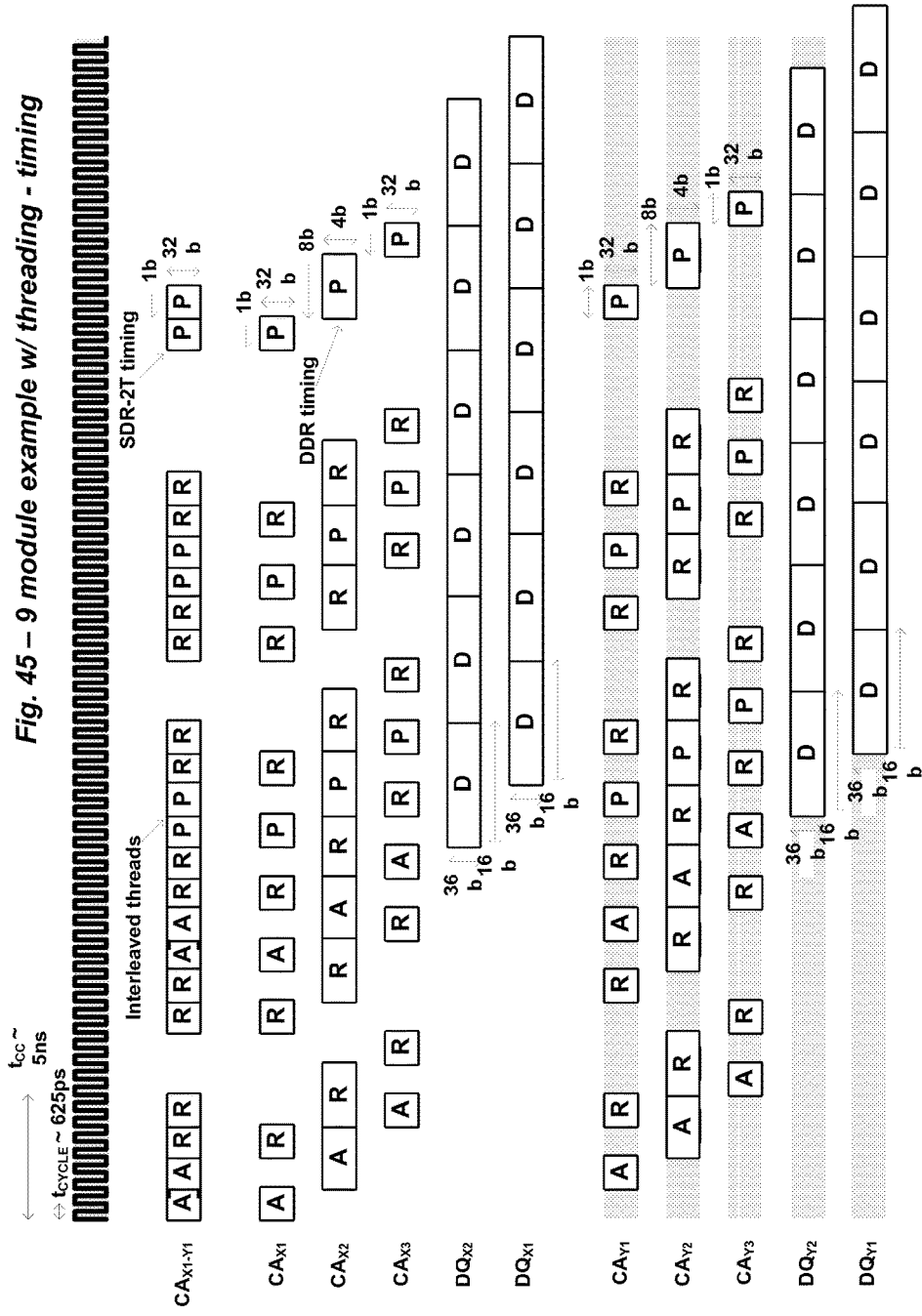
Fig. 45 – 9 module example w/ threading - timing

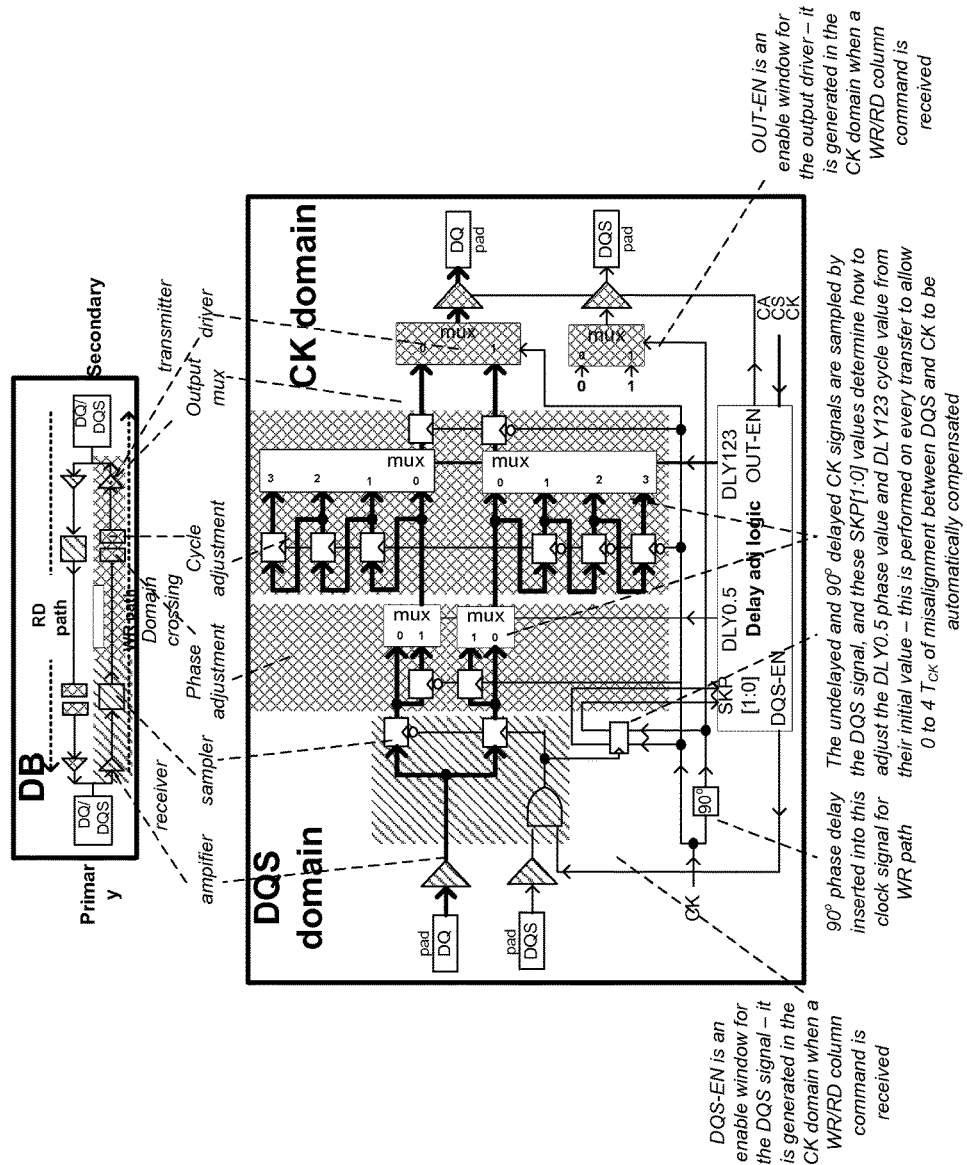
Fig. 46 – Domain-crossing detail for DQ buffer component

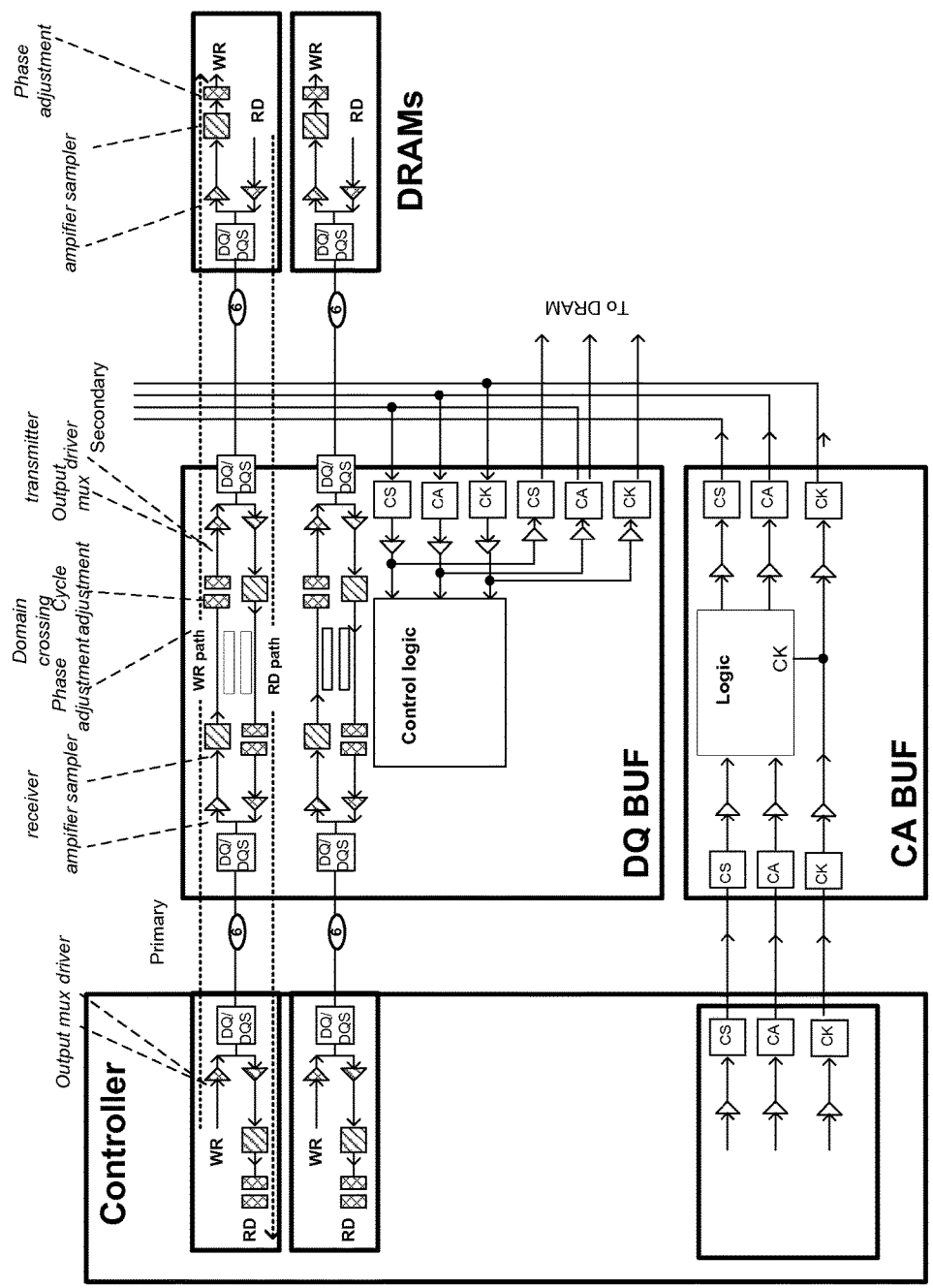
Fig. 47 – Domain-crossing detail for memory system

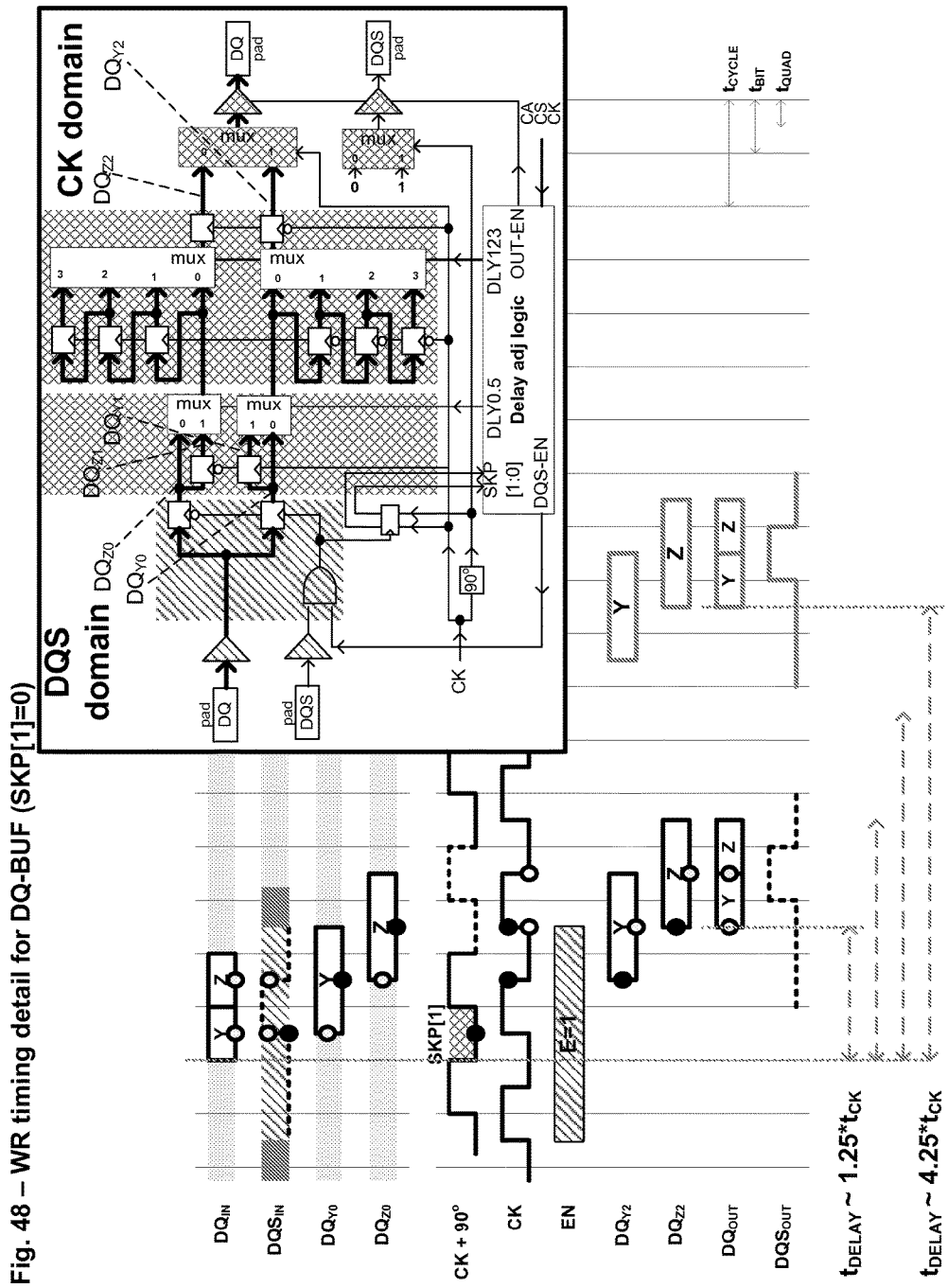
Fig. 48 – WR timing detail for DQ-BUF (SKP[1]=0)

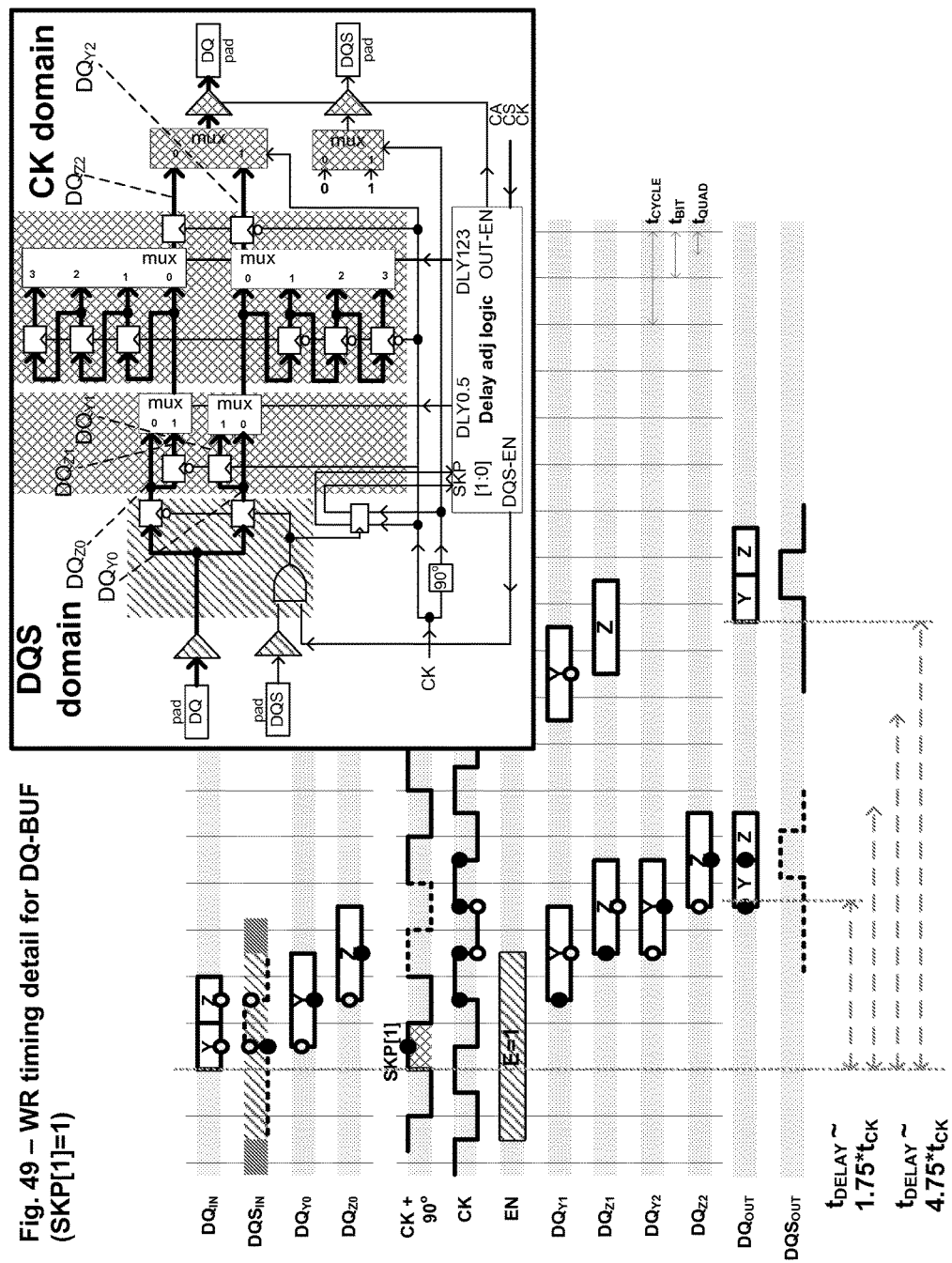
Fig. 49 – WR timing detail for DQ-BUF (SKP[1]=1)

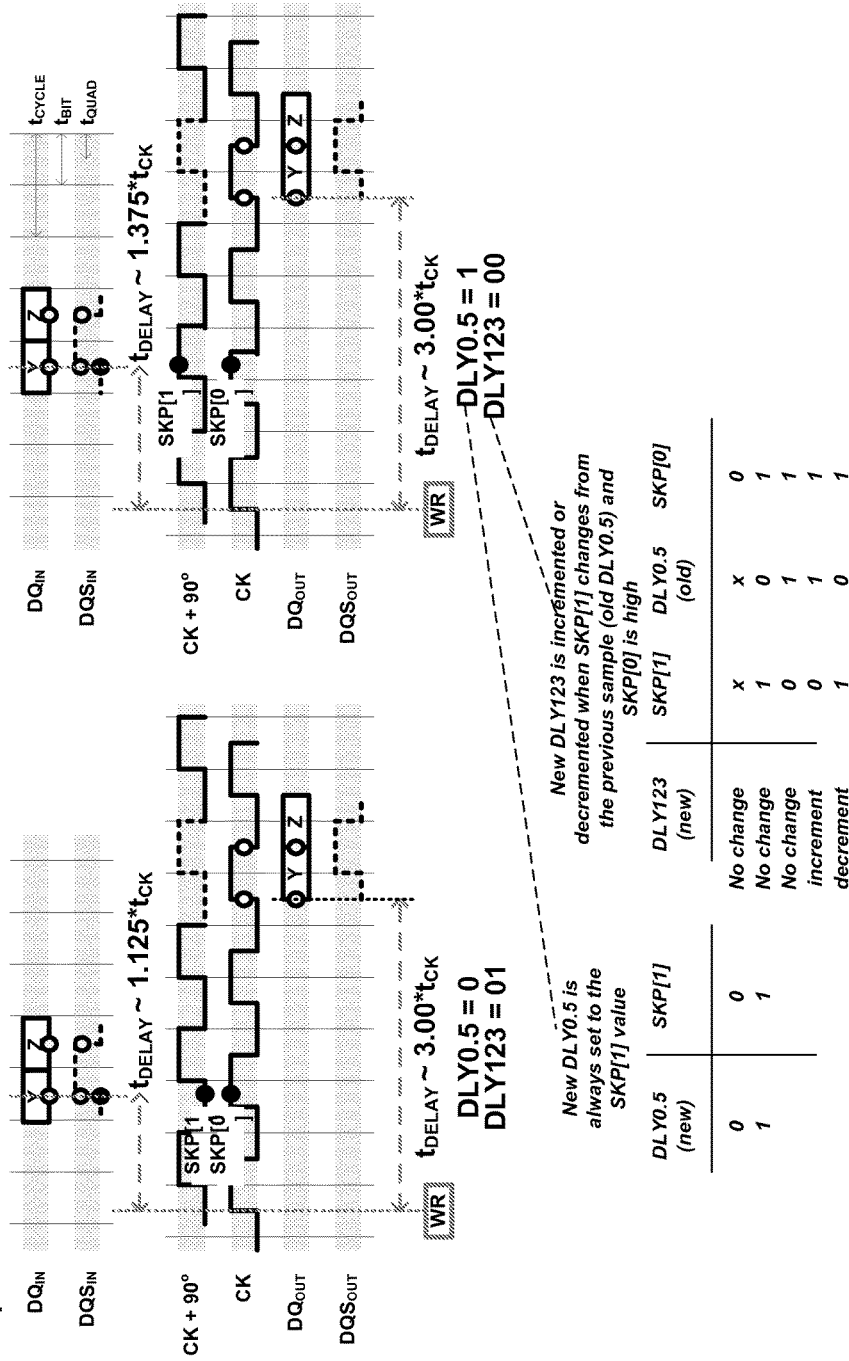

HIGH CAPACITY MEMORY SYSTEM WITH IMPROVED COMMAND-ADDRESS AND CHIP-SELECT SIGNALING MODE

RELATED APPLICATIONS

This application is the National Phase of International Application Number PCT/US2014/071311, filed Dec. 18, 2014, which claims the benefit of U.S. Provisional Application No. 61/986,054, filed Apr. 29, 2014 and claims the benefit of U.S. Provisional Application No. 61/917,742, filed Dec. 18, 2013, the contents of both are incorporated by reference.

BACKGROUND

Computing memory systems generally include one or more dynamic random access memory (DRAM) integrated circuits, referred to herein as DRAM devices, which are connected to one or more processors. Multiple DRAM devices may be arranged on a memory module, such as a dual in-line memory module (DIMM). A DIMM includes a series of DRAM devices mounted on a printed circuit board (PCB) and are typically designed for use in personal computers, workstations, servers, or the like. There are different types of memory modules, including a load-reduced DIMM (LRDIMM) for Double Data Rate Type three (DDR3), which have been used for large-capacity servers and high-performance computing platforms. Memory capacity and/or bandwidth may be limited by the loading of the data query (DQ) bus and the command-address (CA) bus associated with many DRAM devices and DIMMs. LRDIMMs allow a somewhat increased memory capacity by using memory buffers (sometimes also referred to as registers) on each DIMM to buffer memory channel signals. Registered memory modules have a register between the DRAM devices and the system's memory controller. For example, a fully buffered DIMM architecture introduces an advanced memory buffer (AMB) between the memory controller and the DRAM devices on the DIMM. The memory controller communicates with the AMB as if the AMB were a memory device, and the AMB communicates with the DRAM devices as if the AMB were a memory controller. The AMB can buffer data, command and address signals. With this architecture, the memory controller does not communicate with the DRAM devices directly, rather the AMB is an intermediary for communication with the DRAM devices.

Lithographic feature size has steadily shrunk in each generation of dynamic random access memory components (DRAM). As a result, the device storage capacity of each generation has increased. Each generation has seen the signaling rate of interfaces increase, as well, as transistor performance has improved.

Unfortunately, one metric of memory system design which has not shown comparable improvement is the system capacity of a memory channel. Rather, this capacity has steadily eroded as the signaling rates have increased.

Part of the reason for this is the link topology used in some memory systems. When more modules are added to the system, the signaling integrity is degraded, and the signaling rate must be reduced, even for buffered solutions. Typical memory systems today are limited to just one or two modules when operating at the maximum signaling rate.

BRIEF DESCRIPTION OF THE DRAWINGS

The present embodiments are illustrated by way of example, and not of limitation, in the figures of the accompanying drawings in which:

FIG. 1a shows some details of the physical connection topology of the high speed signaling links in a standard memory system.

FIG. 1b shows some details of the physical connection topology of the command and address (CA) links of a standard memory system.

FIG. 1c shows some details of the physical connection topology of the data query (DQ) links of a standard memory system for a write access.

FIG. 1d shows some details of the physical connection topology of the DQ links of a standard memory system for a read access.

FIG. 1e shows some details of the physical connection topology of the high speed signaling links in an improved memory system.

FIG. 1f shows some details of the physical connection topology of the CA links in an improved memory system.

FIG. 1g shows some details of the physical connection topology of the DQ links of an improved memory system through a continuity module.

FIG. 1h shows some details of the physical connection topology of the DQ links of an improved memory system for a read/write access.

FIG. 2 shows some details of the physical connection topology of a memory system with eight stacked die per device site.

FIG. 3 shows some details of the physical connection topology of a memory system with two stacked packages per device site.

FIG. 4 shows additional details of a portion of the memory system of FIG. 2, with, in FIG. 4 and similar figures, blocks labeled "B" representing a data buffer (DB) component, and blocks labeled "D" generally representing a frontside/backside pair of x4 DRAM device sites.

FIG. 11 shows some details of the physical connection topology of an improved memory system with eight stacked die per device site.

FIG. 12 shows additional details of a portion of the memory system of FIG. 11.

FIG. 13a shows the transfer cases for read access of the memory system of FIG. 11 with different allowed slot population configurations.

FIG. 13b shows the transfer cases for a read access of the memory system of FIG. 11 with each slot using the same decoding table.

FIG. 14 shows an embodiment of a decoding table to implement the transfer cases from FIG. 13a.

FIG. 15 shows some details of a first embodiment of the timing for the memory system of FIG. 11.

FIG. 16 shows some details of the registering clock driver (RCD) component for the memory system of FIG. 15.

FIG. 17 shows some details of a second embodiment of the timing for the memory system of FIG. 11.

FIG. 18 shows some details of the registering clock driver (RCD) component for the memory system of FIG. 17.

FIG. 19 shows an overview of an improved memory system.

FIG. 20 shows an extended timing example of the primary and secondary CA signals in an improved memory system.

FIG. 21 shows some details of the physical connection topology of an improved memory system with two stacked packages per device site.

FIG. 22 shows some details of domain-crossing for a memory system.

FIG. 23a shows some details of read/write paths in a data buffer (DB) component of an improved memory system.

FIG. 23b shows some details of a lateral bypass of a DB component of an improved memory system.

FIG. 24 shows some details of domain-crossing logic of a DB component.

FIG. 25 shows some details of a first embodiment of a write path in a DB component.

FIG. 26 shows some details of a second embodiment of a write path in a DB component.

FIG. 27 shows how the embodiments of FIGS. 20 and 21 can be combined to track drift between domains.

FIG. 28 shows the transfer cases for read access of another embodiment of a memory system with different allowed slot population configurations.

FIG. 29 shows some details of the memory system of FIG. 28.

FIG. 38 shows a standard system with 3 modules according to one embodiment.

FIG. 39a shows the physical connection topology of the links in standard memory systems according to one implementation.

FIG. 39b illustrates CA links that use a multi-drop topology according to one implementation.

FIG. 39c illustrates the link problem for write data according to one implementation.

FIG. 39d illustrates the link problem for read data according to one implementation.

FIG. 39e illustrates the physical signaling topology of CA and DQ links in an improved system according to one embodiment.

FIG. 39f illustrates the link solution for CA links according to one embodiment.

FIG. 39g illustrates the link solution for write data according to one embodiment.

FIG. 39h illustrates the link solution for read data according to one embodiment.

FIG. 40a shows an overview of the improved system with 6 modules according to one embodiment.

FIG. 40b shows an improved system with only three of the sockets being occupied with DRAM modules and the other three sockets being occupied with continuity modules according to one embodiment.

FIG. 40c shows an improved system with only two of the sockets being occupied with DRAM modules and the other four sockets being occupied with continuity modules according to another embodiment.

FIG. 40d shows an improved system with only one of the sockets being occupied with DRAM modules and the other five sockets being occupied with continuity modules according to another embodiment.

FIG. 40e shows a motherboard wiring pattern connecting a controller and six modules according to one embodiment.

FIG. 41 shows the improved 6-module system according to one embodiment.

FIG. 42 shows the CA-BUF and DQ-BUF components according to one embodiment. This section assumes that the buffer components and controller are operating in the improved, high capacity mode.

FIG. 43 shows incremental logic to supply every module with a copy of the CA/CS information from the controller component according to one embodiment.

FIG. 44 shows adjustments to access granularity while utilizing the improved link topology and methods according to one embodiment.

FIG. 45 shows a timing example for the system in FIG. 44 according to one implementation. FIG. 46 shows domain-crossing logic of the DQ-BUF component according to one embodiment.

FIG. 47 shows domain-crossing logic of representative components of a memory system according to one embodiment.

FIG. 48 shows a write path in the DQ-BUF component according to one embodiment.

FIG. 49 shows a write path in the DQ-BUF component according to one embodiment.

FIG. 50 shows timing examples of FIG. 48 and FIG. 49 being combined together to automatically track drift between the DQS and CK domain over an arbitrarily large range according to one embodiment.

DETAILED DESCRIPTION

Figure 5:
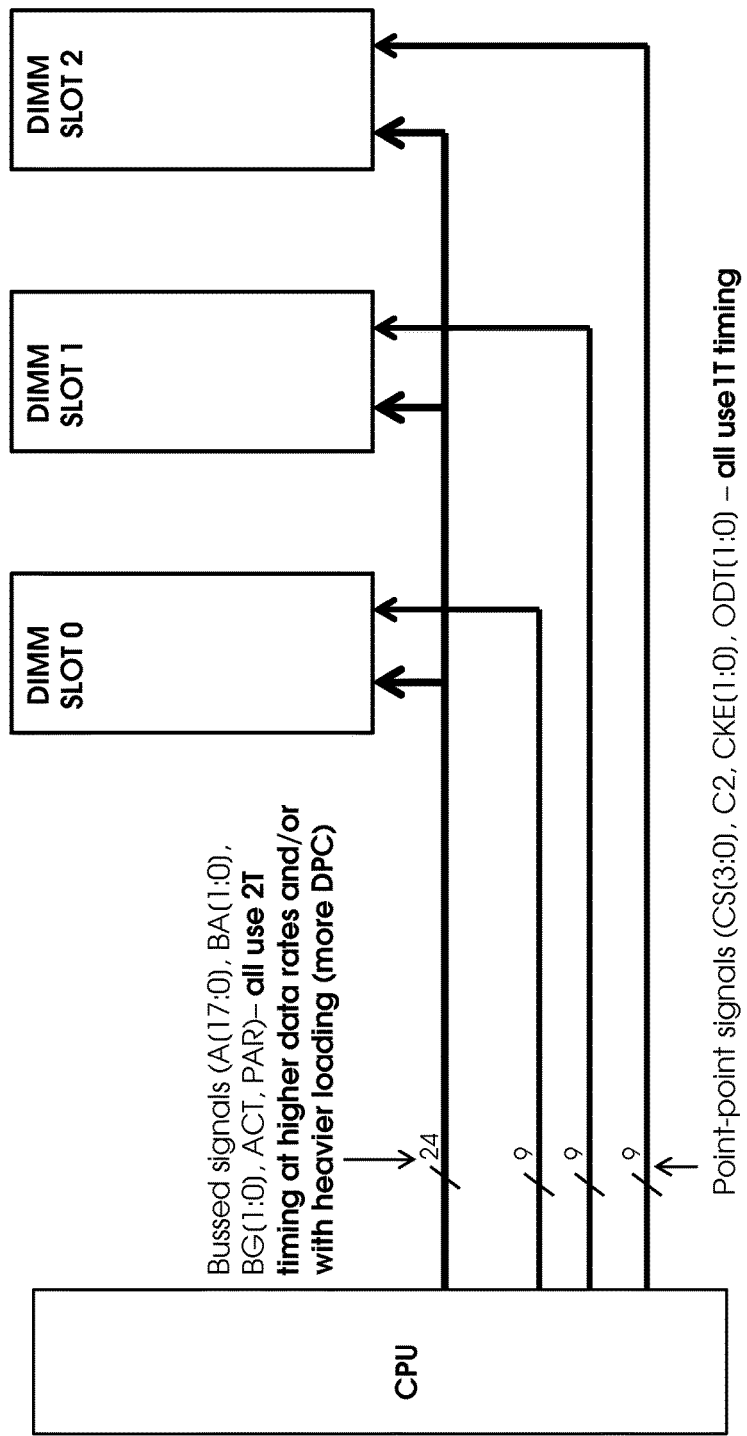
FIG. 5 shows some details of the physical connection topology of the CA links in current memory systems.

Described herein is a memory system that, in at least one embodiment, is capable of operating in at least two modes. In a first mode, the memory system includes a controller with multi-drop command/address connections to memory devices of different memory modules that transmits a strict subset of decoded chip-select signals to each module. In a second mode, the controller has point-to-point command/address connections to the memory devices and transmits a fully encoded set of all chip-select signals to each module. Also described herein are memory systems that, in at least one embodiment, are high-capacity memory systems with improved command-address link topology. Some embodiments described herein are directed to technologies for building memory systems which have an increase in the number of memory modules at the maximum signal rate. These new modules may be built from standard memory components, and may be used with existing controllers in some configurations. These technologies may be used for improving the topology of the command-address (CA) links of a standard memory system. Some embodiments, described herein with respect to FIGS. 5-10 and 34-37, covers technologies which can be used without modification to the existing controller component and other embodiments described herein with respect to FIGS. 38-52 covers technologies which can be used with small modifications to existing controller components and which may allow much higher capacity memory systems to be built.

FIG. 1a shows some details of the physical connection topology of the links in a multi-drop memory system. The links between the controller component and the memory modules include two classes of links: the CA (command-address) links and the DQ (data) links. The memory system may include other links between the controller and the memory modules. FIG. 1a illustrates a system with three modules per memory channel. Other memory systems may have more or fewer modules per channel. For example, a memory system may have one, two, three, four, or more than four memory modules per channel.

FIG. 1a illustrates CA links using a multi-drop technology where a single CA link is coupled to multiple memory modules. The memory system may include other links, such as chip-select (CS) links, with point-to-point topology in which a single link is coupled to only a single memory module, although standard controller configurations transmit a different group of 2 or 4 "one-hot" CS signals to each slot. In some embodiments, point-to-point links may have better signal integrity than multi-drop links.

The CA and DQ signals are transmitted (and received, in the case of DQ signals) by the controller component. In one embodiment, these signals are received (and transmitted, in the case of DQ signals) by buffer components on the module, which in turn communicate with the DRAMs on the module.

In other embodiments, the memory system may not include buffer components in the path of the CA and DQ links on the module, however, such embodiments may have a more limited memory device capacity and a more limited signaling rate than memory systems including such buffer components, as un-buffered links may be impacted by the longer wires and heavier channel loading presented by the module.

In one embodiment, the CA and DQ links are buffered by the same component. In another embodiment, the memory modules may include a separate CA buffer component and one or more separate DQ buffer components. In separated buffer systems, the CA buffer component is referred to herein as a registering clock driver (RCD) component and the DQ buffer component is referred to herein as a data buffer (DB) component.

The DB component may be divided (sliced) into several smaller components, each covering a subset of the DQ links. In one embodiment, each memory module includes one RCD and nine DB. However, other embodiments may include more or fewer RCD or DB components. The techniques, topologies, and methods described in this application can be used with other buffer configurations.

In one embodiment, the memory modules include 72 DQ links to accommodate standard error detection and correction (EDC) codes. However, the methods described in this application can be applied to other embodiments in which the memory modules include more or fewer DQ links as well, e.g., 64 DQ links.

In one embodiment, illustrated in FIGS. 1c and 1d, the DQ link topology includes a transmitter and receiver on the controller and a controlled-impedance wire on a motherboard substrate. Inside the DB, there is a termination device, a receiver, and a transmitter. Each module (with a DB) adds a load to the DQ link.

In one embodiment, the undesired channel loading presented by each buffer is mainly capacitive, and may include loading introduced by the socket connection to the module pin, the wire trace between the module pin and the buffer component, and the transmitter and receiver circuits on the buffer.

The receiver/transmitter circuit includes the transistors forming the input amplifier and the output driver, and may also include protection devices which guard against electrostatic discharge. In one embodiment, this protection device and the output driver may add some series resistance in addition to the capacitive loading. On the DQ channel, such devices typically are retasked in a receive mode to present a matched-impedance on-die termination (ODT) at the receiver.

Because the DQ link is input/output (bidirectional), the total capacitive load $C_{DQ}$ is may be larger than that present on the CA links. FIGS. 1c and 1d show a lumped capacitance $C_{DQ}$ representing this load. However, as noted above, the load may also include resistive or other components.

In one embodiment, the DQ links are bidirectional; read data can be driven from any module position. FIG. 1d illustrates this. The transmitter in the DB drives the signal through the module trace and the connector to the motherboard trace. Here the signal energy is divided, with half going left and half going right.

In one embodiment, the half-signal traveling to the end of the module is absorbed by the terminator on the last module, which has been turned on. In other embodiments, the signal will divide at the inactive modules and reflect back, introducing ISI (inter-symbol-interference) at the controller and degrading signal integrity. In some embodiments, the termination devices are partially enabled in the inactive modules to decrease ISI.

FIG. 1c illustrates the memory module in use for write data. The transmitter in the controller drives the signal through the motherboard trace. The signal energy is divided at each module. If the module has disabled termination, the signal reflects back out to the motherboard, with half going left and half going right.

In one embodiment, this may be addressed by including termination devices at each module (e.g., as an adjustable device in the input/output circuit in the DB component). Choreographing the setting of the termination values may introduce idle cycles (bubbles) between accesses to different modules.

The termination value of this device may be adjusted according to which module accesses the data. In some embodiments, the termination value used in the non-selected modules is adjusted as well for optimal signaling. Thus, in some embodiments, each module may connect to its own set of on-die termination ODT[1:0] links).

As described further below, the DQ links can be modified so they have a point-to-point topology rather than multi-drop topology. This may allow each link to be operated at a maximum signaling rate determined mainly by the transmit/receive circuits (and not by the link topology). It may also allow the module capacity of the system to be increased at these higher signaling rates.

In FIG. 1a, it should be noted that even with the assumption of CA and DQ buffering, there may still be issues of signaling integrity. In one embodiment, illustrated in FIG. 1b, the CA link topology includes a transmitter on the controller, a controlled-impedance wire on a motherboard substrate, and a termination resistor at the farthest end. A receiver in the RCD in each module connects to the CA link, adding multiple loads to the link.

As above, this module load may be primarily capacitive, and includes loading introduced by the socket connection to the module pin, the wire trace between the module pin and the buffer component, and the receiver circuit on the buffer.

The receiver circuit includes the transistors forming the input amplifier as well as the protection devices which guard against electrostatic discharge. In one embodiment, protection device may include some series resistance, as well.

In one embodiment, the CA link is input only and the total capacitive load is relatively small. FIG. 1b shows a lumped capacitance $C_{CA}$ representing this load. However, the load may include resistive or other components.

As described further below, the bussed CA links can be modified to a point-to-point topology. This may allow each link to be operated at a maximum signaling rate determined mainly by the transmit/receive circuits (and not by the link topology). It may also allow the module capacity of the system to be significantly increased.

In embodiments in which the DQ links have been improved, it may be advantageous to improve the CA links so that they are not the performance-limiting factor. Described herein is an improved signaling topology for the CA links of a memory system. This improved topology may provide higher module capacity, and can be implemented in such a way that key components (controllers, modules, buffer devices) can be designed so they can be used in either standard systems or in improved systems.

The methods disclosed herein can be employed to gain a number of benefits, such as the following: [1] The system capacity can be improved to allow at least three modules running at the maximum data rate. [2] The capacity of the system remains adjustable, e.g., a three module system can hold one, two, or three modules, with the maximum data rate available in each. [3] The signaling integrity of the CA links is improved significantly from the multi-drop topology of other systems as each CA link uses a point-to-point topology. [4] High capacity systems allow standard error detection and correction codes (e.g., error correcting codes (ECC), Chip-kill, etc.). Alternatively, other benefits may be achieved.

These improvements may be achieved while maintaining a high degree of compatibility to standard memory systems and their components: [1] No change to the DRAM memory component. [2] Small change to the interface logic of the controller component, and little or no change to the number of CA and DQ interface pins on the controller. [3] Change to the module—specifically a new buffer design; the new module can be used modally in standard systems as well as the improved (high capacity, high performance) systems.

By offering a standard mode as described above and an improved mode as described below, the manufacturer of the controller component and the buffer component can deliver the same product into both standard motherboards and improved, high capacity motherboards.

In FIG. 1e, the physical signaling topology of the CA and DQ links are shown for the improved system. As can been seen in FIG. 1e, the DQ link topology is different from the standard system illustrated in FIG. 1a. FIGS. 1g and 1h illustrate this difference.

The memory system includes a transmitter and receiver on the controller and a controlled-impedance wire on a motherboard substrate, as before. Inside the DB of a module there is a termination device, a receiver, and a transmitter, as before. There are several key differences in the way these are connected together. FIGS. 1g and 1h illustrate this different topology of this embodiment. [1] The DQ link connects to a single module in a point-to-point topology. This may provide improved signaling quality, since the receiver and transmitter are at opposite ends of a controlled-impedance transmission line with no intermediate stubs, with a termination device enabled at the receiver end of the link. [2] When populated DIMMs are not placed in each slot on a channel, a passive continuity module performs rerouting for some channel lanes. Such lanes includes a segment (the "x" segment) of wire on the motherboard, a connection through a continuity module (the "z" segment), and a second segment of wire on the motherboard (the "y" segment). Some DQ links may continue to only go through a single segment of wire on the motherboard (no connection through a continuity module) in reduced-population modes.

In one embodiment, the continuity module is a standard module substrate with no active devices. In another embodiment, the continuity module may include active devices. It may plug into a standard socket, and may connect some of the DQ links to other DQ links with a controlled impedance wire.

This connection through a continuity module may introduce some discontinuities to the link, mainly by the socket connection to the continuity module pins, as the geometry and spacing of the two-conductor transmission line changes at these socket connections.

Each DQ link may see an impedance change at the meeting point of the "x" and "z" segments and an impedance change at the meeting point of the "z" and "y" segments. These impedance changes may create reflections and add to ISI.

In one embodiment, impedance changes are at least partially compensated for by adjusting the trace widths of the DQ link on the module. In another embodiment, ISI is handled with decision-feedback-equalization (DFE) or similar techniques. This approach uses the past symbol-values that were transmitted on a link, and computes an approximation for the reflection noise they have created. This approximation can be subtracted from the signal (at the transmitter or receiver) to get a better value for the current symbol being transferred.

Because of this DQ link topology, the improved system may have better DQ signal quality than a multi-drop technology, even with impedance changes introduced by the continuity module.

The CA link topology is also different from the standard system. As can been seen in FIG. 1e, the CA link topology is different from the standard system illustrated in FIG. 1a. FIG. 1f further illustrates this difference.

The memory system includes a transmitter on the controller and a controlled-impedance wire on a motherboard substrate, as before. Inside the RCD of a module there is a termination device and a receiver. The termination device may be particularly useful because there is only one module to receive each CA signal instead of three.

Each CA link may connect to a single module in a point-to-point topology. This may provide improved signaling quality, since the receiver and transmitter are at opposite ends of a controlled-impedance transmission line, with a termination device enabled at the receiver end of the link.

Because of this simpler CA link topology, the improved system may have better CA signal quality. As described below, the logical definition of the CA signals may be changed to accommodate this new topology, to avoid a tripling of CA pads at the controller.

FIG. 2 shows details of a DIMM physical connection topology for use in a standard memory system. This is referred to as an "L8" system, reflecting the fact that it uses load-reducing buffer components (DB and RCD), and there is an eight die through-silicon via (TSV) stack at each of the 36 device sites on each module.

This configuration represents a maximum capacity DIMM. In one embodiment, it includes memory components with an ×4 DQ width (plus the two DQS [data strobe signal] timing signals). It may include 36 device sites arranged as two module ranks (on the front and back surfaces of the module) with 18 device sites each. Each rank can transmit or receive on 72 DQ links and 36 DQS links.

The eight-die TSV stack includes one memory component configured as a master. The master connects to the secondary DQ and CA links and steers them onto a set of DQ and CA links (internal to the stack) which connect to the other seven memory components in the stack. In other embodiments, the TSV stack may include more or fewer dies.

The stack of memory devices are selected as eight sub-ranks. This selection mechanism is slightly different from the one used to select the module ranks, and will be described further below.

The RCD and DB components steer the primary CA and DQ signals from the controller (via the motherboard) onto the secondary CA and DQ signals on each module.

In one embodiment, each DB component connects to two primary DQ nibbles (×4 DQ groups) and two secondary DQ nibbles. Each secondary DQ nibble connects to two TSV stacks (the first rank and second rank).

CA is an acronym for command-address or control-address. The CA links may include address, command, selection, power-control, termination-control, and error-control information. They are transmitted by the controller component, and received by the memory modules.

The links between the controller component and the memory modules may include at least two classes of links: the bussed links and the point-to-point links. The bussed signals may use a multi-drop topology, and connect to each module. The point-to-point links may use a point-to-point topology, and connect between one controller IO [input/output] pin and one module IO pin.

Note that the left-most component is labeled "controller" in FIG. 2, but the block is intended to include any component containing the logic blocks needed to interface to a standard memory system.

In FIG. 2, the primary links connect between the controller and the three modules. The 24 primary bussed CA links include:
A[17:0]—address and command
BA[1:0]—bank address
BG[1:0]—bank group address
ACT—activate command
PAR—parity error control There may also be a bussed clock link CK± (not shown). This link is typically differential (with a true and complement signal). In some embodiments, the clock link may be implemented with a point-to-point topology (with three copies of the signal) for better signal integrity. In other embodiments, the primary bussed CA links may exclude one or more of these signals and may include additional signals not listed herein.

In one embodiment, the primary point-to-point CA links are transmitted in three groups, one group to each module, with each group including:
CS[3:0]—decoded (one-hot) chip-select (selects 1-of-4 device ranks)
C2—encoded chip-select (for 8 device subranks)
CKE[1:0]—clock enable (each connected to one of two ranks of devices)
ODT[1:0]—output device termination enable (each connected to one of ranks of devices)

The CS signal is described above as being decoded or one-hot, where only one of the bits is a high value at any particular time. Thus, to select one of four device ranks with a decoded signal, a four-bit signal is used with each bit corresponding to one of the device ranks, e.g., ('0001', '0010', '0100', '1000'). In contrast, to select one of four device ranks with an encoded signal, a two-bit signal may be used with each of the four device ranks corresponding to one of the four possible bit combinations ('00', '01', '10', '11').

FIG. 2 thus has a total of 24+27=51 primary CA controller interface pins (and links), not including the clock.

Some standard embodiments may use fewer than 15 chip-select interface pins/links. This can be done by using a multi-drop topology on some of the chip-select links, allowing controller interface pins to be saved.

The improved CA signaling method (described below with respect to FIG. 11) assumes that there are only 46 primary pins/links in the standard CA interface (not counting the clock link(s)). However, in other embodiments, there may be more or fewer primary pins/links.

Returning to FIG. 2, each module receives from (and transmits to) the primary DQ signals with the nine DB components. There are 18 primary DQ "nibbles" (4 DQ link plus a differential DQS±timing link). Each DB component connects to a pair of primary DQ nibbles. In other embodiments, each DB component may connect to more than two primary DQ nibbles or may only connect to one DQ nibble.

Each DB component also connects to a pair of secondary DQ nibbles on the module. Each DQ nibble connects to two device sites, with each device site belonging to one of the two module ranks.

The example in FIG. 2 is standard system L8, in which each device site contains a TSV stack with eight memory die. The bottom-most die is the master device, connecting to the secondary DQ and secondary CA signals. The master device re-transmits (or re-receives, in the case or DQ read) the secondary links onto a set of links internal to the TSV stack assembly.

The TSV stack thus contains eight sub-ranks of devices (within one of the module ranks). Each module rank includes 18 device sites, each containing one TSV stack. The module in FIG. 2 has two module ranks, giving a total of 36 device sites.

Returning to FIG. 2, each module receives the primary CA signals at the RCD component. The following primary link signals are simply re-transmitted onto the secondary links (using the clock for timing the receiving/transmitting):
A[17:0]—address and command
BA[1:0]—bank address BG[1:0]—bank group address
ACT—activate command
PAR—parity error control
CKE[1:0]—clock enable (each connected to one of two ranks of devices)
ODT[1:0]—output device termination enable (each connected to one rank of devices)

The primary chip-select signals may be received and retransmitted as the indicated secondary chip-select signals:
Primary:
CS[3:0]—decoded (one-hot) chip-select (selects 1-of-4 device ranks)
C2—encoded chip-select (for 8 device ranks)
Secondary:
CS[1:0]—decoded (one-hot) chip-select (selects 1-of-2 device ranks)
CSe[2:0]—encoded chip-select (for 8 device ranks)

In one embodiment, the controller adjusts the internal physical memory address to account for this rank and sub-rank organization (as well for the internal memory component capacity and organization).

FIG. 3 shows details of the physical connection topology of a second standard memory system. This is called an "L2" system, reflecting the fact that it uses load-reducing buffer components (DB and RCD), and there is a two-package stack at each of the 36 device sites on each module.

This configuration represents a maximum capacity system which utilizes package stacking (in contrast with the TSV/die-stacking of the previous example).

In one embodiment, the memory system includes memory components with an ×4 DQ width (plus the two DQS timing signals). Each module includes the 36 device sites arranged as two module ranks with 18 device sites each per rank pair. Each rank can transmit or receive on 72 DQ links and 36 DQS links.

The two-package stack includes two identical memory components. Both components couple to all secondary DQ and CA signals except for the CS chip-select signals. There is a separate chip-select link for each of the two components in each package stack. In other embodiments, the stack includes more than two packages.

In one embodiment, there are four secondary chip-select links on the module. When one of the four is asserted, one of the four ranks is selected. Each rank includes 18 memory components, each connecting to a secondary DQ nibble (×4 DQ plus the two DQS timing signals).

This selection mechanism is slightly different from the one used to select the two module ranks with TSV-stacks described with respect to FIG. 2 and will be described in more detail below.

The example in FIG. 3 is standard system L2, in which each device site contains a two-package stack with two memory components. The two-package stack thus contains two ranks of devices. Each module rank includes 18 memory devices. The module in FIG. 3 has four module ranks, with a total of 36 device sites.

With respect to FIG. 3, each module receives the primary CA signals at the RCD component. In one embodiment, the following primary link signals are simply re-transmitted onto the secondary links (using the clock for timing the receiving/transmitting):
A[17:0]—address and command
BA[1:0]—bank address
BG[1:0]—bank group address
ACT—activate command
PAR—parity error control CKE[1:0]—clock enable (each connected to one of two ranks of devices)
ODT[1:0]—output device termination enable (each connected to one of the ranks of devices)

The primary chip-select signals may be received and retransmitted as the indicated secondary chip-select signals:
Primary:
CS[3:0]—decoded (one-hot) chip-select (selects 1-of-4 device ranks)
C2—encoded chip-select (for 8 device ranks)
Secondary:
CSd[3:0]—decoded (one-hot) chip-select (selects 1-of-4 device ranks). These are equivalent to the CSf[1:0] and CSb[1:0] secondary chip selects of FIG. 3, where "b" indicates the back surface of the module and "f" indicates the front surface of the module.
CSe[2]—encoded chip-select (not used)

In one embodiment, the controller adjusts the internal physical memory address to account for this rank organization (as well as for the internal memory component capacity and organization).

FIG. 4 shows a section drawing that is extracted from FIG. 2. This section includes a 6-nibble "group" (⅓ of the 18 DQ nibbles) plus the RCD on each module. This section may be representative of the whole system which includes functional replicas of the section for the other two six-nibble DQ groups.

Underneath the section drawing is a simplified configuration drawing according to one embodiment. The configuration drawing shows the connections of the individual DQ nibble groups and the CA links to the three modules. Each module is shown with pairs of device sites collapsed to a single site.

The configuration drawing illustrates the mapping of a read access. In the standard system, this involves accessing the six DRAMs of a single sub-rank of a single rank on one module, and transferring the read data across the corresponding multi-drop DQ links to the controller (CTRL) interface.

At the right of the configuration drawing is an example motherboard wiring diagram which has been extracted.

CA Link Topology in Standard Systems

FIG. 5 shows some details of the physical connection topology of the CA links in current memory systems. CA is an acronym for command-address or control-address. These links specify address, command, selection, power-control, termination-control, and error-control information. They are transmitted by the controller component, and received by the modules.

There are two classes of links: the bussed links and the point-point links. The bussed signals use a multi-drop topology, and connect to each module. The point-point links use a point-to-point topology, and connect between one controller IO pin and one module IO pin.

Note that the controller component is labeled "CPU" in the figure, but the block is intended to include any component containing the logic blocks needed to interface to a standard memory system.

In the figures, the 24 bussed links include: A[17:0]—address and command; BA[1:0]—bank address; BG[1:0]—bank group address; ACT—activate command; PAR—parity error control. There may also be a bussed clock link CK (not shown). This link is typically differential (with a true and complement signal). The point-point links are transmitted in three groups, one group to each module, with each group including: CS[3:0]—decoded (one-hot) chip select (selects 1-of-4 devices); C2—encoded chip select (for 8 devices—selects one of two groups of four devices); CKE[1:0]—clock enable (each connected to one of two groups of devices); ODT[1:0]—output device termination control enable (each connected to one of two groups of up devices)

At moderate signaling rates the CA signals use SDR timing (single data rate). This means that a single bit is transmitted during each clock cycle.

At the highest signaling rates the bussed CA signals use SDR-2T timing (also called SDR-2N). This means that a single bit is transmitted during two clock cycle.

The P-to-P CA signals may continue to use SDR timing at the highest signaling rates. Their simpler topology permits this.

The problem that arises is that if the DQ signal topology is improved with a P-to-P topology, then the multi-drop topology of the bussed CA signals can become the limiting factor in determining the maximum signaling rate of a three module system. This can occur even with the more relaxed SDR-2T timing.

CA DPP

Figure 6:
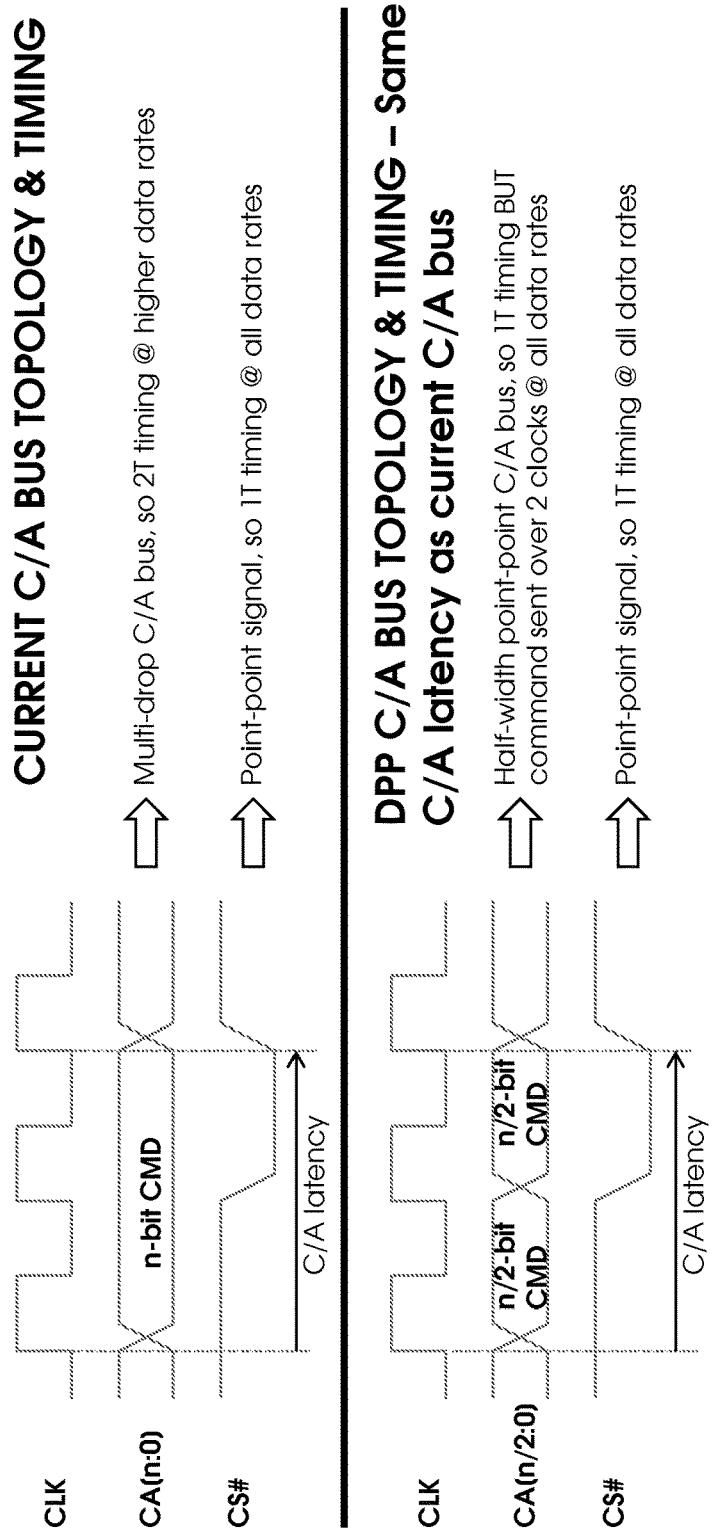
FIG. 6 shows a second solution to the CA signal integrity problem.

FIG. 6 shows a second solution to the CA signal integrity problem.

Top diagram: The 24 bussed CA links (A[17:0], BA[1:0], BG[1:0], ACT, PAR) use SDR-2T timing because of the multi-drop link topology.

Bottom diagram: If the 24 links us a point-to-point topology, then SDR-1T timing can be used. The command bits can be transferred with half the number of links, but with the same latency.

Time-multiplex CA

Figure 7:
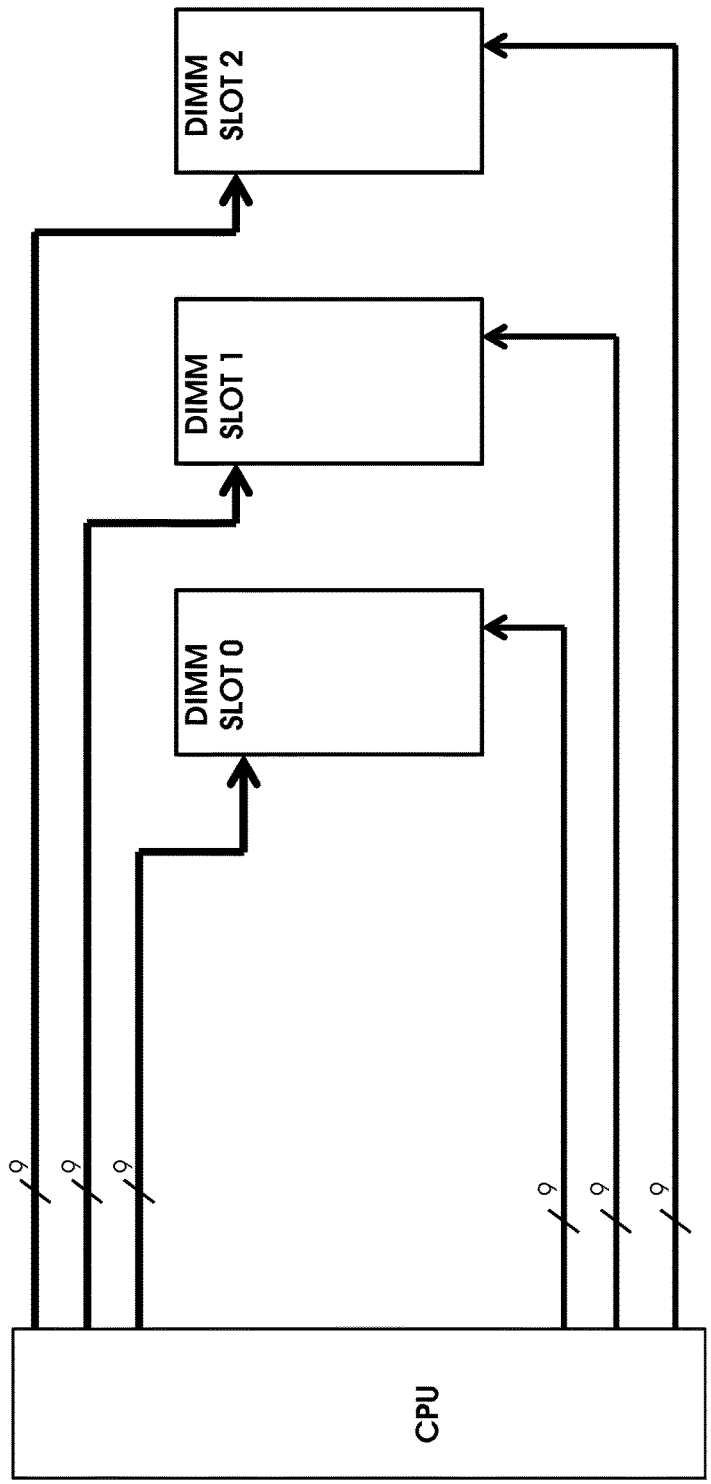
FIG. 7 shows a third solution to the CA signal integrity problem.

FIG. 7 shows a third solution to the CA signal integrity problem. The idea is to [1] sub-divide the 24 bussed CA links (A[17:0], BA[1:0], BG[1:0], ACT, PAR) into three groups; [2] add an RFU (reserved for future use) module pin to each group; and [3] add the 9 point-to-point links (CS[3:0], C2, CKE[1:0], ODT[1:0]) to each group.

Each group includes 18 links connecting the controller to each module with point-to-point topology. If these links are driven with SDR-1T timing, then these 18 links may be equivalent to 36 links with SDR-2T timing. This may be enough to transmit the original 24 bussed CA signals plus the original 9 point-to-point signals to each module. The information from the original bussed CA links may be replicated on each of the three groups of point-to-point links.

This solution provides good signal integrity on all the CA links, and doesn't increase the number of links which must be routed on the motherboard.

One issue with this solution is that the controller needs to be modified to transmit the CA information in two ways, depending upon how the modules are connected to the controller (i.e. with multi-drop topology or with point-to-point topology).

In some of the applications which address the signal integrity of the DQ links it is necessary to send the entire chip select information to all of the modules (because each module supplies part of the data for each access). In these configurations, the chip select information could be encoded by the controller before it is sent out. This would reduce the 12 decoded (one-hot) chip select signals to four bit chip select field.

When P-to-P topologies are applied to the DQ links, the need for independent termination control with the ODT[1:0] links goes away (each DQ link has a point-to-point topology—the ODT[1:0] control is needed for multi-drop topology).

Also, the C2 and CKE[1:0] links can be shared between modules, with the encoded chip-select field controlling which rank of devices is affected.

Figure 8:
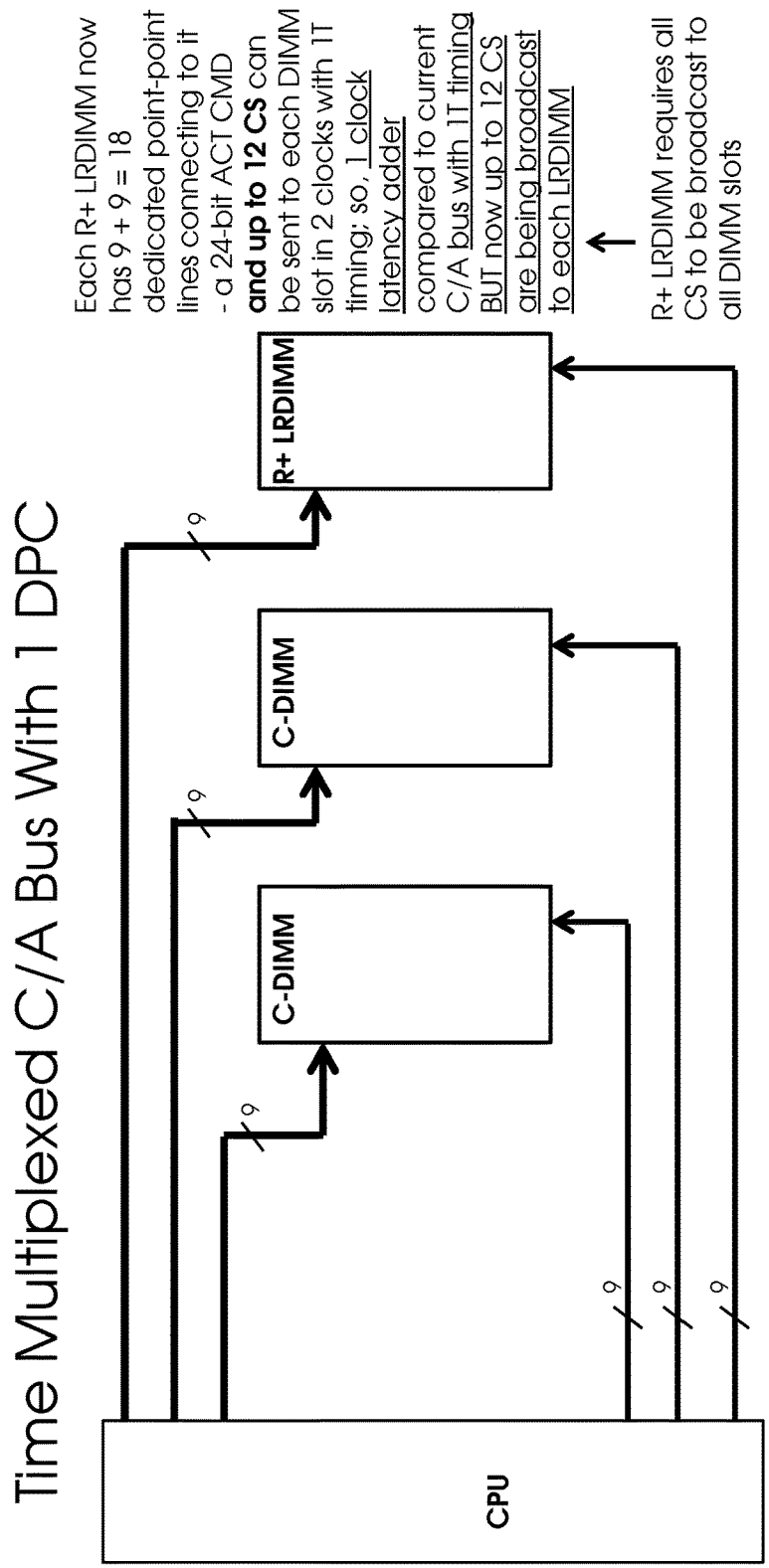
FIG. 8 shows how the third solution would be configured with one DIMM per channel (DPC).

FIG. 8 shows how the third solution would be configured with one DIMM per channel (DPC). The first two sockets would contain continuity modules (C-DIMM), which are used to connect the DQ links from these sockets to the third socket. The controller could optionally disable the transmission of CA information to the two unused sockets.

Figure 9:
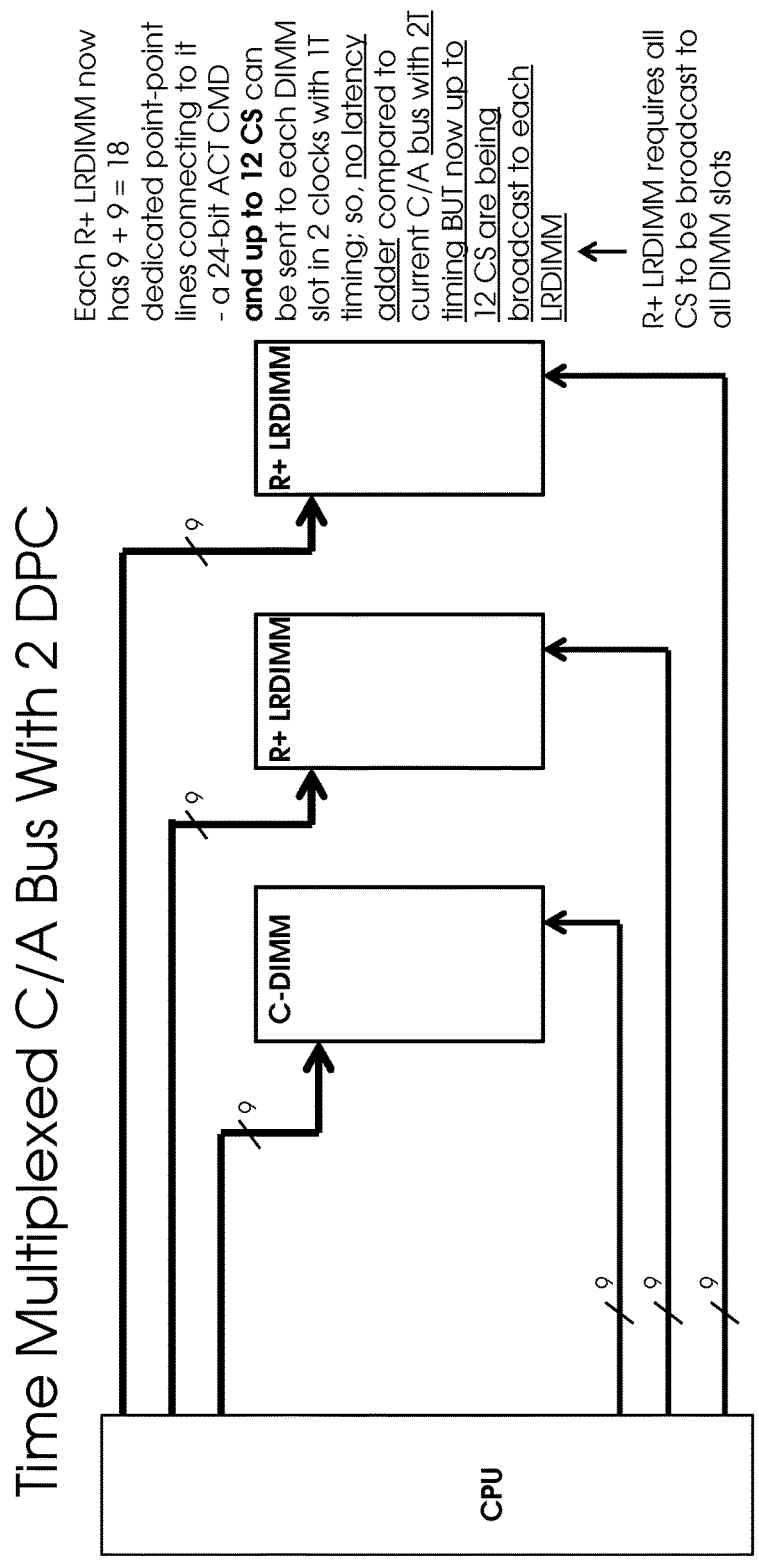
FIG. 9 shows how the third solution would be configured with two DIMMs per channel (DPC).

FIG. 9 shows how the third solution would be configured with two DIMMs per channel (DPC). The first socket would contain continuity modules (C-DIMM), which is used to connect the DQ links from the first sockets to the second and/or the third sockets, and the second and third sockets would contain DIMMs. The controller could optionally disable the transmission of CA information to the unused socket.

Figure 10:
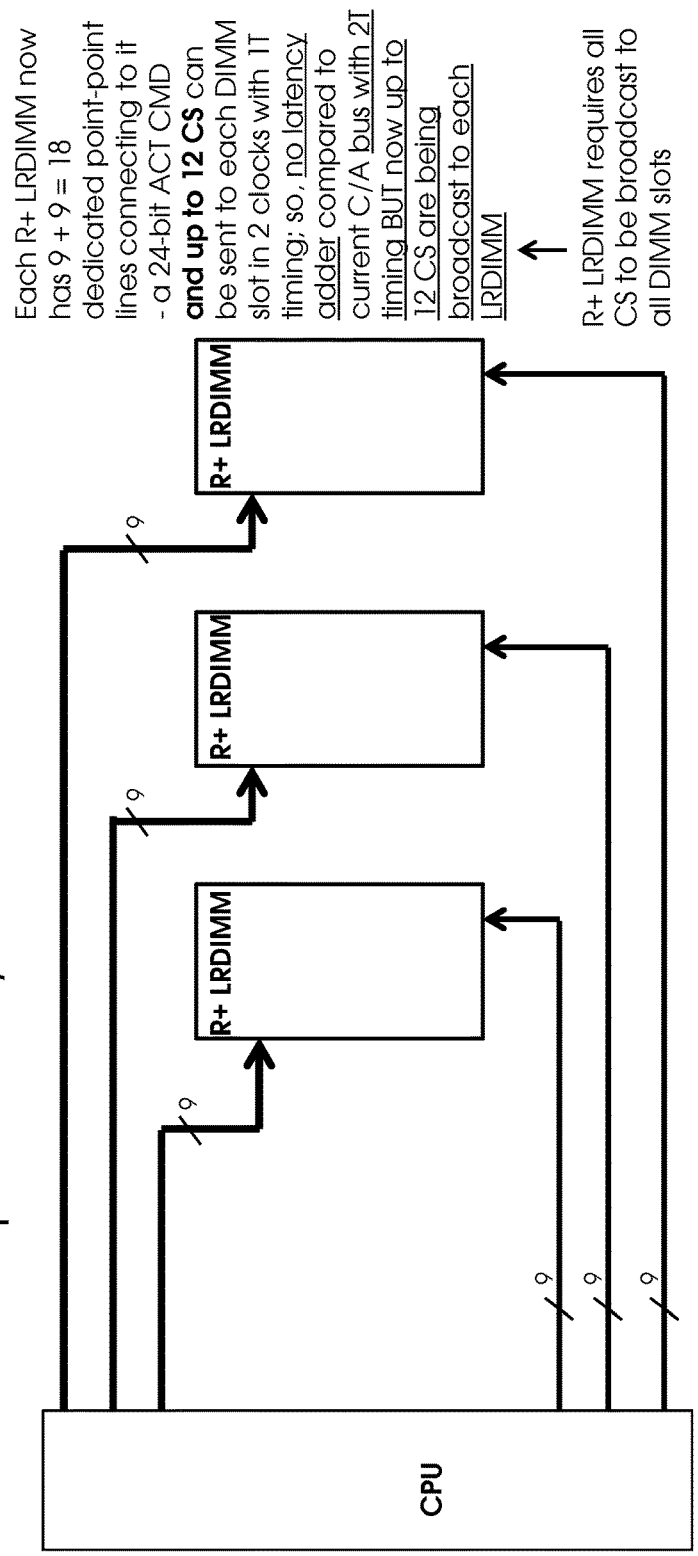
FIG. 10 shows how the third solution would be configured with three DIMMs per channel (DPC).

FIG. 10 shows how the third solution would be configured with three DIMMs per channel (DPC). The first, second and third sockets would contain DIMMs.

FIG. 11 shows details of the physical connection topology of a modified (improved) memory system 500. This is called an "M8" system, reflecting the fact that it is modified from the standard system, and there is an eight-die TSV stack at each of the 36 device sites 501 on each module. Like the standard system, it uses load-reducing buffer components (DB 525 and RCD 520). In other embodiments, the TSV stack may include more or fewer dies.

The configuration of FIG. 11 represents a maximum capacity system. In one embodiment, it includes memory components with an ×4 DQ width (plus the two DQS timing signals). Each memory module 502 includes 36 device sites 501 arranged as two module ranks with 18 device sites 501 each. Each rank can transmit or receive on 72 DQ links and 36 DQS links.

The eight-die TSV stack may include one memory component configured as a master. The master connects to the secondary DQ and CA links and steers them onto a set of DQ and CA links (internal to the stack) which connect to the other seven memory components in the stack.

The stack of memory devices 501 are individually selected as eight sub-ranks. This selection mechanism is slightly different from the one used to select the two module ranks, and will be described further below.

The RCD 520 and DB 525 components steer the primary CA and DQ signals from the controller (via the motherboard) onto the secondary CA and DQ signals on each module.

Each DB component connects to two primary DQ nibbles (×4 DQ groups) and two secondary DQ nibbles. Each secondary DQ nibble connects to two TSV stacks (the first rank and second rank).

The memory system may include at least two classes of links: the bussed (multi-drop) links and the point-to-point links. Unlike the standard system L8, virtually all of the primary CA signals are point-to-point. This permits the signaling rate to be increased.

In FIG. 11, the CKE link uses a multi-drop topology and connects to each module. This may be done as each memory access may require action from each of the RCD components 520 in the three modules. Secondary CKE signals can be created on each module to enable the appropriate components.

The CKE information may be signaled as an edge (causing the interface clock logic to be enabled) rather than a narrow pulse. Also the enable time may include the transport delay on the primary link as well as circuitry delay in the RCD component 520. Consequently, the CKE link may not be as sensitive to the connection topology as the other CA signals.

Nevertheless, in some embodiments, the CKE link may be implemented with a point-to-point topology (with three copies of the signal) for better signal integrity.

Alternatively, if there are additional controller pins available, a second multi-drop link could be added, with the two primary CKE links passing directly through the RCD component 520 onto the secondary CKE links. This would allow direct control of the clock enable for front and back ranks of the three modules.

The configuration may also include a bussed clock link CK±(not shown). This link is typically differential (with a true and complement signal).

In some implementations, the clock link may be implemented with a point-to-point topology (with three copies of the signal) for better signal integrity.

The remaining links may use a point-to-point topology, and connect between one controller IO pin and one module IO pin.

As above, although the left-most component is labeled "controller 510" in FIG. 11, the block is intended to include any component containing the logic blocks needed to interface to with the other components of the memory system.

In FIG. 11, the primary links connect between the controller 510 and each of the three memory modules 502. In one embodiment, the 15 primary links per module include:
  Auv[8:0]—address and command
  BAuv[0]—bank address
  BGuv[0]—bank group address
  ACTPAR—activate command and parity error
  CSuv[2:0]—encoded chip-select (selects 1-of-48 ranks and sub-ranks)

The standard system may use 2T-SDR CA timing because of the multi-drop CA topology, where one CA bit is transferred across one link in every two clock cycles.

In contrast, the modified system may use 1T-SDR CA timing because of the point-to-point CA topology, where one CA bit is transferred across one link in every clock cycle. Consequently, only about half as many CA links need to connect to each module as in the standard system. Other nomenclature for "1T-SDR" and "2T-SDR" are, respectively, "1N-SDR" and "2N-SDR."

Each 30-bit CA word may require two clock cycles for transport on 15 primary links. The timing for this will be described below with respect to FIG. 15.

FIG. 11 thus includes a total of 3*15+1=46 primary CA interface pins (and links), not including the clock.

Normally, the same information is transmitted on the three sets of CA/CS links. However, in some embodiments, different chip-select information is sent to the different modules. This implementation option might result in a benefit in the RCD as described below with respect to FIG. 14.

The usage of 46 primary CA interface pins may be compatible with the interface pin constraint of most memory controllers. In one embodiment, the interface logic may be modified to modally accommodate either standard signaling or the different CA link formatting for the modified system without adding CA links.

Returning to FIG. 11, each module receives from (and transmits to) the primary DQ signals with the nine DB components 525. There are 18 primary DQ "nibbles" (4 DQ link plus a differential DQS±timing link). Each DB component connects to a pair of primary DQ nibbles.

Each DB 525 also connects to a pair of secondary DQ nibbles on the module. Each DQ nibble connects to two device sites, with each device site belonging to one of the two module ranks.

Each device site of the system of FIG. 11 contains a TSV stack with eight memory die. The bottom-most die is the master device, connecting to the secondary DQ and secondary CA signals. The master device re-transmits (or re-receives, in the case or DQ read) the secondary links onto a set of links internal to the TSV stack assembly.

The TSV stack thus contains eight sub-ranks of devices (within each of the module ranks). Each module rank includes 18 device sites 501, each containing one TSV stack. The module in FIG. 11 has two module ranks, giving a total of 36 device sites.

Although not shown in FIG. 11 (but shown in FIGS. 7 and 8), another modification may be made to the DB component 525 relative to the standard system in which a private bus 530 for transferring data between DB components 525 is added.

Returning to FIG. 11, each module receives the 15 primary point-to-point CA signals and the multi-drop CK and CKE signals with the RCD component 520.

In one embodiment, the following 12 primary links are re-transmitted onto the following 24 secondary links (using the clock for receiving/transmitting). In other embodiments, other primary and secondary links may be transmitted.
  Primary:
  Auv[8:0]—address and command
  BAuv[0]—bank address
  BGuv[0]—bank group address
  ACTPAR—activate command and parity error
  Secondary:
  A[17:0]—address and command
  BA[1:0]—bank address
  BG[1:0]—bank group address
  ACT—activate command
  PAR—parity error control The CSuv[2:0] encoded primary signals are received on a primary CS signal line 591 and are retransmitted as two groups of secondary chip-select signals on secondary CS signal lines 592. The primary and secondary signals are both able to select 1-of-6 module ranks and 1-of-8 sub-ranks within each module rank.

The CSu[2:0] field is decoded into these secondary links:
  CSf[5:0]—decoded (one-hot) chip-select (selects 1-of-6 front device sites)
  CSb[5:0]—decoded (one-hot) chip-select (selects 1-of-6 back device sites)

The CSv[2:0] field is copied onto these secondary links:
  CSe[2:0]—encoded chip-select (for 8 sub-ranks)

The details of the primary and secondary chip-select signals will be described further below with respect to in FIGS. 7 and 8.

The final group of secondary links includes the clock enable and output termination signals:
  CKE[1:0]—clock enable (each connected to one of two ranks of devices)
  ODT[1:0]—output device termination enable (each connected to one of the ranks of devices)

In some embodiments, these signals are created by the RCD 520 from the primary CKE and CS signals (and from the command field in the primary CA signals). This may be in contrast to other embodiments (e.g., the standard system described above) in which the CKE and ODT signals are received and steered appropriately by the RCD 520.

The secondary CKE and ODT are connected to the two ranks of device sites (18 sites on the front of the module and the 18 sites on the back of the module). In other embodiments, discussed below with respect to FIG. 19, finer selectivity may be used.

In one embodiment, the RCD 520 is disposed in the center of the module. Thus, it may be advantageous for it to drive two sets of secondary CA signals 592 (one to the left and one to the right) in order to save routing area on the module.

FIG. 12 shows a section drawing that is extracted from FIG. 11. This section includes a 6-nibble "group" (⅓ of the 18 DQ nibbles) plus the RCD on each module. In a similarly manner to how FIG. 4 may be representative of the system of FIG. 2, the section of FIG. 11 may be representative of the system of FIG. 11.

Underneath the section drawing is a simplified configuration drawing according to one embodiment. The configuration drawing shows the connections of the individual DQ nibble groups and the CA links to the three modules. Each module is shown with pairs of device sites collapsed to a single site.

The configuration drawing illustrates the mapping of an example read access. As previously discussed, in the standard system this involves accessing the DRAMs of a single sub-rank of a single rank on one module, and transferring the read data across the corresponding multi-drop DQ links to the controller (CTRL) interface.

In the modified system in FIG. 12, within the 6-nibble section, two DRAMs on each of the three modules are accessed as a logical rank. The DB components steer the data from the DRAM to the proper primary links (e.g., over internal data switches on the accessed DBs, and in two cases in the example shown (nibbles c and d) are transferred between adjacent DBs on a module private bus).

In the lower left logical rank example the DRAMs are labeled with the letters {a,b,c,d,e,f}, and the interface pin on the controller component (CNTL) is labeled with the corresponding letter to make the data steering more clear.

At the right of the configuration drawing is a motherboard wiring diagram according to one embodiment, which has been extracted. This diagram illustrates an embodiment in which every primary DQ link and every CA/CS link (except CK and CKE) has a point-to-point topology.

The center diagram at the bottom of FIG. 12 shows how the three DB components in each 6-nibble group connect laterally. This allows various steering cases to be performed (e.g., the cases summarized in FIG. 13a).

FIG. 13a summarizes the possible logical rank transfer cases for a read access. Condensed notation from FIG. 12 is utilized here. Only a single 6-nibble section is shown for each transfer, since the other two 6-nibble groups may be operated identically (same motherboard wiring pattern and same pattern of chip-select signals).

The cases are organized according to the number of modules present in the system. The top row has the three module cases, the middle row has the two module cases, and the bottom row has the one module case. In one embodiment, there are three sockets present, so the one- and two-module cases may require continuity modules to be inserted in the empty sockets, as shown.

Starting in the bottom row of FIG. 13a, the single case for a system with one module is shown. The module is placed in the right-most socket, and continuity modules are placed in the center and left-most sockets.

In the one-module case, an access is performed using a DRAM from each device site on the single module. There are two ranks and 8 sub-ranks available, and these are chosen using the CSf[5:0], CSb[5:0], and CSe[2:0] chip-select signals as previously discussed (a table for the CSf[5:0] and CSb[5:0] cases is shown in FIG. 14).

The motherboard wiring pattern and the continuity module design can ensure that no DQ signal flows through more than one continuity module.

The two- and three-modules cases as illustrated utilize DRAMs in specific access patterns on each module for each access.

The center row shows the two-module cases. In each case, for each logical rank each module accesses every second device site pair in a corresponding access pattern. This allows any device site pair to be selected using one case or the other.

Likewise, in the top row the three module cases are shown. In each case, for each logical rank each module accesses every third device site pair in a corresponding access pattern. This allows any device site pair to be selected using one of the three cases.

FIG. 13b illustrates another transfer case configuration in which each slot uses the same access pattern. In FIG. 13b, the access pattern (and decoding table) is independent of slot, but still dependent on the number of slots populated. Other transfer case configurations are possible. FIG. 14 summarizes the decoding table needed to implement the example transfer cases from FIG. 13a in which the access pattern for a memory module is dependent on both the particular slot in which the memory module is places and the number of memory modules in the memory system.

In one embodiment, there are six bits of encoded chip-selection information for each CA word. The first three bits (shown as CSu in FIG. 15) select one of the six logical ranks in the system. The second three bits (shown as CSv in FIG. 15) select one of the eight sub-ranks associated with the selected logical rank.

The decoding table of FIG. 14 does not include CSv information as the sub-rank selection may be handled within each TSV stack in some embodiments as described above, with the CSu information selecting the proper TSV stacks.

The CSu decoding table shows how the eight combinations of CSu[2:0] are interpreted by the RCD components of each module according to one embodiment. The table entries are only showing the decoding for a single 6-nibble group (as in FIG. 12). The other two 6-nibble groups can use the same decoding table. In another embodiment, the other groups may use a different decoding table.

The six tables correspond to the six transfer cases shown in FIG. 13a. The arrangement is the same, except the one-module-slot-z case has been moved from the lower left to the lower right of FIG. 14.

Starting with this one module case in the lower right table of FIG. 14, it can be seen that CSu[2:0] cases of "6" and "7" indicate "no selection". This encoding is used to indicate that no command is present. In FIG. 14, "no operation" is equivalent to "no selection."

Alternatively, in other embodiments, the "7" encoding could be used for "no selection", and the "6" encoding reserved for some future purpose, such as "select all".

In the one module case, the CSu[2:0] cases of "2", "3", "4" and "5" are not used—there are not enough ranks present to necessitate their use.

The CSu[2:0] case of "0" indicates that the six device sites on the front of the module are to be selected. The CSu[2:0] case of "1" indicates that the six device sites on the back of the module are to be selected.

The two module case uses the two tables on the lower left and lower center of FIG. 14. One table is for slot y and the other is for slot z. As noted above, slot x may contain a continuity module in the two module case.

CSu[2:0] cases of "6" and "7" indicate "no selection", and can be used to indicate that no command is present.

In the two module case, the CSu[2:0] cases of "4" and "5" are not used—there are not enough logical ranks present to necessitate their use.

In the slot y position, the table entries have the following interpretation according to one embodiment:

The CSu[2:0] case of "0" indicates that the "b", "d" and "f" device sites on the front of the module are to be selected.

The CSu[2:0] case of "1" indicates that the "b", "d" and "f" device sites on the back of the module are to be selected.

The CSu[2:0] case of "2" indicates that the "a", "c" and "e" device sites on the front of the module are to be selected.

The CSu[2:0] case of "3" indicates that the "a", "c" and "e" device sites on the back of the module are to be selected.

In the slot z position, the table entries have been rotated so that they complement the slot y cases. This is done so that every device site can be accessed with exactly one CSu[2:0] value.

The three module case uses the three tables on the upper left, upper center, and upper right of FIG. 14. One table is for slot x, one table is for slot y and the last is for slot z.

In the slot x position, the table entries have the following interpretation:

CSu[2:0] cases of "6" and "7" indicate "no selection", and can be used to indicate that no command is present.

The CSu[2:0] case of "0" indicates that the "c" and "f" device sites on the front of the module are to be selected.

The CSu[2:0] case of "1" indicates that the "c" and "f" device sites on the back of the module are to be selected.

The CSu[2:0] case of "2" indicates that the "b" and "e" device sites on the front of the module are to be selected.

The CSu[2:0] case of "3" indicates that the "b" and "e" device sites on the back of the module are to be selected.

The CSu[2:0] case of "4" indicates that the "a" and "d" device sites on the front of the module are to be selected.

The CSu[2:0] case of "5" indicates that the "a" and "d" device sites on the back of the module are to be selected.

In the slot y and slot z positions, the table entries have been rotated so that they complement the slot x cases. This is done so that each device site can be accessed with exactly one corresponding CSu[2:0] value.

Other, equivalent encoding combinations are possible for these tables. These tables have been designed to match the example motherboard wiring from FIGS. 5 and 6.

In one embodiment, the same decoding table is used for each slot position, and the controller logic is designed to use a different CSu[2:0] value for each module. This may have the benefit that the RCD decode logic would not need the {x,y,z} slot position information. The placement of the proper CSu values in the three CAuv/CSuv command words would be handled by the logic in the controller component.

The drawing on the far right of FIG. 14 shows an example of the decode logic 550 that could be used by a decoder to implement the tables in FIG. 14. Other logic could be used to implement the tables in FIG. 14 or other decoding table embodiments. The decode logic 550 shown may be replicated for each of the 12 CS output signals (CSf[5:0] and CSb[5:0]). The CSf[a] logic is shown as an example.

The CSu[2:0] is received from the controller, and goes through a set of six "AND3" gates to determine the selection case. These cases correspond to the positions of "1" in the CSf[a] row in the six decode tables in FIG. 14.

Each of the six AND3 gates is then routed through a 6-to-1 multiplexer. This multiplexer is controlled by logic which interprets the slot position and number of modules—these two values may be determined at initialization and loaded into a slot register 552 and population register 551.

The "logic" block converts the two bit slot value and two bit module value into one of the six configuration cases (from FIG. 13a or 7b) and steers the AND3 gate to the CSf[a] output signal.

Thus, the decode delay from the CSu[2:0] inputs to the signals CSf[5:0] and CSb[5:0] outputs may be an AND3 delay plus a MUX6 delay and may not significantly add decoding delay to the system. Note that the MUX selection is fixed when the module configuration is fixed, and thus the interpretation/MUX addressing logic places no additional time constraint at the time CSu is decoded.

FIG. 15 shows some details of a first embodiment (M8a) of the timing for the memory system of FIG. 11.

The first set of waveforms show the primary signals CAuv and CSuv. Each command 561, 562 includes 30 bits, with a respective 15-bit half-word Au/CSu, Av/CSv transferred in each of two consecutive clock cycles. The "u" and "v" suffixes distinguish the two half-words.

The CSu[2:0] field may be time critical, and, therefore is included as part of the first half-word in some embodiments. FIG. 21 will discuss some other command format tradeoffs.

After the two half-words have been received by the RCD, in one embodiment, Au, Av, and CSv are retransmitted to the appropriate DRAMs as a single 27-bit parallel word on the secondary CA with a two-clock cycle duration.

In one embodiment, the information from the CSu field is not included in this parallel word. Rather, the RCD decodes the CSu field to give the 12 CSf/CSb chip-select values. The appropriate decoded ones of these chip-selects CSd may be asserted during the second clock cycle (and are de-asserted high during the first clock cycle). This timing provides about 2.5 clock cycles to perform the CSu-to-CSf/CSb decode (as described in FIG. 14).

If the command is a column write access, then the ODT of the rank opposite the selected rank (front vs. back) may be asserted, helping to dampen reflections on the secondary DQ links.

FIG. 16 shows some detail of one embodiment of an RCD component for the M8a system of FIG. 15.

The CSuv and CSuv links are received on two successive rising edges of the CK link using two sets of registers on the RCD. 27 bits of the two 15 bit command half-words are retransmitted as a parallel word on the secondary CA links for two successive clock cycles.

The CSu[2:0] signals are decoded by the "decode" block of the RCD, and the 12 CSf/CSb chip-selects are asserted during the second clock cycle. Logic and register state in the decode block may also pulse the appropriate CSf/CSb chip selects during the second cycle of the parallel CA word. The decode block also determines whether an ODT signal is to be asserted for a write command—this decode block output experiences a programmable CA-WD delay and is then also buffered for output to the DRAMs/buffers during a write data reception window.

FIG. 17 shows some details of a second embodiment (M8b) of the timing for the memory system of FIG. 11.

The first set of waveforms show the primary signals CAuv and CSuv. Each command includes 30 bits, with a respective 15-bit half-word Au/CSu, Av/CSv transferred in each of two consecutive clock cycles. The "u" and "v" suffixes distinguish the two half-words.

The CSu[2:0] field may be time critical, and, in some embodiments, is included as part of the first half-word. FIG. 21 will discuss some other command format tradeoffs.

After the two half-words have been received by the RCD, in one embodiment, Au, Av, and CSv are retransmitted to the appropriate DRAMs as a single 27-bit parallel word on the secondary CA with a two-clock cycle duration.

In some embodiments, the information from the CSu field is not included in this parallel word. However, it may be handled differently in this M8b system (relative to the M8a system of FIG. 15).

The CSu[2:0] field may be transmitted on a private control bus from the RCD component to the DB components. The CSu[2:0] field is then decoded on each DB for the nibbles assigned to that DB (e.g., using a portion of the FIG. 14-like decoding with each DB knowing its position on the module) to give the 4 CSf/CSb chip-select values for the device sites connected to that DB.

In one embodiment, the device chip-selects are asserted during the second clock cycle (and are de-asserted high during the first clock cycle). This timing gives about 1.5 clock cycles for the DBs to perform the CSu-to-CSf/CSb decode (as described in FIG. 14).

Thus, in the M8a case, the RCD performs the CSu-to-CSf/CSb decoding, but in the M8b case, each DBs performs a respective portion of the decoding.

FIG. 18 shows some detail of an embodiment of the RCD and DB components for the M8b system of FIG. 17.

The CSuv and CSuv signals are received on two successive rising edges of the CK link using two sets of registers on the RCD. 27 bits of the two 15-bit command half-words are retransmitted as a parallel word on the secondary CA links for two successive clock cycles.

The CSu[2:0] signals are retransmitted across a private control bus to the DB components, where they are decoded by the "decode" block of each DB given that DB's position on the module, and the respective 4 CSf/CSb chip-selects for the device sites connected to that DB are asserted during the second clock cycle of the RCD CA transmission.

FIG. 19 shows an overview of an embodiment of a modified system. A controller component is shown along the bottom of the figure, and three connected memory modules are illustrated above the controller component. In other embodiments, there may be more or fewer memory modules.

Shading is used to indicate the DRAM sites which are selected by the CSu[2:0] value of "000". In the embodiment detailed above, this selects a respective one-third of the sites on the front of each module—all sites on the rear remain unselected.

The standard controller CA interface pin budget is summarized under the "Standard" heading. This standard interface has 46 CA pins (not including the clock pins) in one embodiment.

The modified controller CA interface pin budget is summarized to the right of the "Standard" budget. This modified interface also has 46 CA pins (not including the clock pins) in one embodiment, with 15 dedicated to each slot.

Both interfaces of the illustrated embodiment can access up to 48 ranks, with each rank containing 18 devices with an ×4 width.

In one embodiment, the modification to the interface logic on the controller and the module RCDs to support both of these operating modes may be modest. The internal memory controller may transmit the CA information out in two slightly different sequences, depending on whether standard mode or point-to-point mode is enabled. A control register setting may indicate which motherboard environment the controller is in as described further with respect to FIG. 51.

Likewise, an improved memory module can be designed to operate in the standard mode or the improved mode. In a standard mode, 35 standard signals are received at 35 CA pins on the RCD with 2T timing. In a point-to-point mode, a defined 15-pin subset of the 35 CA pins receives the 1T point-to-point communications.

FIG. 20 shows an extended timing example of the primary and secondary CA signals for an embodiment of a modified system.

The primary links include CK, CKE, CSuv[2:0] and CAuv[11:0]. The CSuv[2:0] and CAuv[11:0] carry a command half-word in each clock cycle. The two half-words are designated with "g" and "h" suffixes: CSg/CAg and CSh/CAh.

FIG. 20 shows an initial period of commanded no operations, with the CSuv[2:0] link signals containing "111" indicating "no selection".

The cycle with the first shaded CSg/CAg command half-word is detected because the CSuv[2:0] contains a value other than "111".

The logic in the RCD can interpret the CSg/CAg half-word and the following CSh/CAh half-word as a complete command word. In some embodiments, even if CSh contains "111" (designating sub-rank "7" in a TSV stack), the RCD logic can interpret it correctly as the second of two half-words.

The RCD logic can check the CSuv[2:0] value in the cycle after the initial CSh/CAh command half-word. This is a value other than "111" in FIG. 20, so the RCD may interpret the CSg/CAg half-word and the following CSh/CAh half-word as another complete command word.

The RCD logic can check the CSuv[2:0] value in the cycle after the second CSh/CAh command half-word. This is the value "111" in FIG. 20 indicating "no-selection", so no command is formed. The CSuv[2:0] value can be checked in each subsequent cycle.

The RCD component drives the valid command words on the secondary links in the lower part of FIG. 20. The "$t_{BUF}$" delay that is shown is the 2.5 $t_{CYCLE}$ available for decoding the primary CSu[2:0] field into the CSf[5:0]/CSb[5:0] secondary chip-select signals.

This 2.5 $t_{CYCLE}$ delay may be the same as that shown in FIG. 15, and is measured from the rising clock edge that samples CSu[2:0] to the falling clock edge that begins asserting the CSf[5:0]/CSb[5:0] signals. There may be some skew between the primary CK received by the RCD and the secondary CK transmitted by the RCD, but this is not illustrated by the "$t_{BUF}$" delay of FIG. 20.

The first command is driven for two clock cycles on the secondary CA[26:0] links. The chip-select links CSf[c,f] are asserted low in the second cycle.

The second command is driven in the next two clock cycles on the secondary CA[26:0] links. The chip-select links CSb[a,d] are asserted low in the second cycle.

In the example of FIG. 20, this second command is a column write access.

In one embodiment, the selected DB turns on its output termination device (ODT) on its primary DQ links via a private control signal from the RCD (not shown in FIG. 20).

In one embodiment, the selected DRAM may automatically turn on its output termination device (ODT) on its secondary DQ links in response to the write command received on the CA[26:0] secondary links from the RCD. This signaling is shown in FIG. 20 with the ODTb waveform (note that the ODTb may be not asserted, but the DRAM may perform the ODT enable as if ODTb had been asserted).

In one embodiment, the DRAM in the opposite rank from the one that is selected by the CSf/CSb chip-selects may turn on its output termination device (ODT) on its secondary DQ links via the ODTf signal from the RCD. This is shown in FIG. 20 with the ODTf waveform.

FIG. 21 shows some details of the physical connection topology of an improved memory system with two stacked packages per device site. This is called an "M2" system, reflecting the fact that it uses load-reducing buffer components (DB and RCD), and there is a two-package stack at each of the 36 device sites on each module. This is a modification of the L2 standard system described in FIG. 3.

The modified M2 configuration represents a maximum capacity module which utilizes package stacking (in contrast with the TSV/die-stacking of the M8 configuration). In one embodiment, the memory module includes memory components with an ×4 DQ width (plus the two DQS timing signals). Each module includes 36 device sites arranged as two module ranks with 18 device sites each per rank pair. Each rank may transmit or receive on 72 DQ links and 36 DQS links.

Each two-package stack includes two identical memory components. In other embodiments, the stack may include different memory components or more than two memory components. Both components couple to all secondary DQ and CA signals except for the CS chip-select signals. In one embodiment, there is a separate chip-select link for each of the two components in each package stack.

There are four secondary chip-select links per front/back pair of device sites. When one of the four is asserted, one of the corresponding four devices is selected. Each rank includes 18 memory components, each connecting to a secondary DQ nibble (×4 DQ plus the two DQS timing signals).

The device sites may be combined as in the modified M8 systems using decode tables like the one in FIG. 14. In one embodiment, there may be a total of 24 CSf/CSb chip-select signals per module.

This may be signaled using an RCD that drives 48 chip-select links (24 left and 24 right). An alternative is to use the method of the modified M8b system as described below.

One embodiment of the modified M2 system is similar to the modified M8b system in that the CSu[2:0] chip-select field is not decoded in the RCD component, but instead in each of the DB components. The RCD may still interpret each CSu[2:0] to check for "no selection" to know whether the first half-word of a command is being received.

The modified M2 controller may also send a bit CSv[0] from the chip-select field normally used for sub-rank selection. In one embodiment, the CSv[2:1] bits would not be used, since there is no sub-rank selection as within a TSV stack. In other embodiments, the CSV[2:1] bits may be used for another purpose.

The (CSu[2:0] +CSv[0]) specify the twelve decode combinations for selecting the proper set of devices on the module. Each DB can decode the combinations that affect the four device sites it controls for each nibble, and can drive a total of eight chip-select signals (8xCSf/CSb) for its two controlled nibbles.

In one embodiment, the half-word format of the commands in the modified M8 systems includes the CSv[2:0] field in the second cycle of the command, introducing an extra cycle of latency in the decode path (upper right of FIG. 21).

In other embodiments, this extra cycle of latency can be eliminated by adjusting the format (middle right of FIG. 21) such that CSv[2:0] field is swapped with the A[11:9] field, so that both CSu[2:0] and CSv[2:0] are available in the first cycle.

Other field-swapping optimizations can be made, depending upon how much interpretation of the command word by the RCD and DB is performed in particular embodiments.

FIG. 22 shows detail for the domain-crossing logic of the DQ paths of the memory system according to one embodiment. The DQ path includes the controller component on the left, the DB and RCD components on a module in the center, and the DRAM components on the right.

The CAuv, CSuv, CKE and CK primary links connect from the controller at the lower left to the RCD component at the lower middle of FIG. 22. They are received by the RCD and are retransmitted on the secondary links on the module.

The secondary CA, CS, CKE, ODT, and CK links connect to the DRAMs directly. Some control information for each CA/CS command can also be passed on a private bus from the RCD to the DB components to coordinate the data steering. This private bus is not shown explicitly in FIG. 22, but is illustrated in FIGS. 10 and 12.

Alternatively, some (or all) of the secondary CA, CS, CKE, ODT, and CK links can be connected to the DB component and retransmitted to the DRAMs on tertiary links. This option is not shown in FIG. 22, but is illustrated in FIGS. 12 and 15.

The controller component, the RCD component, and the DB component may all utilize PLL (phase-locked-loop) or DLL (delay-locked-loop) techniques to minimize skew between their internal clock trees and the timing signals received and transmitted on the links.

However, in some embodiments, the timing signals may accumulate delay as they propagate on the links between the components. When two clock domains interact, they can have relative skew due to the unequal propagation paths their timing signals have traveled. This relative skew can be accommodated, in some embodiments, by adding a complementary (inverse) delay to a signal passing from one domain to another so the delay sum is constant.

Each DB component has two DQ paths, each connecting to a DQ link group on the primary side and a DQ link group on the secondary side. In one embodiment, each secondary link group (4xDQ and 2xDQS) connects to an ×4 device site with one to eight DRAMs. Other embodiments could use wider DRAMs, with two or more DQ link groups connecting to the same device or device site.

An example write (WR) path begins in the controller component on the left side of FIG. 22. The write data and its timing signal are transmitted from the controller clock domain.

They are received and sampled on the DB. The domain crossing blocks may perform phase and cycle adjustment so the write data can be transferred to the internal clock domain of the DB component.

From there, the write data is retransmitted to the DRAM, where is it is received and sampled. The skew between the write data and the CK domain on the DRAM may be relatively small because both signals have travelled on similar paths from the clock domains of the DB and RCD. As a result, the DRAM may not include the range of domain-crossing adjustment used by the DB in some embodiments.

An example read (RD) path begins in the DRAM component on the right side of FIG. 22. The read data and its timing signal are transmitted from the DRAM clock domain.

They are received on the DB. The domain crossing blocks can perform phase and cycle adjustment so the read data can be transferred to the internal clock domain of the DB component.

From there, the read data is retransmitted to the controller, where is it is received. The skew between the read data and the clock domain on the controller may be large because of the large round trip delay to the DRAM and back. Thus, in some embodiments, the domain crossing blocks can perform phase and cycle adjustment so the read data can be transferred to the internal clock domain of the controller component.

FIG. 23a shows some details of read/write paths in a DB component of an improved memory system. This enhancement of the DB component in the improved memory system as opposed to the standard memory system is shown with dashed lines. It allows WR data to be transferred from either of the two primary link groups to either of the two secondary link groups. It also allows RD data to be transferred from either of the two secondary link groups to either of the two primary link groups.

In one embodiment, the enhancement includes a 2-to-1 multiplexer in front of the domain crossing blocks of each read and each write path (four total). In one embodiment, each direct path and each alternate path has its own set of delay values (e.g., DLY0.5 and DLY123 in FIG. 24) for the various domain crossing combinations. This will be described further below with respect to FIG. 24.

FIG. 23b shows some details of a lateral bypass path of a DB component of an improved memory system. The lateral bypass paths for read and write data were described briefly above with respect to FIG. 12.

Each of the primary multiplexers in FIG. 23a is given a third and fourth input. This allows read or write data from on a DB to be transferred to an adjacent DB.

In some embodiments, the lateral transfers between DB components are only used in a few cases of three module systems (see FIGS. 7a and 7b). In the 18 four-bit accesses between controller and DRAM described above, only six (two per module) perform the lateral transfer; the other 12 can be managed with the multiplexer options in FIG. 23a.

The bypassing options in FIG. 23b include cases which are not needed for the cases in FIGS. 7a and 7b. In some embodiments, unused multiplexer inputs are removed for unused paths.

In one implementation, the bypassing logic operates in the clock domain of the DB. The clock domains of adjacent DB components may have relatively little skew. Thus, in some embodiments, the lateral bypassing paths do not include the full domain-crossing logic (detailed in FIG. 24).

In one embodiment, each direct path, each alternate path, and each bypass path that does use domain-crossing logic has its own set of delay values for the various domain crossing combinations. This will be described further below with respect to FIG. 24.

FIG. 24 shows detail for the domain-crossing logic of the DB component. The top diagram shows the write (WR) and read (RD) paths for the data group—4xDQ and 2xDQS.

The primary links and the secondary links connect to the bidirectional input-output pads, but inside the buffer the WR and RD paths are unidirectional. In other embodiments, the WR and RD paths may be combined and/or bidirectional.

An example unidirectional WR path is shown in the lower FIG. A unidirectional RD may be substantially similar with differences as described below.

In the lower diagram, the DQS link is received and gated with a signal called DQS-EN. The DQS-EN is generated in the clock (CK) domain of the buffer and turns on in response to a column write command.

The gated DQS loads two registers (on rising and falling DQS edges) with write data on the DQ pads. These registers are labeled "sampler" in FIG. 23. The write data is in the DQS domain.

In one embodiment, the gated DQS samples the internal clock and the 90° delayed clock on each rising edge of DQS during a write transfer. The last sampled values are SKP[1:0], and can be used by the delay adjustment logic (Delay-Adj-Logic).

The sampled data is now passed to registers in the CK domain. For the minimum delay case, the data may pass through the multiplexer in the phase adjustment block and the multiplexer in the cycle adjustment block, and be clocked by the two registers in the cycle adjustment block.

The registered data is transmitted with the output multiplexer and driver, and may be aligned to the CK domain of the DB component. An enable signal (OUT-EN) is generated in the CK domain and turns on the output driver.

The multiplexers in the phase adjustment and cycle adjustment blocks can be set to other selection values to provide more delay in some embodiments, allowing the Delay-Adj-Logic block to automatically track the DQS timing drift so that the overall timing of the system is constant.

The register placement in the phase adjustment block and cycle adjustment block of FIG. 24 is but one circuit embodiment. In another circuit embodiment, the registers may be broken into half-latches to improve the timing margin.

A similar circuit may be used for the read path. In one embodiment, a difference is that the DQS timing signal is center-aligned with the data (as it is with the write path), but is edge-aligned with the data. As a result, a 90° delay may be inserted into the path of the gated DQS before it samples the read data. Also, there may be no 90° delay in the path of the CK used for the output multiplexer for DQS. This may also result in the SKP[1:0] from sampling CK with the gated DQS and the gated DQS being delayed by 90°.

In one embodiment, the 90° delay is implemented by creating a mirror (copy) of the delay elements used by the PLL or DLL for the DB component.

FIG. 25 shows some details of a first embodiment of write path timing in a DB component. The write path is illustrated in FIG. 24. The waveforms of six internal nodes are shown in the accompanying timing diagram, along the primary data input and secondary data output signals.

Each primary data link DQIN is sampled by the primary timing link DQSIN at the rising and falling edges, resulting in two sampled values Y and Z held on the DQY0 and DQZ0 register outputs in the DQS domain.

As noted above, the DQS-EN signal is formed in the CK domain and gates the DQSIN signal. In some embodiments, the DQS-EN signal may be extended if the data transfer is longer.

This example assumes the DQS and CK signals are aligned so the SKP[1] value sampled from CK+90° by DQS is low. The DLY0.5 control value may be set by the SKP[1] value on the previous WR transfer, so it may also be low in this example.

FIG. 27 will discuss an example when the new SKP[1] sampled value doesn't match the previous one because of drift between the DQS and CK domains.

The low value on the DLY0.5 control causes the DQY0 and DQZ0 values to be passed through the multiplexers in the phase adjustment block.

The value on the DLY123[1:0] control is assumed to be 00, which causes the DQY0 and DQZ0 values to be passed through the multiplexers in the cycle adjustment block, as well.

The DQY0 and DQZ0 values may be sampled by the DQY2 and DQZ2 registers and may have crossed into the CK domain at this point.

The DQY2 and DQZ2 registers drive the output multiplexer, which in turn drives the output driver for the secondary link group.

A DQS output may be created from Delay-Adj-Logic. The DQS output may be driven using the CK+90° signal, since the timing signal for a WR transfer is center-aligned.

If the value on the DLY123[1:0] control is assumed to be 11, the DQY0 and DQZ0 values may be delayed by a three cycle pipeline. The data and timing signal may appear on the secondary links 3*tCK later than for the previous case. This allows the delay through the DQS-to-CK domain crossing to be adjusted in one cycle increments.

FIG. 26 shows some details of a second embodiment of write path timing in a DB component. This example is similar to that shown in FIG. 25, except that it assumes the DQS and CK signals are aligned so the SKP[1] value sampled from CK+90° by DQS is high.

The write path was shown earlier in FIG. 24. The waveforms of six internal nodes are shown in the accompanying timing diagram, along the primary data input and secondary data output signals.

Each primary data link DQIN is sampled by the primary timing link DQSIN at the rising and falling edges, resulting in two sampled values Y and Z held on the DQY0 and DQZ0 register outputs in the DQS domain.

This example assumes the DQS and CK signals are aligned so the SKP[1] value sampled from CK+90° by DQS is high. The DLY0.5 control value was set by the SKP[1] value on the previous WR transfer, so it may also be high.

As noted above, FIG. 27 will discuss an example when the new SKP[1] sampled value doesn't match the previous one because of drift between the DQS and CK domains.

The high value on the DLY0.5 control causes the DQY0 and DQZ0 values to be sampled by the DQY1 and DQZ1 registers and passed through the multiplexers in the phase adjustment block.

The value on the DLY123[1:0] control is assumed to be 00, which causes the DQY1 and DQZ1 values to be passed through the multiplexers in the cycle adjustment block, as well.

The DQY1 and DQZ1 values may be sampled by the DQY2 and DQZ2 registers and may have crossed into the CK domain at this point.

The DQY2 and DQZ2 registers drive the output multiplexer, which in turn drives the output driver for the secondary link group.

A DQS output may be created from Delay-Adj-Logic. The DQS output may be driven using the CK+90° signal, since the timing signal for a WR transfer is center-aligned.

If the value on the DLY123[1:0] control is assumed to be 11, the DQY0 and DQZ0 values may be delayed by a three cycle pipeline. The data and timing signal may appear on the secondary links 3*tCK later than for the previous case. This allows the delay through the DQS-to-CK domain crossing to be adjusted in one cycle increments.

FIG. 27 shows how the timing examples of FIG. 25 and FIG. 26 can be combined together to automatically track drift between the DQS and CK domain over an arbitrarily large range.

FIG. 27 assumes that the DB has been initialized so the delay from a column write command on the CA bus and the write data for that command is a constant 3.00*tCK.

In the left diagram, the write strobe arrives 1.125*tCK after the write command. The SKP[1:0] values that are sampled are "01".

The new DLY0.5 phase value is set from SKP[1], and the new DLY123[1:0] cycle value is "01" (the same as what was previously set at initialization).

In the right diagram, the DQS timing has drifted relative to the CK domain, so the write strobe arrives 1.375*tCK after the write command. The SKP[1:0] values that are sampled are "11".

The new DLY0.5 phase value is set from SKP[1]. Because the SKP[1] and the old DLY0.5 phase value are different, and because SKP[0] is high, the new DLY123[1:0] may need to increment or decrement (relative to old DLY123[1:0] value) to keep the command to data delay constant at 3.00 tCK (it decrements in this example).

In summary, the DQS timing signal for each transfer may sample the CK and CK+90° (in the case of a write) and retain this information in the SKP[1:0] register.

At the idle interval before the next transfer, the DLY0.5 and DLY123[1:0] values (held in a control register in the CK domain) can be updated to reflect the SKP[1:0] from the previous transfer. These new DLY0.5 and DLY123[1:0] values are used on the next transfer.

This sequence may happen automatically on each transfer, and may allow the domain-crossing logic to accommodate an arbitrarily large range of DQS-to-CK drift during system operation.

After an initialization process gets the control registers set to appropriate values, no further maintenance operations may be required to support this automatic tracking.

As discussed previously with respect to FIG. 11, it is preferable that the modified system controllers may be compatible with the interface pin constraint of standard memory controllers. The interface logic in such case may be modified to accommodate the different CA link formatting for the modified system without adding CA links. Likewise, modified system modules can be designed to be compatible with standard systems.

Another set of improvements as discussed below are also compatible with standard controllers and modules. Some improved controller and module embodiments are compatible with the standard controllers and modules and with the controllers and modules built using the methods described below.

The remaining sections provide an overview of alternative improvements to make it more clear how tri-modal compatibility can be achieved, including the standard mode, the improved mode as described above, and the alternatively improved mode as described below.

FIG. 28 shows an alternatively improved system with three modules. There are diagrams for each of the six read transfer cases for the different module capacities.

The lower right diagram shows an example motherboard wiring pattern for this alternatively improved configuration. The topology of the CS links may be the same as in the standard system in FIG. 2, but the DQ link topology may be different.

In one embodiment, each DQ link connects the controller to the first module, but to only one of the second and third modules. The other DQ links on the second and third module sockets are connected together with motherboard wires that do not connect back to the controller.

Each DQ link is multi-drop, but only with two module connections instead of three. This may result in a significant improvement to the DQ signal integrity. However, the improvement may not be as great as what is possible with a single point-to-point module connection on each DQ link as described in previous configuration embodiments.

Returning to FIG. 28, the diagram in the lower left shows the case of a single module. The module is placed in the third socket. The first socket is left unoccupied, and a continuity module is placed in the second socket. The arrows indicate the wires on the continuity module and the direction of data movement for a read access.

The two diagrams in the middle row show the transfer cases for two modules (only one device is shown at each front/back device site pair, but other devices at each site pair are accessed similarly). In both cases, the modules occupy the second and third sockets, and the first socket is left empty.

The two module diagram on the left shows a read access to one logical rank on the slot 2 and slot 3 modules, with the CS group links for the third module asserted, as indicated with the arrow. The DB components on the slot 3 module only enable the device sites in the labeled {a,c,e} positions.

A private bus allows the RCD component on the slot 3 module to share its CS group with the RCD component on the slot 2 module. The details of this private bus according to one embodiment will be described in a later section. It is noted that the private bus between RCD components of different modules described here may be a separate bus from the private bus between DB components of a single module described above.

The DB components on the slot 2 module only enable the device sites in the labeled {b,d,f} positions, allowing the rest of the example read access to be performed.

The two module diagram on the right shows an example of a read access to another logical rank on the slot 2 and slot 3 modules, with the CS group links for the second module asserted, as indicated with the arrow. The DB components on the slot 2 module only enable the device sites in the labeled {b,d,f} positions, e.g., two device sites that were not accessed in the previous case but connect to the same data buffers.

A private bus allows the RCD component on the slot 2 module to share its CS group with the RCD component on the slot 3 module.

The DB components on the third module only enable the device sites in the labeled {a,c,e} positions, e.g., two device sites that were not accessed in the previous case but connect to the same data buffers, allowing the rest of the example read access to be performed.

The three diagrams in the top row show the transfer cases for three modules (only one device is shown at each front/back device site pair, but other devices at each site pair are accessed similarly).

The three module diagram on the left shows an example read access to a logical rank with the CS group links to the slot 3 module asserted. This case is substantially similar to the two module case below it in FIG. 28 (the channel loading is different due to the module in the first slot, which may change the operating speed).

The three module diagram in the middle shows an example read access to a logical rank with the CS group links to the slot 2 module asserted. example read access to the second module. This case is substantially similar to the two module case below it in FIG. 28.

The three module diagram on the right shows an example read access to the first module. The CS group links for the first module are asserted, as indicated with the arrow. The DB components enable the device sites in the {a,b,c,d,e,f} positions, as indicated with the six arrows.

FIG. 29 shows some details of the private bus of FIG. 28 according to one embodiment.

In one embodiment, the private bus uses unallocated module pins to connect the motherboard wires to each module. This example uses four unallocated pins. Other embodiments may use more or fewer pins. In one embodiment, the motherboard wires connect the three modules together, but do not connect to the controller.

The two timing diagrams in the lower left of FIG. 29 show the transfer of a command on the primary CA links (a WR write command) from the controller to the RCD components on each of the three modules according to one embodiment. The 12 CS links carry the selection information in the same time slot, with one of the 12 links asserted to indicate the rank and module.

The timing of the CA and CS links is single-data-rate, also called "1T" timing in the illustrated embodiment. Alternatively, "2T" timing could be used, in which case each command and selection occupies two clock cycles instead of one.

The RCD that is selected by the primary CS links may transmit on the private CS bus in the following cycle.

The two unselected modules may receive this information so they can coordinate the actions of DRAMs on two modules.

The RCD components on the modules may retransmit the command and the modified CS information onto the secondary links in the next cycle. The CS sharing actions may use an additional clock cycle of latency relative to a system which uses a standard multi-drop topology or the DQ links as described above.

The diagram in the lower right of FIG. 29 shows an embodiment of additional logic to support the private bus.

The primary CK link supplies the timing signal for the RCD component. A PLL/DLL feedback loop ensures that the internal clock is closely phase-matched to the clock that is received at the input pin.

The secondary CK link employs a similar PLL/DLL feedback loop to ensure the transmitted clock is closely phase-matched to the internal clock.

The primary CA and CS links are received with registers which load on the positive-edge of the internal clock. The registered CS value is checked to see if one of the four bits is asserted, indicating a rank on this module is selected (using the four-input OR gate).

If so, the output-enable control signal is asserted for one cycle on the next falling edge of clock. This allows the four registered CS bits along with the two bit module address to be transmitted onto the private shared bus.

The six-bit shared CS information is received by the other two unselected modules and loaded into registers on the next positive-edge of their internal clocks.

In some embodiments, the modules are close enough together that the skew between the internal clocks of the selected module and the unselected modules is relatively small. Thus, this skew may be absorbed in the ½ cycle of margin between the transmitter edge and receiver edge for this bus.

The six shared CS bits are merged with the four primary CS bits into a final six bit value which can be transmitted (with the command) onto the secondary links.

The six bit secondary value may cause the selected module and unselected module(s) to perform the command in the selected rank of devices.

In other embodiments, the private CS bus and the secondary CS bus may be modified from the six bit format described above. For example, the four decoded (one-hot) CS bits could be encoded into a two bit value and one of the four module addresses could be reserved as a NOP (no-operation). This may reduce the size of the CS bus and the secondary CS bus to four bits each.

CA DPP

Figure 30:
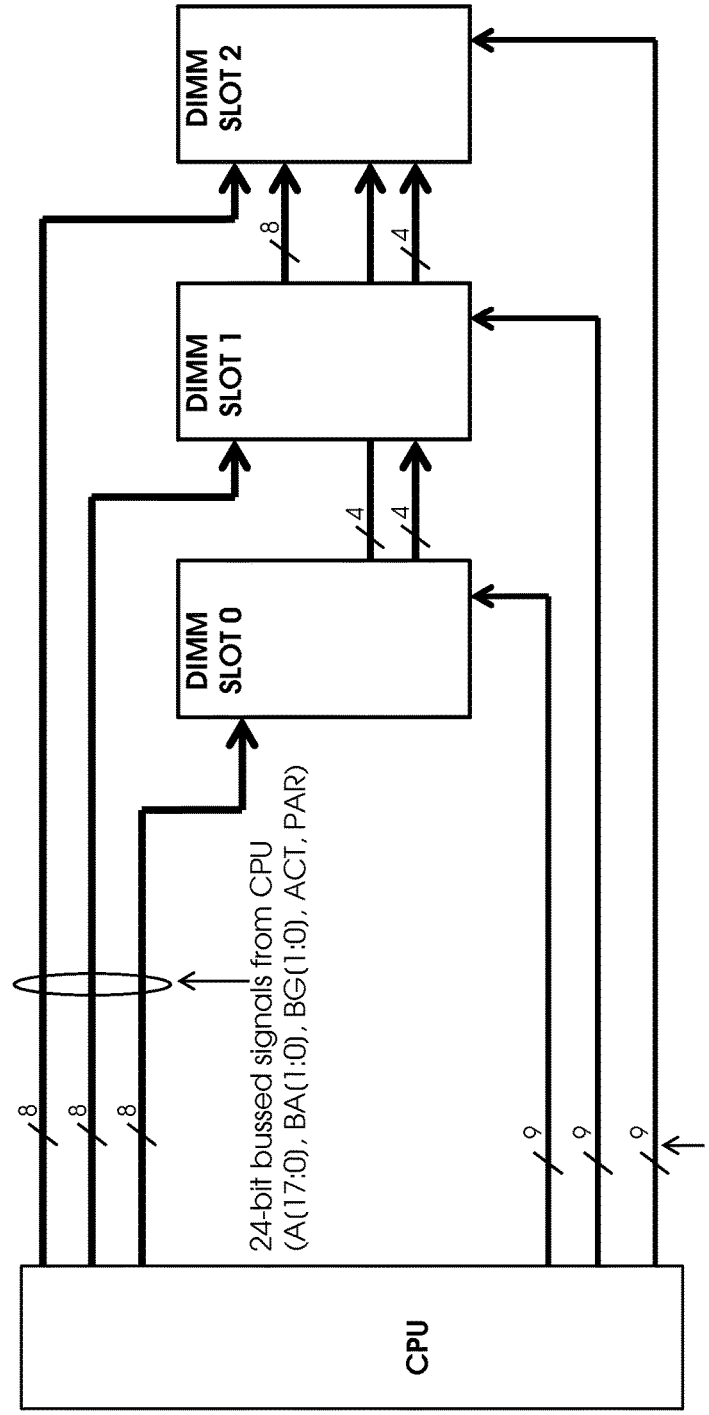
FIG. 30 shows a link topology used by one memory system according to one embodiment.

FIG. 30 shows a link topology used by one memory system according to one embodiment. FIG. 30 shows the link topology used by this solution. The 24 CA links (A[17:0],BA[1:0],BG[1:0], ACT,PAR) are broken into three groups and are routed to each of the three DIMM sockets on the motherboard. The three groups of point-point links (CS[3:0], C2, CKE[1:0], ODT[1:0]) continue to use point-to-point topology. All 51 links use SDR-1T timing.

Additionally, there are four point-to-point links routed between socket 0 and socket 1, there are four point-to-point links routed between socket 0 and socket 2, and there are eight point-to-point links routed between socket 1 and socket 2. These may call intermediate links.

Figure 31:
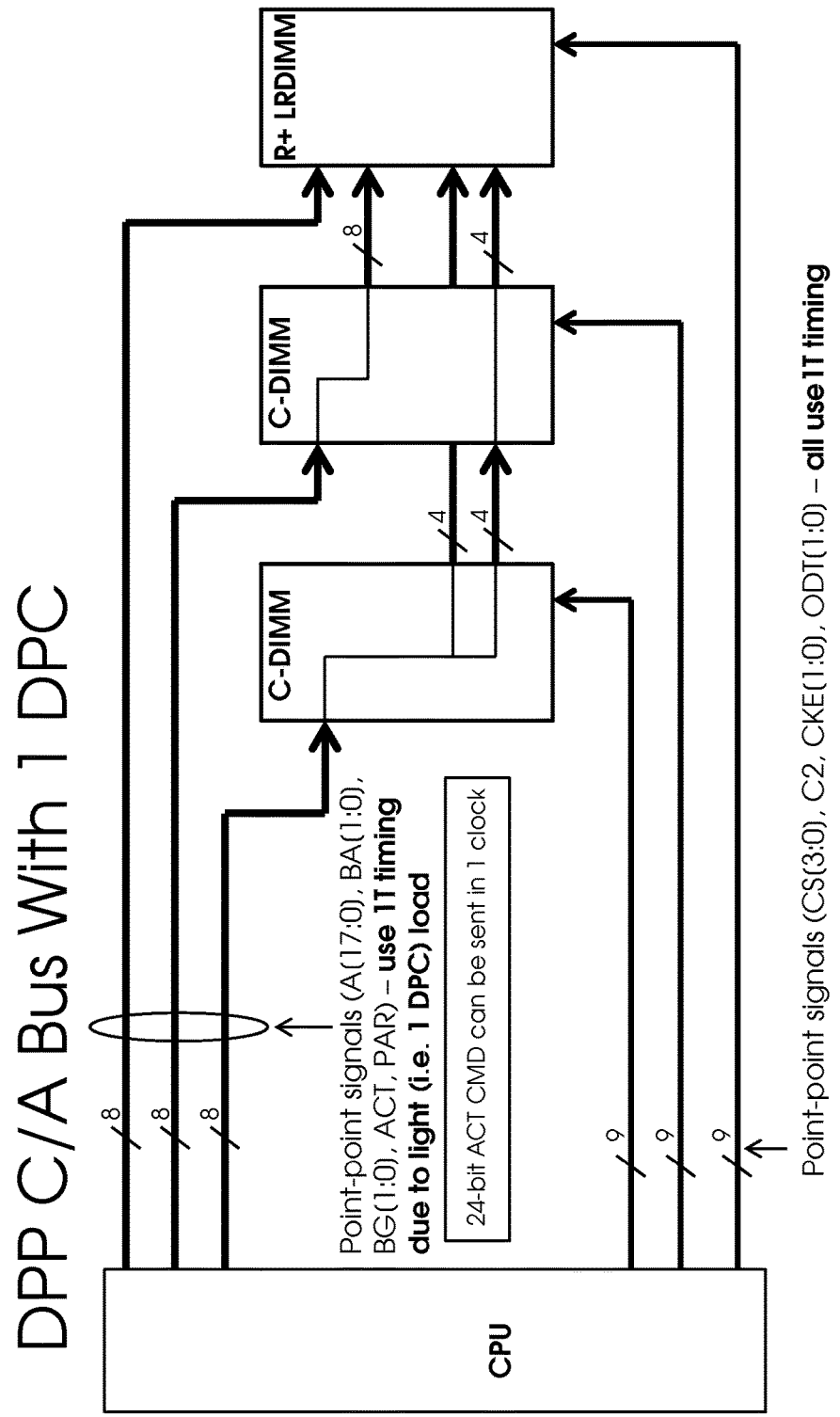
FIG. 31 shows the memory system of FIG. 30 populated with one DIMM module in socket 2 according to one embodiment.

FIG. 31 shows the system of FIG. 30 populated with one DIMM module in socket 2. Sockets 0 and 1 each contain a continuity module which connects the 8-link groups attached to socket 0 and socket 1 to the intermediate links attached to socket 2. The 24 links carry the command in parallel to the DIMM module with SDR-1T timing. The nine point-point links (CS[3:0], C2, CKE[1:0], ODT[1:0]) are used in the normal fashion.

Figure 32:
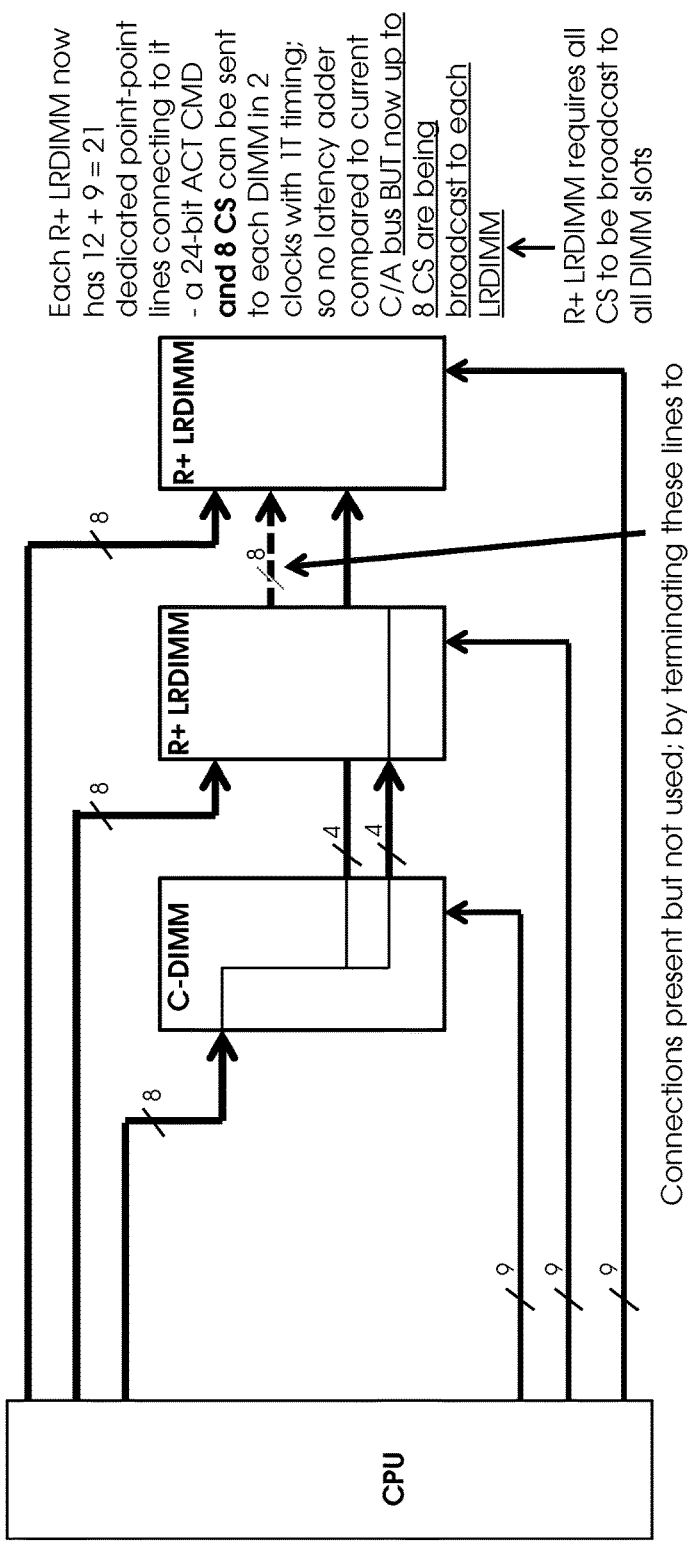
FIG. 32 shows the system of FIG. 30 populated with a DIMM module in sockets 1 and 2 according to one embodiment.

FIG. 32 shows the system of FIG. 30 populated with a DIMM module in sockets 1 and 2. Socket 0 1 contains a continuity module which connects the 8-link group attached to socket 0 to the intermediate links attached to socket 1 and socket 2.

As a result, socket each can receive 12 links from the (A[17:0],BA[1:0],BG[1:0], ACT,PAR) group and 9 links from the (CS[3:0], C2, CKE[1:0], ODT[1:0]) group. These links all use SDR-1T timing.

Every two cycles, each module may receive 42 bits, enough to encode the 24 bit address and command fields plus the nine bits of (CS[3:0], C2, CKE[1:0], ODT[1:0]) for both modules.

Note that sending the chip selection information to both modules helps with the DQ link P-to-P topology solution.

Figure 33:
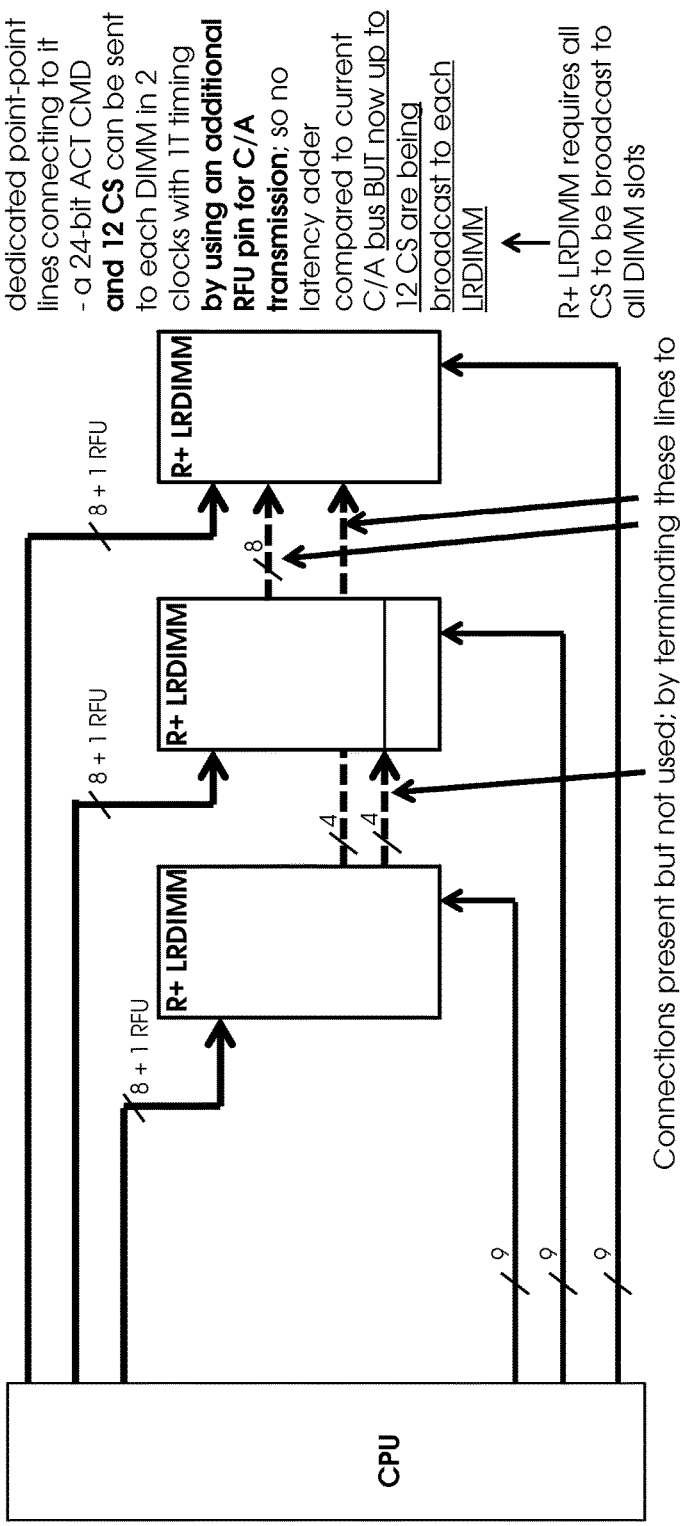
FIG. 33 shows the system of FIG. 30 populated with a DIMM module in sockets 0, 1 and 2 according to one embodiment.

FIG. 33 shows the system of FIG. 30 populated with a DIMM module in sockets 0, 1 and 2. The intermediate links are not used in this configuration.

The three groups of 8 CA links (A[17:0],BA[1:0],BG[1:0]ACT,PAR) are combined an RFU (reserved for future use) module pin to give 9 links in each group. Each module receives one of these groups. Each module also receives the 9 point-to-point links (CS[3:0], C2, CKE[1:0], ODT[1:0].

Thus, each module connects to the controller with 18 point-to-point links. If these links are driven with SDR-1T timing, then these links may be equivalent to 36 links with SDR-2T timing. This may be enough to transmit the original 24 bussed CA signals plus the original three sets of four decoded CS links.

Note that sending the all chip selection information to all three modules helps with the DQ link P-to-P topology solution.

Repeater Buffer Component

Figure 34:
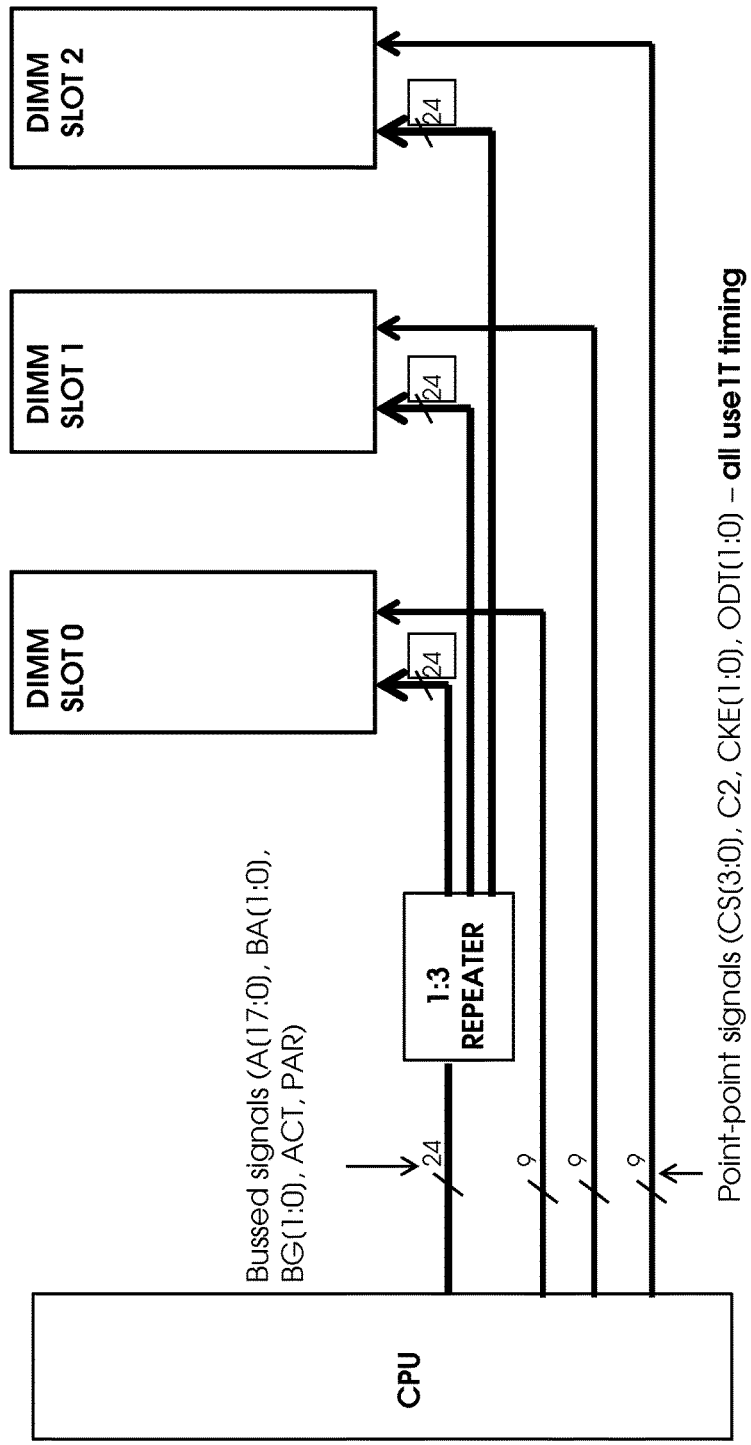
FIG. 34 shows an embodiment of a repeating (buffer) component placed on a motherboard substrate according to one embodiment.

FIG. 34 shows an embodiment of a repeating (buffer) component placed on a motherboard substrate according to one embodiment. It receives the bussed CA signals from the controller component, and retransmits them on three sets of links (with point-to-point topology) to the three modules.

The repeater component may typically receive and retransmit three copies of the clock link, as well. The repeater circuitry can utilize PLL or DLL feedback methods to ensure that the retransmitted clock phases match the received clock phase, so the modules can receive the unbuffered point-point links with the buffered clock links.

This repeater component is a simple solution to the CA signal integrity problem. One benefit may be that the controller component is not changed—the changes are confined to a relatively simple buffer component.

One implementation issue is the routing of the three sets of point-to-point CA links—more wiring layers may be required in the motherboard substrate.

A second implementation issue is the cost of the repeater component. The repeater component may have about 150-200 IO pins.

A third issue is the difficulty of scaling this solution to more modules.

These three issues may be addressed with the other solutions described in this application.

Alternate Repeater Buffer Component

Figure 35:
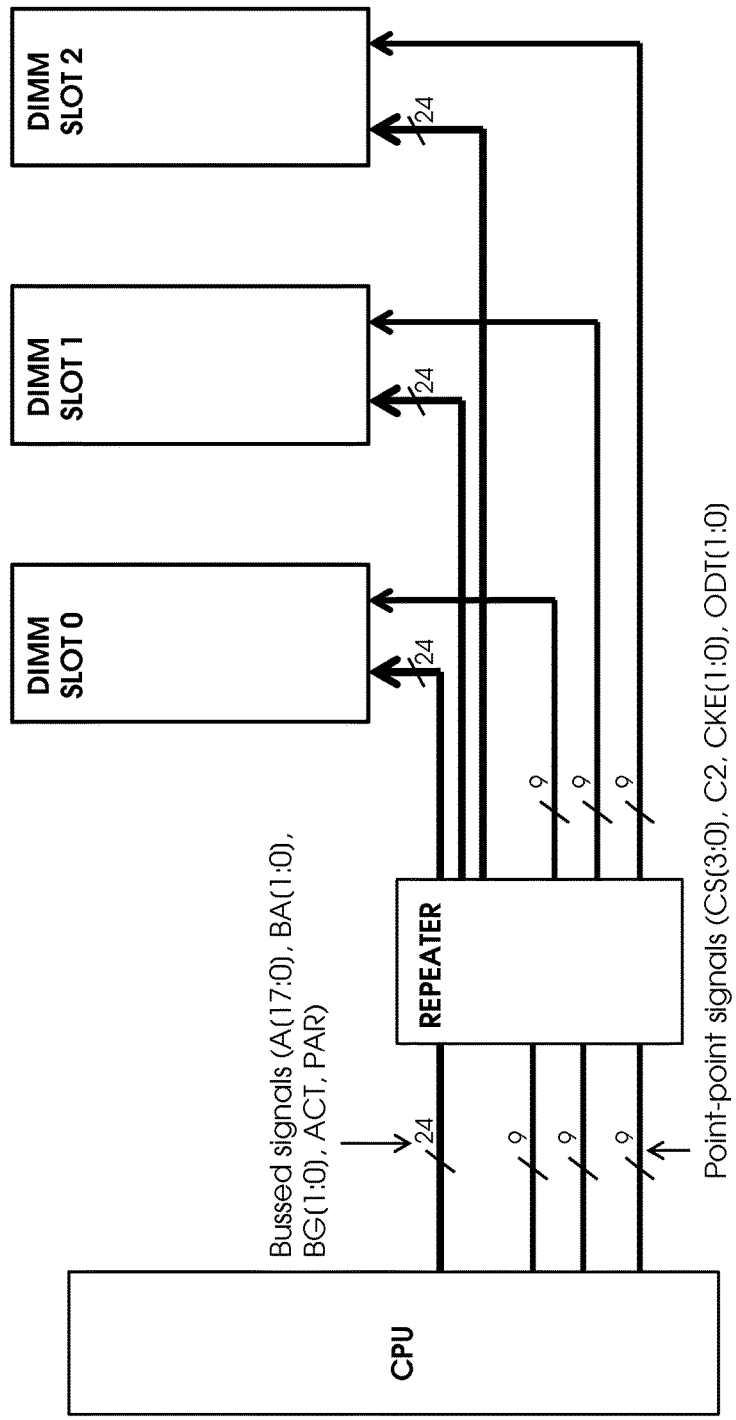
FIG. 35 shows another embodiment of a repeating (buffer) component placed on the motherboard substrate.

FIG. 35 shows another embodiment of a repeating (buffer) component placed on the motherboard substrate. However, it receives (and retransmits) the point-point links (CS[3:0], C2, CKE[1:0], ODT[1:0]) in addition to the bussed CA links.

One advantage of this alternative may be that it is easier to keep the skew of all the signals matched to the clock.

The same three issues exist as before, except that the pin cost of the repeater component may now be in the range of 200-250 IO pins.

Alternative Time-multiplex CA Buffer Component

Figure 36:
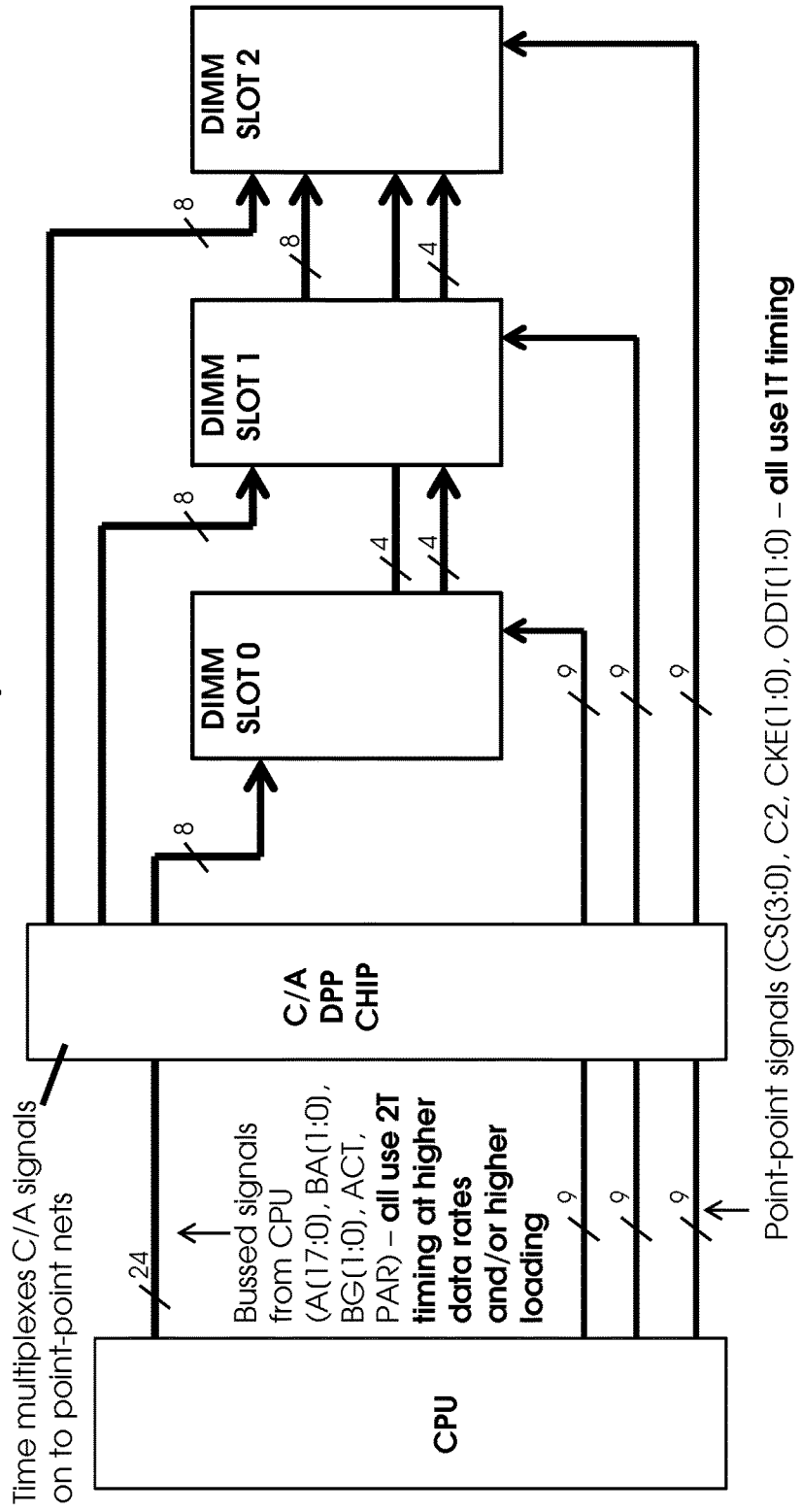
FIG. 36 shows a buffer component (CA DPP CHIP) placed between modules and a controller component on a motherboard according to one embodiment.
Figure 37:
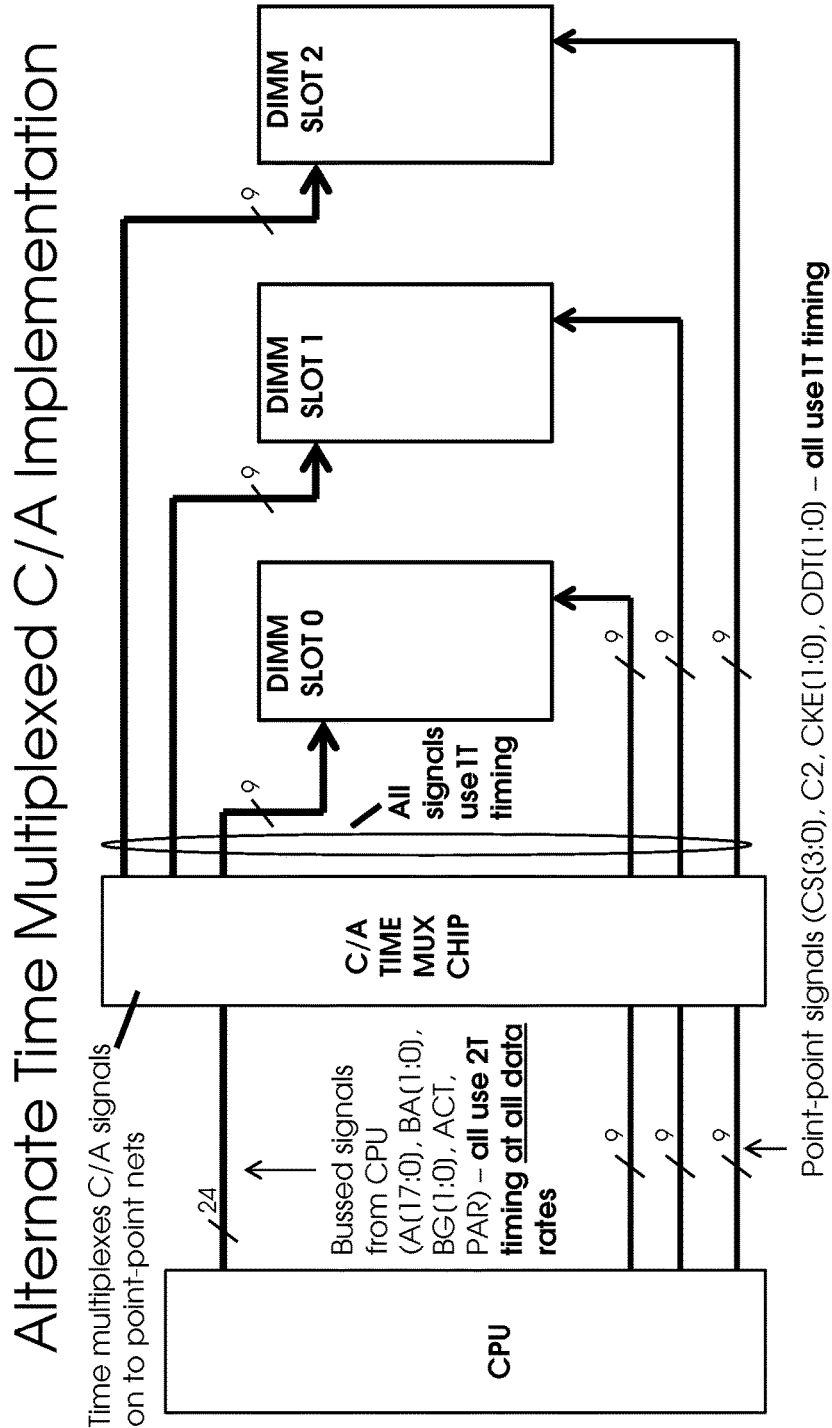
FIG. 37 shows another embodiment of a buffer component (CA TIME MUX CHIP) placed between the modules and the controller component on the motherboard.

FIG. 36 shows a buffer component (CA DPP CHIP) placed between modules and a controller component on a motherboard according to one embodiment.

The controller transmits the 24 bussed CA links (A[17:0],BA[1:0],BG[1:0]ACT,PAR) and the three sets of 9 point-to-point links (CS[3:0], C2, CKE[1:0], ODT[1:0]) to the buffer component.

Each of these 51 links (plus the clock link) may have a point-to-point topology. The 24 bussed CA links may be operated with SDR-2T timing, as in the standard system in FIG. A01.

The buffer component may place the information from the 51 CA links onto the three groups of 18 links. These three groups are operated with SDR-1T timing as before, and have a point-to-point link topology to each of the three modules.

One advantage of this alternative solution may be that the controller component is not modified; all adjustments to the format of the information on the CA links may be performed by the buffer component.

The impact of this solution on the motherboard wiring may be minimal, since the number of CA links received by the buffer and the number of links retransmitted by the buffer may be roughly the same.

The buffer may have a relatively low IO pin count (about 100-150 pins) compared to some of the other buffer solutions.

Alternative Time-multiplex CA Buffer Component another embodiment of a buffer component (CA TIME MUX CHIP) placed between the modules and the controller component on the motherboard.

The controller transmits the 24 bussed CA links (A[17:0],BA[1:0],BG[1:0]ACT,PAR) and the three sets of 9 point-to-point links (CS[3:0], C2, CKE[1:0], ODT[1:0]) to the buffer component.

Each of these 51 links (plus the clock link) may have a point-to-point topology. The 24 bussed CA links may be operated with SDR-2T timing, as in the standard system in FIG. A01.

The buffer component may place the information from the 51 CA links onto the three groups of 18 links. These three groups are operated with SDR-1T timing as before, and have a point-to-point link topology to each of the three modules.

One advantage of this alternative solution may be that the controller component is not modified; all adjustments to the format of the information on the CA links may be performed by the buffer component.

The impact of this solution on the motherboard wiring may be minimal, since the number of CA links received by the buffer and the number of links retransmitted by the buffer may be roughly the same.

The buffer may have a relatively low IO pin count (about 100-150 pins) compared to some of the other buffer solutions.

Part B—Systems with More than 3 Modules

Background—Link Detail for Standard System

FIG. 38 shows a standard system with 3 modules according to on embodiment.

The controller component is shown on the left of FIG. 38. It connects to 108 DQ links and 51 CA links (plus the clock link).

The 108 DQ links includes 72 DQ data-links and 36 DQS timing links. This link count includes the extra links needed for standard error detection and correction codes. This link budget can include a standard (Hamming) ECC bit code or a standard "Chip-kill" symbol code.

The 51 CA links include three groups of nine links, with each group connecting to one of the ranks. Each of the three nine-link groups of four CS links is routed with a point-to-point topology to the appropriate module.

There are five chip-select (CS) links in each nine-link group. Four of the CS links are decoded (one-hot), and one link is encoded (CS2). This allows up to eight ranks of memory devices on each of three standard modules).

Two of the links (ODT) in each nine-link group control the termination devices in each of two four-rank sets on each module. This is needed for enabling termination devices on module(s) which are not being accessed.

These links are needed because the standard DQ links use a multi-drop topology. If the CS links are encoded, then the DQ link topology can be modified to point-to-point. These ODT links are no longer needed, and may be re-tasked or reserved for future use.

Two of the links (CKE) in each nine-link group control the interface power state in each of two four-rank sets on each module. This permits power to be reduced on module(s) which are not being accessed.

If CS links are encoded, then the CKE power control function can be bundled into the CS rank-selection function. These CKE links are no longer needed, and may be re-tasked or reserved for future use. The method of bundling CKE into CS will be described in a later section.

The remaining 24 CA links (with command, control and address functions) are bussed to the 3 modules via motherboard wires in a multi-drop topology as previously discussed.

These bussed links include: A[17:0]—address and command; BA[1:0]—bank address; BG[1:0]—bank group address; ACT—activate command; and PAR—parity error control. The clock (CK±) timing link is also routed with these 24 bussed links. One nine-link group and the 24 other bussed CA links are received by the CA buffer (CA-BUF) component on each module.

For each command issued on the CA links, one of the 12 CS links may be asserted, indicating which of the 12 ranks is to respond. If 24 ranks are present, the CS2 link may indicate which group of four ranks on the selected module is to be used.

The term "primary" refers to a link which connects to the buffer device on the module from the controller via the motherboard. The term "secondary" refers to a link which connects the buffer device on the module to the memory devices (at the memory device sites). The term "intermediate" refers to a link which connects two buffer devices on the same module together.

The 24 CA links and the nine-link group are retransmitted in a secondary multi-drop topology to the 18 device sites on the module. A device site can include one or more 4-bit memory devices. This FIG. shows examples with one, two and four devices stacked at each site.

In each access, each DQ buffer may access 2 of the {2,4,8,16} ×4-devices attached to its secondary DQ links. The selected devices may couple to the two sets of primary DQ links to which the DQ-BUF component connects.

Link Topology in Standard Systems

FIG. 39a shows the physical connection topology of the links in standard memory systems according to one implementation. There are two classes of links: the CA (control-address) links and the DQ (data) links.

FIG. 39a shows a system with two modules. A three module system would be similar, but with a third module added.

FIG. 39b only shows the CA links that use a multi-drop topology. The CA links with point-to-point topology (the nine-link groups) have better signal integrity, and do not need further optimization.

These signals are transmitted (and received, in the case of DQ links) by the controller component. These signals are typically received (and transmitted, in the case of DQ links) by buffer components on the module.

Some systems may not use buffer components in the path of the CA and DQ links on the module, but these systems may tend to have a more limited memory device capacity and a more limited signaling rate. This is because the un-buffered links may be impacted by the longer wires and heavier loading on the module.

The CA and DQ links may be buffered by the same component, or there may be a separate CA buffer component and a separate DQ buffer component.

The DQ buffer component may be divided (sliced) into several smaller components, each covering a subset of the DQ links. DQ buffers which handle 8, 24 and 36 DQ links are described in this application. Other DQ buffer widths can also be used.

This application may be primarily focused on those systems in which maximum memory device capacity is important. It should be noted that the methods described in this application can also be applied to systems with moderate capacity, as well.

The embodiments discussed in this application all assume modules with 72 DQ links to accommodate standard EDC codes. The methods described in this application can be applied to modules with 64 DQ links, as well.

DQ Link—Standard

The DQ link topology includes a transmitter and receiver on the controller and a controlled-impedance wire on a motherboard substrate.

Inside the DQ buffer there is a termination device, a receiver, and a transmitter. Each module (with a DQ buffer) adds a load to the DQ link.

The loading presented by each buffer is mainly capacitive, and includes loading introduced by the socket connection to the module pin, the wire trace between the module pin and the buffer component, and the transmitter and receiver circuits on the buffer.

The receiver/transmitter circuit includes the transistors forming the input amplifier and the output driver, as well as the protection devices which guard against electrostatic discharge. This protection device and the output driver may include some series resistance, as well.

Because the DQ link is input/output (bidirectional), the total capacitive load CDQ may be larger than that present on the CA links. FIGS. 39c and 39d shows a lumped capacitance CDQ representing this load.

The impact of DQ loading (and methods to address it) will be covered in a later section.

A fundamental signaling problem arises because of the fact that the DQ links are bidirectional; read data can be driven from any module position. FIG. 39d illustrates this. The transmitter in the DQ buffer drives the signal through the module trace and the connector to the motherboard trace. Here the signal is energy is divided, with half going left and half going right.

Ideally, the half signal traveling to the end of the module is absorbed by the terminator on the last module, which has been turned on. In practice, the signal divides at the inactive modules and reflects back, introducing ISI (inter-symbol-interference) and degrading signal integrity. In some systems, the termination devices are partially enabled in the inactive modules.

FIG. 39c illustrates the analogous problem for write data. The transmitter in the controller drives the signal through the motherboard trace. The signal is energy is divided at each module. If the module has disabled termination, the signal reflects back out to the motherboard, with half going left and half going right.

This is addressed in the standard system by including termination devices at each module (typically as an adjustable device in the input/output circuit in the DQ buffer component).

A consequence of this need to choreograph the termination values may be the need to introduce idle cycles (bubbles) between accesses to different modules.

The termination value of this device is adjusted according to which module accesses the data. It is possible that the termination value used in the non-selected modules is adjusted as well, for optimal signaling (this is the reason why each module connects to its own set of ODT[1:0] links).

This is not a scalable signaling topology, as evidenced by the limited module capacity of standard systems.

If the CS links are encoded, the DQ links can be modified so they are point-to-point topology rather than multi-drop topology. This may allow each link to be operated at a maximum signaling rate determined mainly by the transmit/receive circuits (and not by the link topology). It may also allow the module capacity of the system to be significantly increased.

CA Link—Standard

In FIG. 39a, it should be noted that even with the assumption of CA and DQ buffering, there may still be issues of signaling integrity.

The CA link topology includes a transmitter on the controller, a controlled-impedance wire on a motherboard substrate, and a termination resistor at the farthest end. A receiver in the CA buffer in each module connects to the CA link, adding multiple loads to the link. This is called a multi-drop topology.

This module load is primarily capacitive, and includes loading introduced by the socket connection to the module pin, the wire trace between the module pin and the buffer component, and the receiver circuit on the buffer.

The receiver circuit includes the transistors forming the input amplifier as well as the protection devices which guard against electrostatic discharge. This protection device may include some series resistance, as well.

Because the CA link is input only, the total capacitive load is relatively small—FIG. 39b shows a lumped capacitance CCA representing this load. Nonetheless, this periodic load impacts the maximum signaling rate of the CA links, particularly in a three module system.

This application will show how the bussed CA links can be modified to a point-to-point topology. This may allow each link to be operated at a maximum signaling rate determined mainly by the transmit/receive circuits (and not by the link topology). It may also allow the module capacity of the system to be significantly increased.

Improved Link Topology

When the DQ links have been improved, the CA links need to also be improved so that they are not the performance-limiting factor.

The principle goal of this application is to describe an improved signaling topology for the CA links of a memory system. This improved topology may provide higher module capacity, and can be implemented in such a way that key components (controllers, modules, buffer devices) can be designed so they can be used in either standard systems or in improved systems.

The methods disclosed in this application can be employed to gain a number of benefits, such as the following: [1] the system capacity can be improved to 18 modules running at the maximum data rate. [2] the capacity of the system is adjustable; a 18 module system can hold {1,2,3, 6,9,18} modules. [3] The signaling integrity of the CA links is improved significantly from the multi-drop topology of standard systems: each CA link uses a point-to-point topology. [4] high capacity systems allow standard error detection and correction codes (i.e. ECC, Chip-kill). Alternatively, other benefits may be achieved.

These improvements are achieved while maintaining a high degree of compatibility to standard memory systems and their components: [1] No change to the memory component; [2] No change to the controller component, or a small change; [3] Change to the module—specifically a new buffer design; the new module can be used in standard systems as well as high capacity systems.

By offering a standard mode and an improved mode of operation, the manufacturer of the controller component and the buffer component can deliver the same product into both standard motherboards and improved, high capacity motherboards.

FIG. 39e illustrates the physical signaling topology of CA and DQ links in an improved system according to one embodiment.

DQ Link—Improved

The DQ link topology is different from the standard system. FIG. 39e illustrates this difference.

It includes a transmitter and receiver on the controller and a controlled-impedance wire on a motherboard substrate, as before. Inside the DQ buffer of a module there is a termination device, a receiver, and a transmitter, as before. There are several key differences in the way these are connected together. [1] The DQ link connects to a single module in a point-to-point topology. This gives the best possible signaling quality, since the receiver and transmitter are at opposite ends of a controlled-impedance transmission line, with a termination device enabled at the receiver end of the link. Optionally a termination device can be enabled at the transmitter end to dampen reflection noise further. This may cut the voltage swing of the signal in half, so this might not be a good tradeoff. [2] The link includes a segment (the "x" segment) of wire on the motherboard, a connection through a continuity module (the "z" segment), and a second segment of wire on the motherboard (the "y" segment). Some DQ links may only go through a single segment of wire on the motherboard (no connection through a continuity module). FIGS. 39g and 39h illustrate this topology according to one embodiment.

The continuity module is a standard module substrate with no active devices. It plugs into a standard socket, and connects some of the DQ links to other DQ links with a controlled impedance wire.

This connection through a continuity module may introduce some discontinuities to the link, mainly by the socket connection to the continuity module pins. This is because the geometry and spacing of the two-conductor transmission line changes at these socket connections.

Each DQ link may see an impedance change at the meeting point of the "x" and "z" segments, and an impedance change at the meeting point of the "z" and "y" segments. These impedance changes can create reflections and add to ISI.

It is possible to compensate partially for these impedance changes by adjusting the trace widths if the DQ link on the module.

Another way to deal with the ISI is to use decision-feedback-equalization (DFE) or similar techniques. This approach uses the past symbol-values that were transmitted on a link, and computes an approximation for the reflection noise they have created. This approximation can be subtracted from the signal (at the transmitter or receiver) to get a better value for the current symbol being transferred.

Because of this simpler DQ link topology, the improved system may have better DQ signal quality (even with the continuity module).

CA Link—Improved

The CA link topology may be modified by taking advantage of the modifications to the DQ links. FIGS. 39e and 39f illustrate these modifications.

The first modification is that the three groups of four decoded CS signals and the three encoded CS2 signals (15 signals in all) are encoded onto five encoded signals, indicating which one of the 24 ranks is selected.

This encoding may be done in the controller component, or it may be done on a buffer component on the motherboard (not shown), or it may be done in the CA buffer on the first module (not shown).

This example assumes it is done in the controller. This would be accomplished by setting a mode field in a control register in the controller indicating whether the rank selection is to be done with the 12 decoded CS and 3 encoded CS2 signals, or with the 5 encoded signals replacing the 4 decoded CS and one encoded CS2 for the first module.

This also makes it easier to accommodate an increase in the number of modules in the system. The example in FIG. 39e includes six modules, utilizing a sixth encoded CS signal, and an 18 module system would utilize a 7th and 8th CS signal. These would replace the ODT[1:0] and CKE[1] signals for the first module.

Doing the encoding of the CS signals on a motherboard buffer (not shown) or on the CA buffer on the first module (not shown) may have the advantage that the controller component would not need to be modified, but it would be harder to easily accommodate an increase in the number of modules.

There are now 24 CA links, 8 encoded CS links, and a clock link which have a point-to-point topology between the controller component and the socket for the first module. The wiring on the motherboard does not connect the 24 CA links and 8 encoded CS links to the other five sockets.

Each socket does include a CK connection, and this can be generated by a clock buffer on the motherboard. This component would receive the CK signal from the controller, and would create six phase-aligned copies, with one copy routed to each module with point-to-point topology. A PLL or DLL loop would minimize the skew between the input clock and the six output copies. Alternatively, the controller component could be modified to supply the six copies directly.

The key idea of this application is how the CA and CS information is transferred from the first module to the other five. This is done by borrowing unused DQ "y" segments. The "y" segments are the motherboard wires which connect DQ module pins with a point-to-point topology. A subset of these "y" links may be used, and they can be re-tasked to distribute the CA and CS information. The details of this will be shown in the next set of figures.

Improved System—Signal Routing Overview

FIG. 40a shows an overview of the improved system with 6 modules. The controller is at the left, and connects to the six modules with the motherboard wiring pattern, shown separately in FIG. 40e. This overview is a representative slice of memory system, containing 24 of the 72 DQ links and one of the three DQ-BUF components on each module.

The movement of read data is shown with the arrows, with the letters {a,b,c,d,e,f} indicating which DRAMs (D) supplies each nibble of read data. It can be seen that in FIG. 40a, each module supplies data from one of its six DRAMs, and transmits the data to the controller component on a different set of motherboard links.

The movement of CA information is shown with the black arrows in FIG. 40a. The 24 CA signals and 8 encoded CS signals are passed directly from the controller to the first module using the 51 output pins of the re-tasked standard CA interface.

Inside the module, the 32 CA and CS signals are passed from the CA-BUF (not shown) to the three DQ-BUF components on the first module (only one DQ-BUF is shown in FIG. 40a).

The first DQ-BUF retransmits the least significant 16 of the 32 CA and CS signals to the other five modules with unused "y" wire segments on the motherboard.

The second DQ-BUF on the first module may retransmit the most significant 16 of the 32 CA and CS signals to the other five modules with other unused "y" wire segments on the motherboard.

The third DQ-BUF on the first module may not need to retransmit any CA and CS signals.

This works because the 32 CA and CS are transmitted with SDR-2T timing by the controller (one bit per two clock cycles per link). The CA and CS signals are retransmitted on the "y" segments using DDR timing like DQ data (two bits per clock cycle per link), or four times the CA rate.

FIG. 40b shows an improved system with only three of the sockets being occupied with DRAM modules and the other three being occupied with continuity modules according to one embodiment. FIG. 40b is similar to FIG. 40a, except that only three of the sockets are occupied with DRAM modules; the other three contain continuity modules. The continuity modules ensure that every DRAM on every module can be accessed for the supported module configurations.

In FIG. 40b, it is only necessary for the first module to retransmit the CA and CS signals to two of the other five sockets. This is done with two of the five "y" segments used in FIG. 40a. The other three "y" segments are either not used, or are used to transfer data.

FIG. 40c shows an improved system with only two of the sockets being occupied with DRAM modules and the other four sockets being occupied with continuity modules according to another embodiment. FIG. 40c is similar to FIG. 40a, except that only two of the sockets are occupied with DRAM modules; the other four contain continuity modules. It is only necessary for the first module to retransmit the CA and CS signals to one of the other five sockets. This is done with one of the five "y" segments used in FIG. 40a. The other four "y" segments are either not used, or are used to transfer data.

FIG. 40d shows an improved system with only one of the sockets being occupied with DRAM modules and the other five sockets being occupied with continuity modules according to another embodiment. FIG. 40d is similar to FIG. 40a, except that only one of the sockets is occupied with DRAM modules; the other five contain continuity modules. It is not necessary for the first module to retransmit the CA and CS signals to the other five sockets. The five "y" segments are either not used, or are used to transfer data.

FIG. 40e shows a motherboard wiring pattern connecting a controller and six modules according to one embodiment.

Link Detail for 6 Module System

FIG. 41 shows the improved 6-module system according to one embodiment.

The controller connects to the first module with the 24 CA links and 8 CS links as previously described. A control register field specifies the alternate CS format (encoded instead of decoded and using the ODT and CKE links to extend the CS range).

The CA and CS inputs are not used for modules in the other five sockets. The modules may get the CA and CS information via unused DQ "y" wire segments on the motherboard.

The controller connects to the six modules with three sets of DQ links, with each set containing 24 DQ links and 6 DQS± links). In FIG. 41, the routing for each nibble is shown, where a nibble includes six wires including four DQ links and one DQS± link.

Each six-nibble set is routed as shown in FIG. 40e on the motherboard. FIG. 40e shows a motherboard wiring pattern connecting a controller and six modules according to one embodiment.

Each module contains one CA-BUF component and three DQ-BUF components, with each DQ-BUF connecting to six DQ nibble. Other DQ-BUF sizes are possible; for example, FIG. 44 shows a module with two DQ-BUF components, with each connecting to nine DQ nibbles.

In addition to connecting to six DQ nibbles on the primary side, each DQ-BUF connects to six device sites with six secondary nibble links.

The CA-BUF and the three DQ-BUF components are also connected to a double terminated secondary CA bus. This secondary CA bus includes 32 links, and is used to distribute the two ×16 CA/CS groups including each command. This distribution process is shown in more detail in the next two figures.

FIG. 41 also shows the controller transmitting six copies of the CK± signal on separate point-to-point links to each module. As previously mentioned, the clock replication could be performed by a buffer component (with DLL or PLL feedback method) on the motherboard.

Finally, FIG. 41 shows two highlighted areas of the CA links and two DQ nibbles for the first and second modules. These highlighted areas will be shown in more detail, to make it clear how the CA-BUF and DQ-BUF distribute the CA/CS signals on the unused DQ "y" motherboard segments.

CA-BUF and DQ-BUF Detail

FIG. 42 shows the CA-BUF and DQ-BUF components according to one embodiment. This section assumes that the buffer components and controller are operating in the improved, high capacity mode.

All controller and buffer components can alternatively be operated in a standard mode by setting a field in a control register or setting a control pin. In this standard mode, the system would look like the legacy system in FIG. 38.

The CA-BUF is shown in the lower right diagram. The CK and 32 CA/CS signals are received from point-to-point links from the controller (for the first module position), and are retransmitted on the secondary links to the DQ-BUF components in the module.

In this embodiment, the modules that are not in the first socket position will not use the 32 primary CA/CS links, and will not drive the 32 secondary CA/CS links.

All six modules receive the CK primary link, and retransmit on the CK secondary link, using PLL or DLL with feedback to minimize the phase difference between the primary clock and secondary clock.

The DQ-BUF is shown in the left diagram. It connects to six primary DQ nibbles on the left, and to six secondary nibbles on the right. Each nibble includes four DQ links and one DQS± link.

Each of the nibble groups includes circuitry for domain crossing. The notation used is explained in FIG. 46. In general, all received signals (single-hatching background) can have a phase offset relative to the clock domain of the DQ-BUF (double-hatching background), and need to pass through domain-crossing logic.

Each nibble group includes a multiplexer in front of its transmitter, so that a full crossbar switch is implemented.

In the case of a read operation, the transmitter on a primary DQ nibble can receive read data from any of the six secondary DQ nibbles (connected to the six DRAM sites).

In the case of a write operation, the transmitter on a secondary DQ nibble can receive write data from any of the six primary DQ nibbles (connected to the controller component).

The multiplexer for the transmitter on each primary DQ nibble is converted to 7-to-1. The extra input comes from one of the two 16 bit halves of the CA/CS command received from the DA-BUF component.

A 6-to-1 multiplexer is added. It can select any of the primary DQ nibbles that are received, and retransmit onto the secondary CA/CS links.

CA transfer on unused DQ

FIG. 43 shows incremental logic to supply every module with a copy of the CA/CS information from the controller component according to one embodiment. FIG. 43 shows how this incremental logic can be used to supply every module with a copy of the CA/CS information from the controller component.

The upper diagram in FIG. 43 shows the highlighted region from the system diagram in FIG. 41. This highlighted region includes the CA links and two representative DQ nibbles for the first and second modules.

The lower diagrams in FIG. 43 show the same regions using the more detailed logic from FIG. 42. The two sets of diagrams illustrate the same CA transfer path from the controller through module 0 to module 1.

The arrows show how the CA/CS information is transferred. It starts in the controller component, and is transferred on the 32 primary CA/CS links to the CA-BUF component on the module 0.

The CA/CS information is retransmitted on the 32 secondary CA/CS links to the three DQ-BUF components on module 0 (only one DQ-BUF is shown in FIG. 43.

Two of the three DQ-BUF components on module [0] each receive half of the 32 secondary CA/CS signals (with SDR-2T timing), and retransmit on an unused primary nibble of DQ links (with DDR timing) to module [1].

The signaling rate may be four times as fast on ¼ as many links, so the transfer bandwidth may be matched.

The CA/CS information is received from the primary DQ nibble on module [1], and is multiplexed onto ½ of the 32 secondary CA/CS links. Two of the three DQ-BUF components on module [1] may perform this transfer step.

Each DQ-BUF may receive the 32 secondary CA/CS links, and may retransmit them onto the tertiary CA/CS links that connect to the DRAM sites.

Modules [2] through [5] may perform a similar CA/CS transfer from module [0] using different primary DQ nibbles. The phase and cycle adjustment logic in the receivers may keep all the transfers aligned to the local clock domain at each transfer step.

The secondary 32 CA/CS links are divided into two halves, each with 16 links. These may be transferred separately by two of the DQ-BUF components—the third DQ-BUF component may not need to perform this transfer step.

Note that the 32 secondary CA/CS links are terminated at both ends. This allows them to be driven from any point along the module, with the termination devices at the two ends absorbing the signal energy. This may be necessary because on modules [1] through [5] the CA/CS information may be driven by DQ-BUF components and not the CA-BUF component. This may be set by a static configuration field in a control register in each component at initialization time.

This link topology may be able to handle the SDR-2T timing of the 32 secondary CA/CS links. It may require that the drivers on the CA-BUF and DQ-BUF be sized to handle this increased loading.

CKE Clock Enable—Re-Tasking

One final issue which can be addressed is the re-tasking of the three sets of CKE[1:0] clock enable signals (shown in FIG. 38). These signals are intended to provide coarse power control in standard memory systems.

In FIG. 38, one of the six CKE signals would be asserted one cycle ahead of the command on the CA/CS links. This would cause half the memory ranks on one of the three modules to power up their CA interfaces so the command can be received.

This standard power control function can be replicated in the improved high-capacity mode.

Logic is added to the DQ-BUF transmitter block which drives the pins of the DRAMs at each DRAM site (see FIG. 42). This logic may do two things: [1] it may assert the individual CKE input of the selected DRAM at each DRAM site; [2] it may delay each CA/CS command one cycle while CKE is asserted, to allow the CA/CS interface of the selected DRAM to be powered up to receive the command. This extra CKE assertion may become part of the CA/CS pipeline, so it may add an extra cycle of delay, but it may not impact the bandwidth of the memory system.

This may add additional pins to the CA/CS links between the DQ-BUF and the DRAM sites, but may provide finer power control than the six CKE links in the standard system.

The extra cycle of latency may be equivalent to the extra cycle needed to asset the six CKE signals in the standard system of FIG. 38. In one embodiment, this new logic can be enabled/disabled by a field in a control register, so either latency or interface power can be optimized.

Module with Threading—System Diagram

FIG. 44 shows adjustments to access granularity while utilizing the improved link topology and methods according to one embodiment.

The system example uses two DQ-BUF components per module, and can accommodate up to nine of these modules per system. Each module accommodates up top eight devices per device site, as in the previous examples.

FIG. 44 uses black arrows to indicate the transport of the CA/CS information from the controller to the nine modules. This is analogous to FIG. 40a, except for the additional three modules.

A key difference, however, is that the modules are operated as independent memory spaces with their own transaction stream. This has three important benefits: [1] Data transfers become narrower (36 DQ links instead of 72 DQ links) so that access granularity can be cut in half; [2] If access granularity is kept constant, then more column accesses are made to an activated row, cutting the average activation power in half; [3] The two DQ-BUF components receive independent command streams, and no longer have to exchange subsets of the commands—this saves the latency needed for this exchange. Alternatively, other benefits may be achieved.

This alternative may require that the controller's queuing logic be able to steer transactions to two sets of queues. Typically, a high order physical address bit would be used for the steering. In FIG. 44, "X" and "Y" labels are used for the different queues.

Module with Threading—Timing Diagram

FIG. 45 shows a timing example for the system in FIG. 44 according to one implementation. The commands (CAx1y1)

are issued from the controller to the first module across the 32 CA/CS links with point-to-point topology and SDR-2T timing.

Alternate commands are directed to the X and Y memory spaces. The CA-BUF on the first module separates the two command streams, sending one to the upper DQ-BUF (CAx1) and one to the lower DQ-BUF (Cay1).

Each DQ-BUF component reserializes the command stream (CAx2 and Cay2) and transmits it on eight unused DQ nibbles to the other eight modules. This transfer uses DDR timing, and each command is 4b wide and 8b long. The command bandwidth remains constant at each step in this process.

The DQ-BUF components on each module receive the CAx2 and CAy2 command streams, and retransmit this as the CAx3 and Cay3 command streams to the device sites.

The read data is returned by the selected devices, with each command stream returning 72 bytes per column access (half the amount accessed by a standard module).

Domain Crossing Detail for DQ Buffer

The logic described in the next five figures show an example of how the controller component and buffer components can communicate between the different clock domains in the system. This example will focus on the transfer of write data, but the logic can be used for transferring read data and CA/CS information, as well.

The logic shown can accommodate any range of phase difference between clock domains. The logic may also dynamically adjust to any phase drift during system operation. Other alternative logic embodiments are possible.

FIG. 46 shows domain-crossing logic of the DQ-BUF component according to one embodiment. The top diagram shows the write (WR) and read (RD) paths for the data group—4xDQ and 2xDQS.

The primary links and the secondary links connect to the bidirectional input-output pads, but inside the buffer the WR and RD paths are unidirectional.

The unidirectional WR path is shown in the lower figure. The RD may be nearly identical, except the highlighted differences.

In the lower diagram, the DQS link is received and gated with a signal called DQS-EN. The DQS-EN is generated in the clock (CK) domain of the buffer, and turns on in response to a column write command.

The gated DQS loads two registers (on rising and falling DQS edges) with write data on the DQ pads. These registers are labeled "sampler" in FIG. 46. The write data is in the DQS domain (single-hatching background).

The gated DQS also samples the internal clock and the 90° delayed clock on each rising edge of DQS during a write transfer. The last sampled values are SKP[1:0], and may be used by the Delay-Adj-Logic.

The sampled data is now passed to registers in the CK domain (double-hatching background). For the minimum delay case, the data may pass through the multiplexer in the phase adjustment block and the multiplexer in the cycle adjustment block, and may be clocked by the two registers in the cycle adjustment block.

The registered data is transmitted with the output multiplexer and driver, and may be aligned to the CK domain of the DQ-BUF component. An enable signal OUT-EN is generated in the CK domain and turns on the output driver The multiplexers in the phase adjustment and cycle adjustment blocks can be set to other selection values to provide more delay. This may allow the Delay-Adj-Logic block to automatically track the DQS timing drift so that the overall timing of the system is constant.

Note that the register placement in the phase adjustment block and cycle adjustment block does not necessarily reflect the best circuit embodiment. It is shown this way for clarity. In the actual circuit, the registers may be broken into half-latches to get the best possible timing margin.

A similar circuit may be used for the read path. The principle difference is that the DQS timing signal may not be center-aligned with the data (as it is with the write path), but be edge-aligned with the data. As a result, a 90° delay may need to be inserted into the path of the gated DQS before it samples the read data. Also, there will be no 90° delay in the path of the CK used for the output multiplexer for DQS. This also means that the SKP[1:0] may result from sampling CK with the gated DQS and the gated DQS delayed by 90°.

One final note—the 90° delay can typically be implemented by creating a mirror (copy) of the delay elements used by the PLL or DLL for the DQ-BUF component.

Domain Crossing Detail for Memory System

FIG. 47 shows domain-crossing logic of representative components of the memory system according to one embodiment. This includes the controller component on the left, the DQ-BUF and CA-BUF components on a module in the center, and the DRAM components on the right.

The CA, CS, and CK primary links connect from the controller at the lower left to the CA-BUF component at the lower middle of FIG. 47. They are received by the CA-BUF and are retransmitted on the secondary links on the module.

The secondary links are received by the DQ-BUF components and retransmitted to the DRAMs on a tertiary link. This allows the option of transferring CA information on unused DQ links, as described in previous sections.

It is assumed that the controller component, the CA-BUF component, and the DQ-BUF component all utilize PLL or DLL techniques minimize skew between their internal clock trees and the timing signals received and transmitted on the links.

However, the timing signals may accumulate delay as they propagate on the links between the components. When two clock domains interact, they can have relative skew due to the unequal propagation paths their timing signals have traveled. This relative skew can be accommodated by providing a complementary delay to a signal passing from one domain to another.

Each DQ-BUF component has two DQ paths, each connecting to a DQ link group on the primary side and a DQ link group on the secondary side. Each secondary link group (4xDQ and 2xDQS) connects to a x4 device site with one to eight DRAMs.

Other embodiments could use wider DRAMs, with two or more DQ link groups connecting to the same device or device site.

The WR path begins in the controller component on the left side of FIG. 47. The write data and its timing signal are transmitted from the controller clock domain.

They are received and sampled on the DQ-BUF. The domain crossing blocks perform phase and cycle adjustment so the write data can be transferred to the internal clock domain of the DQ-BUF component.

From there, the write data is retransmitted to the DRAM, where is it is received and sampled. The skew between the write data and the CK domain on the DRAM may be small because both signals have travelled on similar paths from the clock domain of the DQ-BUF. As a result, the DRAM may not require the magnitude of domain-crossing adjustment needed by the DQ-BUF.

The RD path begins in the DRAM component on the right side of FIG. 47. The read data and its timing signal are transmitted from the DRAM clock domain.

They are received and sampled on the DQ-BUF. The domain crossing blocks perform phase and cycle adjustment so the read data can be transferred to the internal clock domain of the DQ-BUF component.

From there, the read data is retransmitted to the DRAM, where is it is received and sampled. The skew between the read data and the clock domain on the controller may be large because of the large round trip delay to the DRAM and back. As a result, the domain crossing blocks perform phase and cycle adjustment so the write data can be transferred to the internal clock domain of the controller component.

WR Timing Detail DQ-BUF—SKP[1]=0

FIG. 48 shows a write path in the DQ-BUF component according to one embodiment. This was shown earlier in FIG. 46. The waveforms of six internal nodes are shown in the accompanying timing diagram, along with the primary data input and secondary data output signals.

Each primary data link DQIN is sampled by the primary timing link DQSIN at the rising and falling edges, resulting in two sampled values Y and Z held on the DQY0 and DQZ0 register outputs in the DQS domain.

Note that the DQS-EN signal is formed in the CK domain and gates the DQSIN signal. It will be extended if the data transfer is longer.

This example assumes the DQS and CK signals are aligned so the SKP[1] value sampled from CK+90° by DQS is low. The DLY0.5 control value was set by the SKP[1] value on the previous WR transfer, so it may also be low.

FIG. 50 shows timing examples of FIG. 48 and FIG. 49 being combined together to automatically track drift between the DQS and CK domain over an arbitrarily large range according to one embodiment. FIG. 50 illustrates what happens when the new SKP[1] sampled value doesn't match the previous one of drift between the DQS and CK domains.

The low value on the DLY0.5 control causes the DQY0 and DQZ0 values to be passed through the multiplexers in the phase adjustment block.

The value on the DLY123[1:0] control is assumed to be 00, which causes the DQY0 and DQZ0 values to be passed through the multiplexers in the cycle adjustment block, as well.

The DQY0 and DQZ0 values may be sampled by the DQY2 and DQZ2 registers and may have crossed into the CK domain at this point.

The DQY2 and DQZ2 registers drive the output multiplexer, which in turn drives the output driver for the secondary link group.

A DQS output may be created from Delay-Adj-Logic. The DQS output may be driven using the CK+90° signal, since the timing signal for a WR transfer is center-aligned.

If the value on the DLY123[1:0] control is assumed to be 11, the DQY0 and DQZ0 values may be delayed by a three cycle pipeline. The data and timing signal may appear on the secondary links 3*tCK later than for the previous case. This allows the delay through the DQS-to-CK domain crossing to be adjusted in one cycle increments.

WR Timing Detail DQ-BUF—SKP[1]=1

FIG. 49 shows a write path in the DQ-BUF component according to one embodiment. This example is similar to that shown in FIG. 46, except that it assumes the DQS and CK signals are aligned so the SKP[1] value sampled from CK+90° by DQS is high.

The write path was shown earlier in FIG. 5. The waveforms of six internal nodes are shown in the accompanying timing diagram, along with the primary data input and secondary data output signals.

Each primary data link DQIN is sampled by the primary timing link DQSIN at the rising and falling edges, resulting in two sampled values Y and Z held on the DQY0 and DQZ0 register outputs in the DQS domain.

Note that the DQS-EN signal is formed in the CK domain and gates the DQSIN signal. It will be extended if the data transfer is longer.

This example assumes the DQS and CK signals are aligned so the SKP[1] value sampled from CK+90° by DQS is high. The DLY0.5 control value was set by the SKP[1] value on the previous WR transfer, so it may also be high.

FIG. 50 illustrates what happens when the new SKP[1] sampled value doesn't match the previous one because of drift between the DQS and CK domains.

The high value on the DLY0.5 control causes the DQY0 and DQZ0 values to be sampled by the DQY1 and DQZ1 registers and passed through the multiplexers in the phase adjustment block.

The value on the DLY123[1:0] control is assumed to be 00, which causes the DQY1 and DQZ1 values to be passed through the multiplexers in the cycle adjustment block, as well.

The DQY1 and DQZ1 values may be sampled by the DQY2 and DQZ2 registers and may have crossed into the CK domain at this point.

The DQY2 and DQZ2 registers drive the output multiplexer, which in turn drives the output driver for the secondary link group.

A DQS output may be created from Delay-Adj-Logic. The DQS output may be driven using the CK+90° signal, since the timing signal for a WR transfer is center-aligned.

If the value on the DLY123[1:0] control is assumed to be 11, the DQY0 and DQZ0 values may be delayed by a three cycle pipeline. The data and timing signal may appear on the secondary links 3*tCK later than for the previous case. This allows the delay through the DQS-to-CK domain crossing to be adjusted in one cycle increments.

Automatic Tracking of Timing Drift

FIG. 50 shows timing examples of FIG. 48 and FIG. 49 being combined together to automatically track drift between the DQS and CK domain over an arbitrarily large range according to one embodiment. FIG. 50 assumes that the DQ-BUF has been initialized so the delay from a column write command on the CA bus and the write data for that command is a constant 3.00*tCK. It should be noted that these values are smaller than would be seen in an actual system so they will fit in the timing diagram more easily.

In the left diagram, the write strobe arrives 1.125*tCK after the write command. The SKP[1:0] values that are sampled are "01".

The new DLY0.5 phase value is set from SKP[1], and the new DLY123[1:0] cycle value is "01" (the same as what was previously set at initialization).

In the right diagram, the DQS timing has drifted relative to the CK domain, so the write strobe arrives 1.375*tCK after the write command. The SKP[1:0] values that are sampled are "11".

The new DLY0.5 phase value is set from SKP[1]. Because the SKP[1] and the old DLY0.5 phase value are different, and because SKP[0] is high, the new DLY123[1:0] may need to increment or decrement (relative to old DLY123[1:0] value) to keep the command to data delay constant at 3.00 tCK (it decrements in this example).

In summary, the DQS timing signal for each transfer may sample the CK and CK+90° (in the case of a write) and retain this information in the SKP[1:0] register.

At an idle interval before the next transfer, the DLY0.5 and DLY123[1:0] values (held in a control register in the CK domain) can be updated to reflect the SKP[1:0] from the previous transfer. These new DLY0.5 and DLY123[1:0] values are used on the next transfer.

This sequence may happen automatically on each transfer, and may allow the domain-crossing logic to accommodate an arbitrarily large range of DQS-to-CK drift during system operation.

After an initialization process gets the control registers set to appropriate values, no further maintenance operations may be required to support this automatic tracking.

Figure 51:
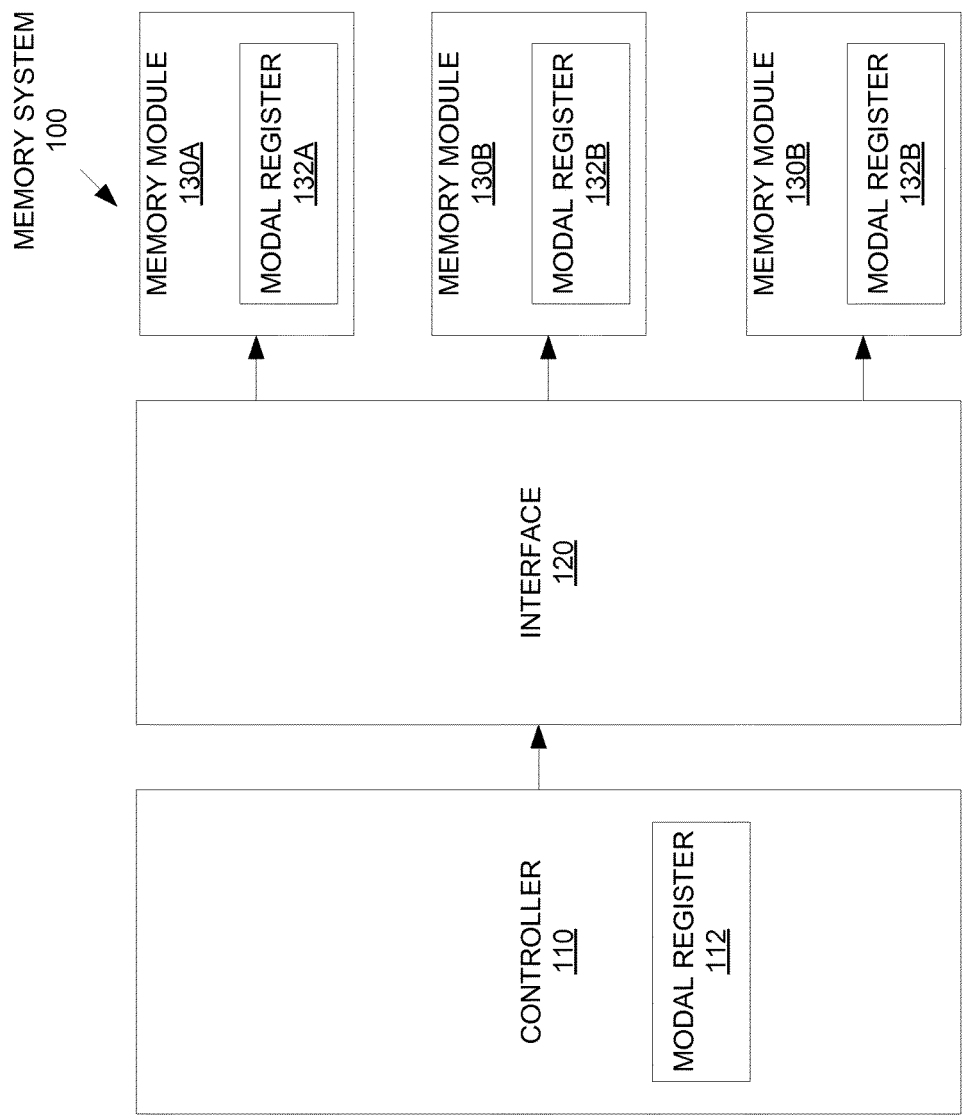
FIG. 51 is a block diagram of a memory system with multiple modes of operation according to one embodiment.

FIG. 51 is a block diagram of a memory system 100 according to one embodiment. The memory system 100 includes a controller 110 coupled by an interface 120 to multiple memory modules 130A-130C. Although three memory modules 130A-130C are illustrated in FIG. 51, other embodiments may include more or fewer memory modules. The memory system 100 may include additional components other than those illustrated in FIG. 51.

The controller 110 includes a modal register 112 that stores a value indicative of a mode in which the memory system 100 is to operate. Similarly, the memory modules 130A-130C include respective modal registers 132A-132C that store a value indicative of a mode in which the memory system 100 is to operate. The modal register settings may be set during system initialization upon startup or reset.

The interface 120 may be part of a motherboard and may couple the controller 110 to the memory modules 130A-130C with point-to-point connections, multi-drop connections, or a combination of the two, depending on the mode desired. Example interfaces are illustrated in FIGS. 4, 7, and 23 and may correspond to a first, second, and third mode of operation of a memory system 100.

As described in additional detail above with respect to those interfaces and corresponding configurations, the controller 110 and memory modules 130A-130C may operate differently in the first, second, and third mode, although the number of pins and form factor of each may remain constant.

In the first mode, corresponding to an interface 120 with multi-drop DQ lines (e.g., as shown in FIG. 4), the controller 110 transmits an asserted decoded chip-select (CS) signal (e.g., on one of multiple primary CS lines of the interface 120), one of the memory modules 130A-130C receives the asserted decoded CS signal (e.g., on the asserted primary CS line of the interface 120, with the remaining decodes CS signals unasserted). The other modules remain inactive for this transaction.

In the second mode, corresponding to an interface 120 with point-to-point DQ lines (e.g., as shown in FIGS. 7a and 7b), the controller 110 transmits a fully encoded chip-select (CS) signal (e.g., on one or more primary CS lines of the interface 120, which may be different than those of the first mode), the memory modules 130A-130C each receive the fully encoded CS signal (e.g., on the second mode primary CS lines of the interface 120), and each of the memory modules 130A-130C decode the fully encoded CS signal to address (unless only one slot is populated) a strict subset of DRAM devices that would have been commonly selected in the first mode (e.g., on multiple corresponding secondary CS lines of the memory modules).

Whereas, in the first mode, the decoded chip-select may include a decoded point-to-point portion for selecting a device site and an encoded multi-drop portion for selecting a die or a package at the device site, in the second mode, the fully encoded chip-select may include an encoded portion for selecting a device site and an encoded portion for selecting a die or a package at the device site, with each portion transmitted point-to-point.

In the first mode, the controller 110 transmits an on-die termination (ODT) signal to the memory modules 130A-130C (e.g., on a point-to-point primary ODT line of the interface 120) and the memory modules 130A-130C receive the ODT signal and pass the ODT signal on a corresponding secondary ODT line.

In the second mode, the controller 110 does not explicitly transmit an ODT signal to the memory modules 130A-130C (and the memory modules 130A-130C do not receive an explicit ODT signal). Rather, in the second mode, the memory modules 130A-130C generate an ODT signal to transmit during a write operation on a secondary ODT line based on the received chip-select and CA signals.

Similarly, in the first mode, the controller 110 transmits a clock enable (CKE) signal to the memory modules 130A-130C (e.g., on a primary CKE line of the interface 120) and the memory modules 130A-130C receive the CKE signal and pass the CKE signal on a corresponding secondary CKE line. But, in the second mode, the controller 110 does not transmit a CKE signal to the memory modules 130A-130C. Rather, in the second mode, the memory modules 130A-130C generate a CKE signal to transmit on a secondary CKE line based on the received chip-select and CA signals.

In the first mode (as shown in FIG. 2), the controller 110 transmits a group of multi-drop command-address (CA) signals to the memory modules 130A-130C and the memory modules 130A-130C receive the multi-drop CA signals. In the second mode (as shown in FIG. 11), the controller 110 transmits a smaller group of point-to-point CA signals to each of the memory modules 130A-130C and the memory modules 130A-130C receive the point-to-point CA signals.

In the first mode, the CA signals for each lane are transmitted at a rate of one bit every two clock cycles. In the second mode, the CA signals for each lane are transmitted at a rate of one bit every one clock cycle (for a total of two bits over two clock cycles for a single command).

In the first mode, the CA signals are transmitted as a single command word over two clock cycles. In the second mode, the CA signals are serially transmitted as two independent half-words in two consecutive clock cycles.

Similarly, in the first mode, the chip-select (CS) signal(s)s is transmitted as a single command word that is transmitted for the second clock cycle of a two-clock-cycle command duration. In the second mode, the CS signal(s) are serially transmitted as two half-word portions during two consecutive clock cycles.

Figure 52:
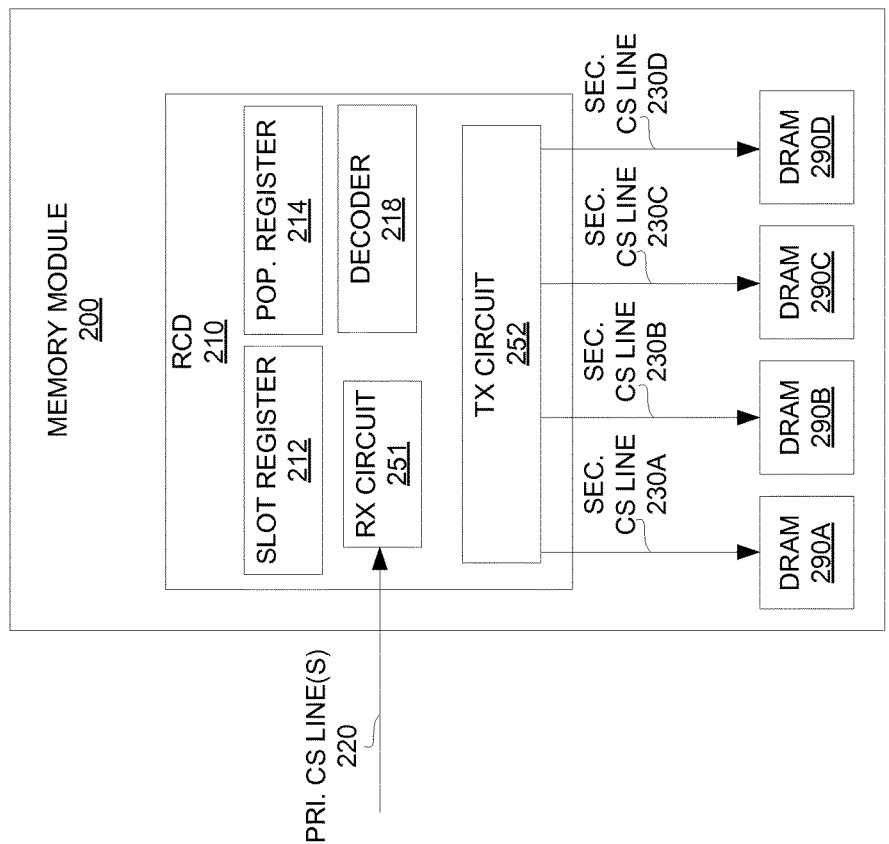
FIG. 52 is a block diagram of a memory module according to one embodiment.

FIG. 52 is a block diagram of a memory module 200 according to one embodiment. The memory module 200 includes a registering clock driver (RCD) 210 which includes a receiving circuit 251 to receive a set of primary chip-select (CS) signals on one or more primary CS lines 200 and a transmitting circuit 252 to transmit a secondary CS signal, for at least some combinations of primary CS signals, on at least one of a multiple secondary CS lines 230A-230D to a corresponding DRAM devices 290A-290D. As described above, the memory module 200 may include a number of other components not illustrated in FIG. 52 for simplification of explanation. The RCD may have at least two modes, where the number and format of CS signals received, as well as the physical lines over which the CS signals are received, may vary between the two modes.

The RCD 210 includes a slot register 212 that, in at least one mode, stores a value indicative of which of multiple memory module slots of a motherboard the memory module 200 is inserted. For example, if the motherboard includes three slots, the slot register 212 may store a value indicating that the memory module 200 is inserted in a first slot (slot z), a second slot (slot y), or a third slot (slot z).

The RCD 210 includes a population register 214 that, in at least one mode, stores a value indicative of a number of the multiple memory modules slots that are populated (e.g., that have a memory module inserted into the slot). For example, if the motherboard includes three slots, the population register may store a value indicating that one slot is populated, two slots are populated, or three slots are populated.

In one embodiment, the slot register 212 and the population register 214 are independent and include two bits each (a total of four bits) to store a value from one to four indicating one of three slots (in the slot register 212) and one to three populated slots (in the population register 214).

However, in another embodiment, the slot register 212 and the population register 214 may be combined into a configuration register that indicates with fewer bits both the slot of the memory module and the number of populated slots.

The RCD 210 further includes a decoder 218 that, for at least some combinations of primary CS signals, determines a subset of the secondary CS signal lines 230A-230D on which to assert a secondary CS signal (e.g., using the transmitting circuit 252) based on the primary CS signal(s) received on the primary CS line(s) 220 (e.g., using the receiving circuit 251), the data in the slot register 212, and the data in the population register 214. The primary CS lines may vary between modes, as well as the decoder function. More than two modes may be supported, including a third mode in which the decoder receives primary CS signals and forwarded primary CS signals from one or more other modules.

FIGS. 7a and 8 above illustrate one embodiment of a decoder including decoding logic. FIG. 13b illustrates another configuration in which the decoder 218 may not use information from the slot register 212. Indeed, in some embodiments, a slot register 212 may not be present. Thus, in some embodiments, the decoder 218 determines a subset of the secondary CS signal lines 230A-230D on which to assert a secondary CS signal (e.g., using the transmitting circuit 252) based on the primary CS signal(s) received on the primary CS line(s) 220 (e.g., using the receiving circuit 251) and the data in the population register 214.

The RCD 210 transmits secondary CS signals on various subsets of the secondary CS signal lines 230A-230D to activate corresponding subsets of the DRAM devices 290A-290D. The activated subset of DRAM devices 290A-290D (and other DRAM devices of other memory modules) provides data to the controller via multiple data lines (not shown) of the memory module 200. In some embodiments, at least a portion of the CS logic shown in FIG. 52 may be distributed among data buffers on a module.

Figure 55:
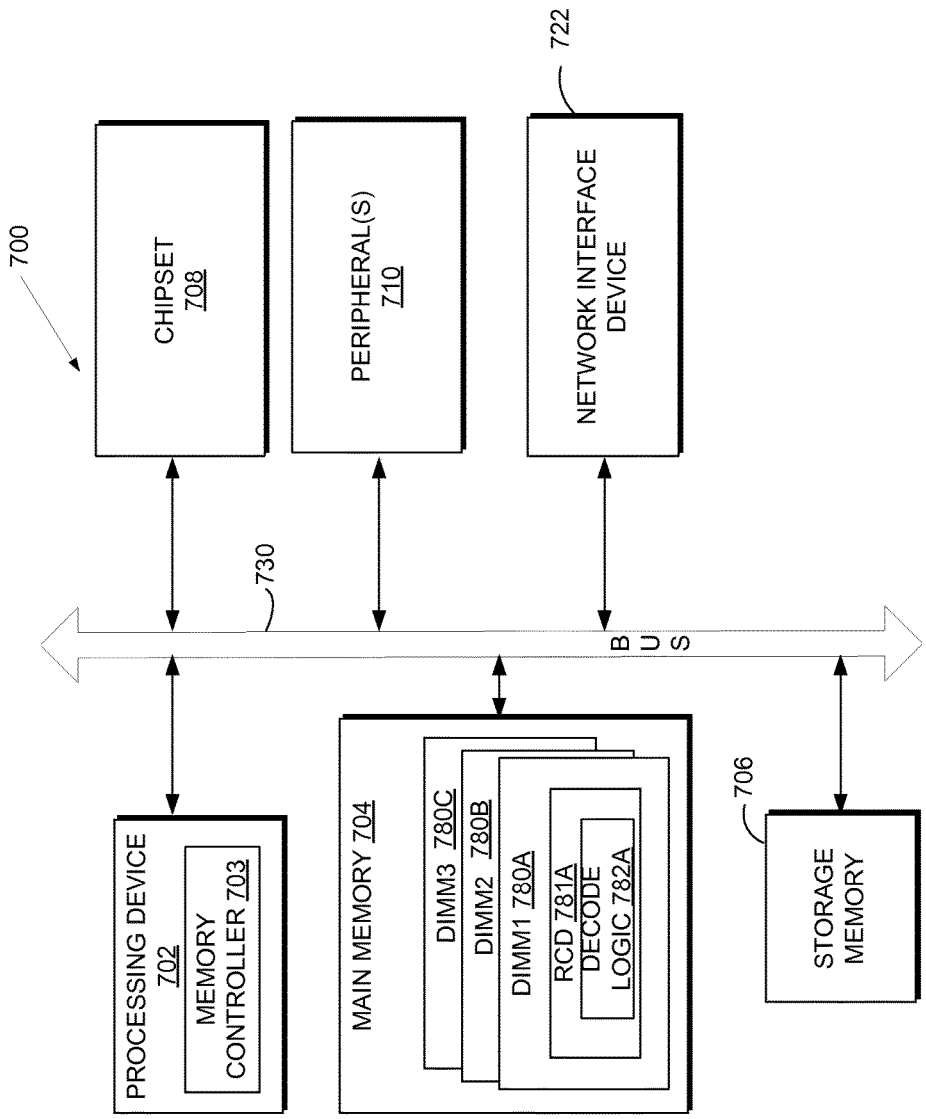
FIG. 55 is a block diagram of a computer system according to one embodiment.
Figure 56:
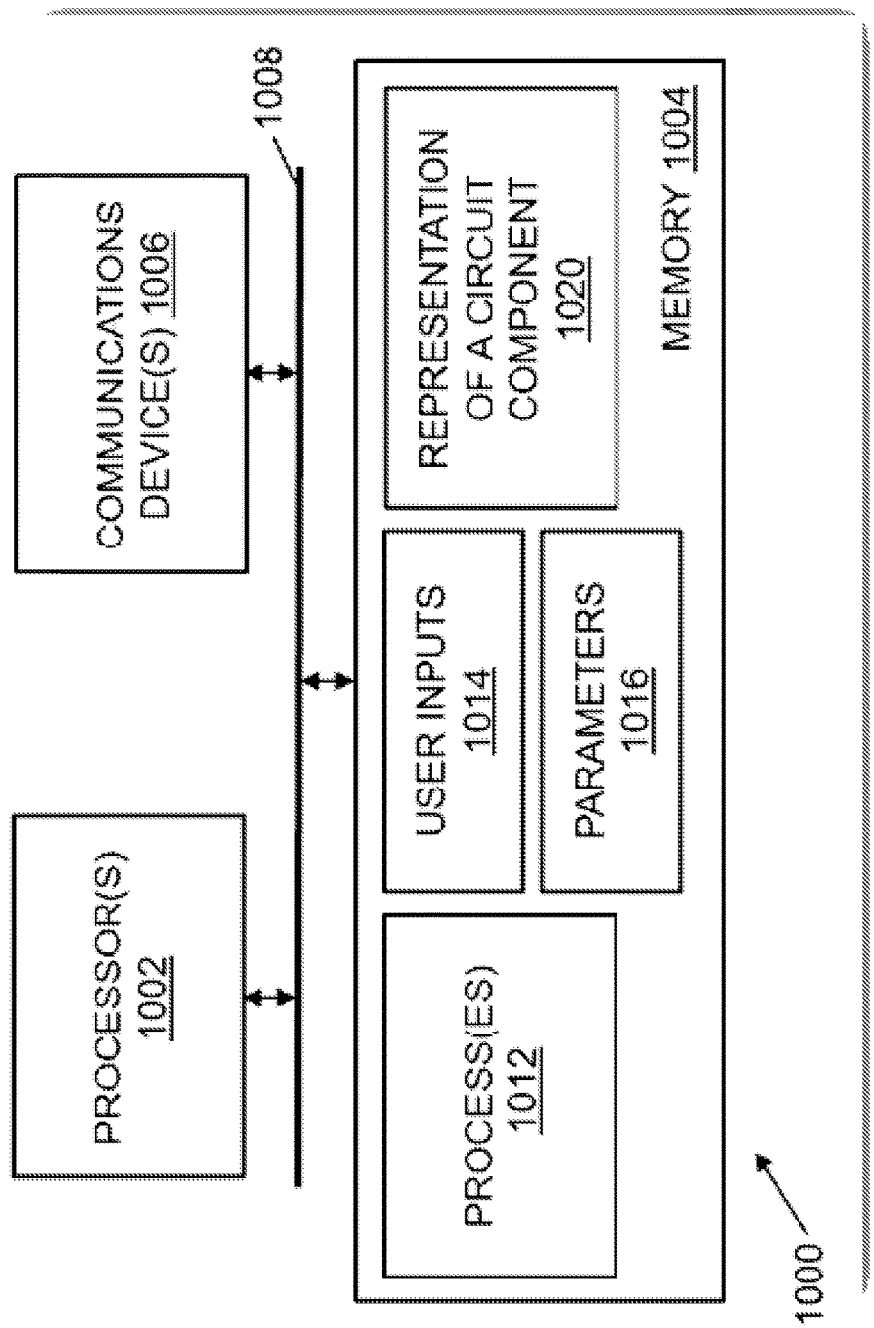
FIG. 56 is a block diagram illustrating one embodiment of a processing system for processing or generating a representation of a circuit component.

FIG. 55 is a flowchart of a method 300 of decoding a chip-select signal. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed on a memory module (e.g., the memory module 200 of FIG. 52). In one embodiment, the method 300 may be performed by an RCD on the module (e.g., the RCD 210 of the memory module 200 of FIG. 52). In another embodiment, the method 300 may be performed (at least in part) by a DB (data buffer) or other component on the memory module.

In block 310, a memory module inserted in one of multiple memory module slots receives a set of primary chip-select (CS) signals on one or more primary CS signal lines. In one embodiment, the primary CS signals are fully encoded. Thus, in one embodiment, no portion of the primary CS signals is decoded (one-hot). In one embodiment, the primary CS signal includes two half-word portions that are serially transmitted over two consecutive clock cycles. For example, the primary CS signals may include (1) a first encoded half-word transmitted in a first cycle of the two cycles indicating a memory device selection group of the memory module and (2) a second encoded half-word transmitted in a second cycle of the two cycles indicating a memory stack of the indicated memory device selection group. In yet another embodiment, full encoded CS information is transmitted in a first half-word portion of a two half-word portion CA command.

In block 320, the memory module determines a subset of multiple secondary CS signal lines based on (1) data indicative of the one of the multiple memory module slots into which the memory module is inserted, (2) data indicative of the number of memory modules inserted into the multiple memory module slots, and (3) the primary CS signal. Thus, in block 320, the memory module decodes the primary CS signal into multiple secondary CS signals. In some embodiments, it is possible to define activation such that the identical device position responds to a command on each module, in which case the memory module need not know which slot it is inserted in. FIG. 13b illustrates an access pattern configuration in which this is the case.

Example decodings (or determinations) are illustrated in FIG. 14.

In one embodiment, when the number of memory modules is one, the determined subset of the multiple secondary CS signal lines includes (based on the primary CS signal) either all of the multiple secondary CS signal lines on a front of the memory module or all of the multiple secondary CS signal lines on a back of the memory module.

In another embodiment, when the number of memory modules is two, the determined subset of the multiple secondary CS signal lines includes (based on the primary CS signal) a first half of the multiple secondary CS signal lines on the front of the memory module, a second half of the multiple secondary CS signal lines on the front of the memory module, a first half of the multiple secondary CS signal lines on the back of the memory module, or a second half of the multiple secondary CS signal lines on the back of the memory module.

The first half and second half of the multiple secondary CS signal lines may be interleaved (as in FIG. 14) or may be another configuration.

In another embodiment, when the number of memory modules is three, the determined subset of the multiple secondary CS signal lines includes a third of the multiple secondary CS signal lines on the front or the back of the memory module, for a total of six available subsets.

In block 330, the memory module transmits a secondary CS signal on the subset of the multiple secondary CS lines. This transmission activates a corresponding subset of multiple DRAM devices of the memory module such that the corresponding subset of the multiple DRAM devices of the memory module (and, potentially, other DRAM devices of other memory modules) provides data via multiple data lines to a controller from which the primary CS signal was received.

As shown in FIGS. 7a and 7b, in some cases, at least a portion of the data traverses a private bus of the memory module between two data buffers from one of the subset of the multiple DRAM devices to a corresponding one of the multiple data lines. In some cases, at least a portion of the data is transmitted from one of the subset of the multiple DRAM devices through a single data buffer to a corresponding one of the multiple data lines without traversing the private bus. Whether or not the private bus is used, the data lines establish point-to-point connections between the controller and the memory module.

As described above (e.g., with respect to FIG. 20), the memory module may generate an on-die termination (ODT) signal based at least in part on the primary CS signals and transmit the ODT signal as a secondary bus signal during a write operation.

As described above (e.g., with respect to FIGS. 14), when the primary CS signals indicates no selection and the determined subset of the multiple secondary CS lines includes zero of the secondary CS signal lines, the primary CS signals may be used by the memory module for temporal framing.

Figure 53:
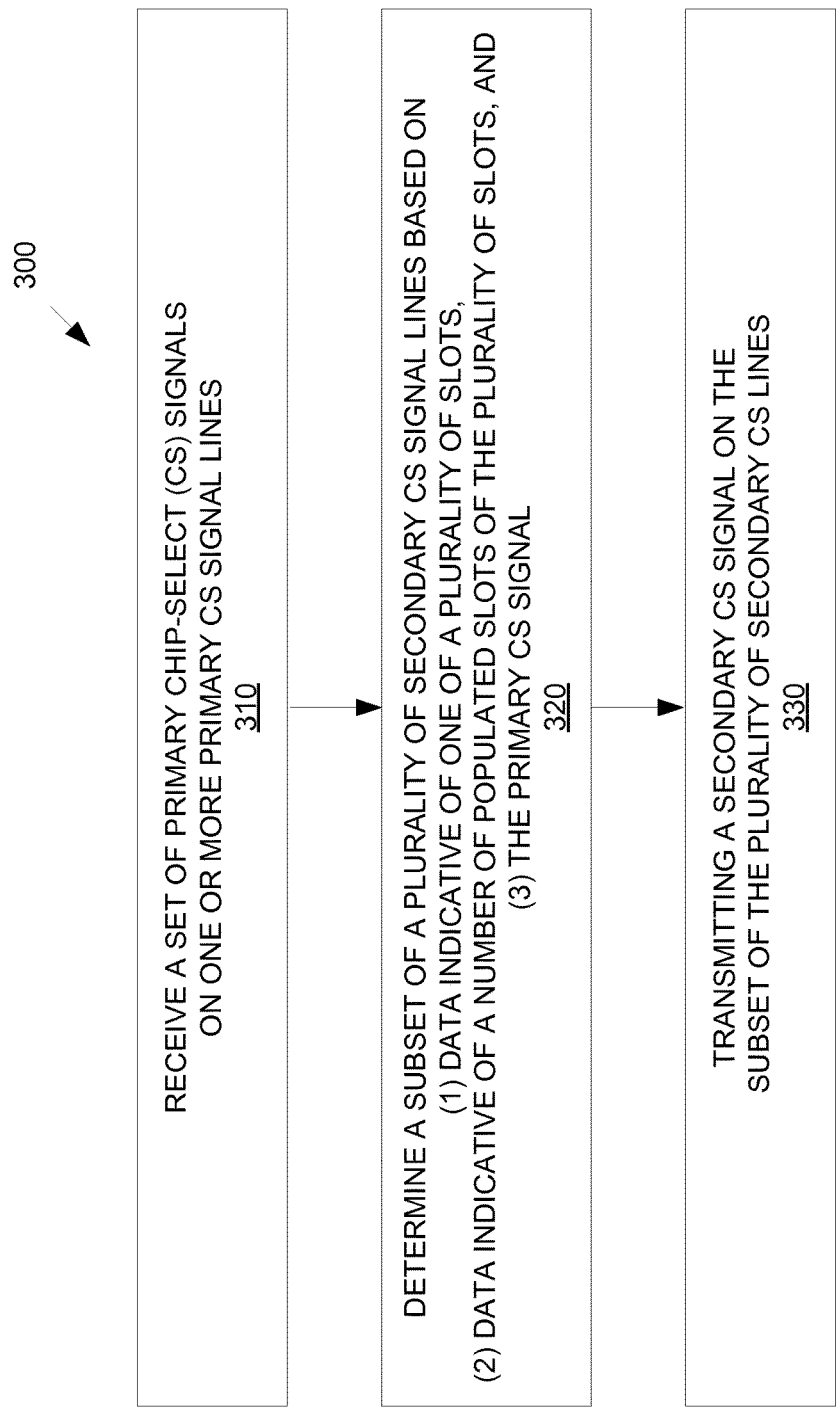
FIG. 53 is a flowchart of a method of decoding a chip-select signal according to one embodiment.

FIG. 53 is a flowchart of a method of generating an on-die termination (ODT) signal. The method 400 may be performed by processing logic that may include hardware (e.g., circuitry, dedicated logic, programmable logic, microcode, etc.), software (e.g., instructions executed by a processing device), firmware or a combination thereof. For example, the method 400 may be performed on a memory module (e.g., the memory module 200 of FIG. 52). In one embodiment, the method 400 may be performed by an RCD (e.g., the RCD 210 on the memory module 200 of FIG. 52). In another embodiment, the method 400 may be performed (at least in part) by a DB (data buffer) or other component on a memory module.

In block 410, a memory module inserted in one of multiple memory module slots receives primary chip-select (CS) signals on primary CS signal line(s). Block 410 may be performed in a substantially similar manner as block 310 of FIG. 53 described above.

In block 420, the memory module component generates an on-die termination (ODT) signal based at least in part on the primary CS signals. In block 430, the memory module component transmits the ODT signal on a secondary bus during a write operation. The memory module component may generate the ODT signal based (at least in part) on a decoding of the primary CS signal as described above with respect to block 320 of FIG. 53. The memory module component may generate an ODT signal to the DRAMs in the opposite rank from those that are selected by the decoding as described above with respect to FIG. 20.

FIG. 55 is a diagram of one embodiment of a computer system 700, according to one embodiment, including main memory 704 with three memory modules 780A-780C with RCD 781A including decode logic 782A that decodes an encoded chip-select signal.

The computer system 700 may be connected (e.g., networked) to other machines in a LAN, an intranet, an extranet, or the Internet. The computer system 700 can be a host in a cloud, a cloud provider system, a cloud controller, a server, a client, or any other machine. The computer system 700 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM), a storage memory 706 (e.g., flash memory, static random access memory (SRAM), etc.), and a secondary memory 1418 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. Processing device 702 includes a memory controller 703. The memory controller 703 is a digital circuit that manages the flow of data going to and from the main memory 703. The memory controller 703 can be a separate integrated circuit, but can also be implemented on the die of a microprocessor.

In one embodiment, the processing device 702 may reside on a first integrated circuit and the main memory 704 may reside on a second integrated circuit. For example, the integrated circuit may include a host computer (e.g., CPU having one more processing cores, L1 caches, L2 caches, or the like), a host controller or other types of processing devices 702. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device via a DB and a RCD. For example, the memory device may be a single chip or a multi-chip module including any combination of single chip devices on a common integrated circuit substrate. The components of FIG. 55 can reside on "a common carrier substrate," such as, for example, an integrated circuit ("IC") die substrate, a multi-chip module substrate or the like. Alternatively, the memory device may reside on one or more printed circuit boards, such as, for example, a mother board, a daughter board or other type of circuit card. In other implementations, the main memory 704 and processing device 702 can reside on the same or different carrier substrates.

The computer system 700 may include a chipset 708, which refers to a group of integrated circuits, or chips, that are designed to work with the processing device 702 and controls communications between the processing device 702 and external devices. For example, the chipset 708 may be a set of chips on a motherboard that links the processing device 702 to very high-speed devices, such as main memory 704 and graphic controllers, as well as linking the processing device to lower-speed peripheral buses of peripherals 710, such as USB, PCI or ISA buses.

The computer system 700 may further include a network interface device 722. The computer system 700 also may include a video display unit (e.g., a liquid crystal display (LCD)) connected to the computer system through a graphics port and graphics chipset, an alphanumeric input device (e.g., a keyboard), a cursor control device (e.g., a mouse), and a signal generation device (e.g., a speaker).

In the foregoing description and in the accompanying drawings, specific terminology and drawing symbols have been set forth to provide a thorough understanding of the present invention. In some instances, the terminology and symbols may imply specific details that are not required to practice the invention.

For example, any of the specific numbers of bits, signal path widths, signaling or operating frequencies, component circuits or devices and the like may be different from those described above in alternative embodiments.

Also, the interconnection between circuit elements or circuit blocks shown or described as multi-conductor signal links may alternatively be single-conductor signal links, and single conductor signal links may alternatively be multi-conductor signal links.

Signals and signaling paths shown or described as being single-ended may also be differential, and vice-versa. Similarly, signals described or depicted as having active-high or active-low logic levels may have opposite logic levels in alternative embodiments.

Component circuitry within integrated circuit devices may be implemented using metal oxide semiconductor (MOS) technology, bipolar technology or any other technology in which logical and analog circuits may be implemented.

With respect to terminology, a signal is said to be "asserted" when the signal is driven to a low or high logic state (or charged to a high logic state or discharged to a low logic state) to indicate a particular condition.

Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition).

A signal driving circuit is said to "output" a signal to a signal receiving circuit when the signal driving circuit asserts (or de-asserts, if explicitly stated or indicated by context) the signal on a signal line coupled between the signal driving and signal receiving circuits.

A signal line is said to be "activated" when a signal is asserted on the signal line, and "deactivated" when the signal is de-asserted.

The term "coupled" is used herein to express a direct connection as well as a connection through one or more intervening circuits or structures.

Additionally, the prefix symbol "/" attached to signal names indicates that the signal is an active low signal (i.e., the asserted state is a logic low state).

A line over a signal name (e.g., '<signalname>') is also used to indicate an active low signal. The term "coupled" is used herein to express a direct connection as well as a connection through one or more intervening circuits or structures.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

Figure 54:
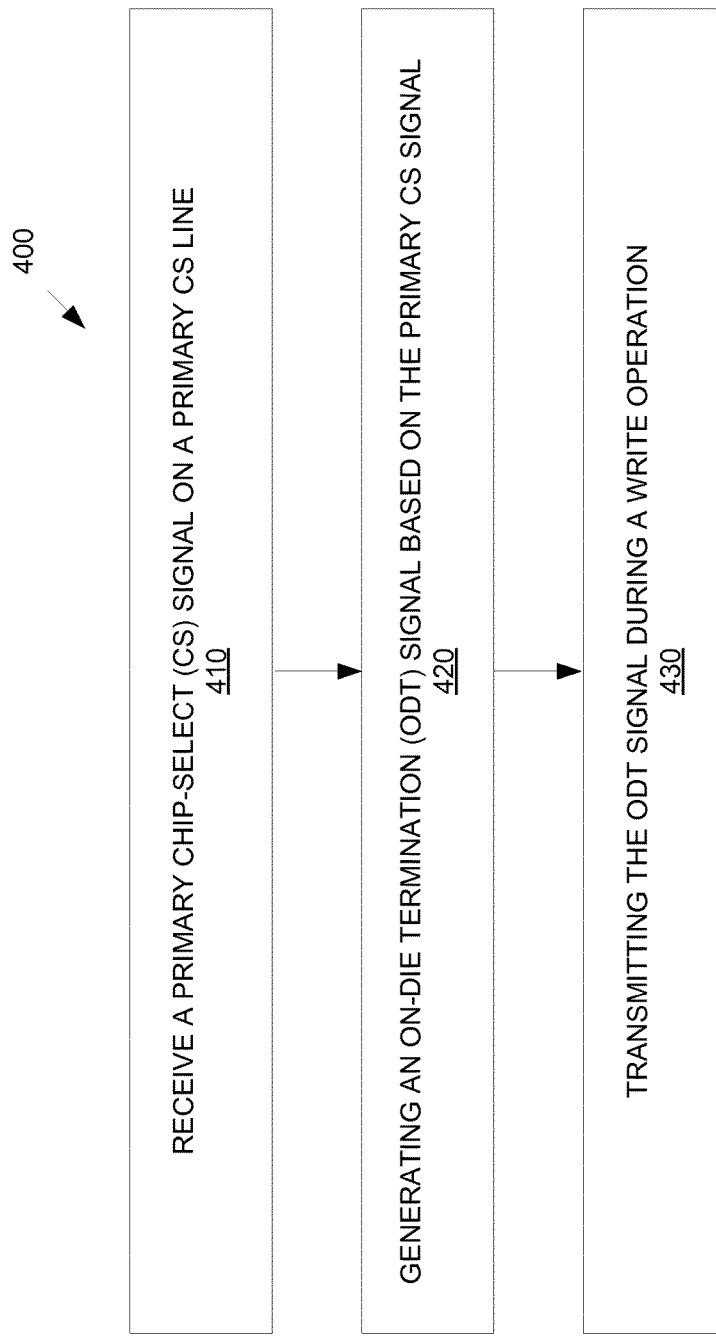
FIG. 54 is a flowchart of a method of generating an on-die termination signal according to one embodiment.

FIG. 54 is a block diagram illustrating one embodiment of a processing system 1000 for processing or generating a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to generate and/or process representation 1020 responsive to user inputs 1014 and parameters 1016. Processes 1012 may be any suitable type, number, and/or configuration of electronic design automation (EDA) tools or portions thereof used to design, simulate, analyze, and/or verify electronic circuitry and/or prepare electronic circuitry for manufacturing (e.g., by generating one or more representations 1020 used to create one or more photomasks). Representation 1020 includes data that describes all or selected portions of circuits 100, 200 as shown in FIGS. 24 and 25 in any suitable format. Examples of such formats include a netlist, a hardware description language format, a field-programmable gate array bitstream, a library format, a simulation format, and a physical design (e.g., a layout or computer-aided design (CAD) file) format. In some embodiments, one or more processes 1012, when executed by processors 1002, may access a representation 1020 of a first type, convert the representation 1020 to a second type, and store the second type of representation in memory 1004 or another suitable memory (not shown) via communications devices 1006.

Memory 1004 includes any suitable type, number, and/or configuration of non-transitory computer-readable storage media that store processes 1012, user inputs 1014, parameters 1016, and representation 1020. User inputs 1014 may be received from any suitable source such as a keyboard, a mouse, and/or a touchscreen. Parameters 1016 may include electronic circuit libraries, design policies, process rules, and/or other information used by one or more processes 1012 to generate and/or process representation 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit representation 1020 to another system (not shown). Communications devices 1006 may also receive processes 1012, user inputs 1014, parameters 1016, and/or circuit component 1020 from another system (not shown) and cause processes 1012, user inputs 1014, parameters 1016, and/or circuit component 1020 to be stored in memory 1004.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A buffer device for operation on a memory module, the buffer device comprising:
   a chip select (CS) decoder; and
   a modal register to store a value indicative of one of at least two modes of operation, wherein,
   in a first mode of operation, the buffer device drives a chip select signal group received on a primary-side CS interface onto a corresponding secondary-side CS interface;
   in a second mode of operation, the CS decoder decodes a CS signal group received on the primary-side CS interface to create signals for the secondary-side CS interface;
   in the first mode of operation, the buffer device drives an on-die termination (ODT) signal received on a primary-side ODT line onto a corresponding secondary ODT line; and
   in the second mode, the buffer device, based at least in part on an output of the CS decoder, generates an ODT signal to transmit on the secondary ODT line.

2. The buffer device of claim 1, wherein,
   in the first mode of operation, the buffer device drives a clock enable (CKE) signal received on a primary CKE line onto a corresponding secondary CKE line; and
   in the second mode of operation, the buffer device, based at least in part on an output of the CS decoder, generates a CKE signal to transmit on a secondary CKE line.

3. The buffer device of claim 1, comprising a plurality of physical interface connections, and wherein the primary-side CS interface uses different sets of the physical interface connections in the first and second modes of operation.

4. The buffer device of claim 1, wherein the buffer device comprises a registering clock driver integrated circuit and a plurality of data buffer integrated circuits, each of which comprises at least a partial CS decoder and performs at least a portion of the CS signal group decoding in the second mode of operation.

5. A buffer device for operation on a multi-rank, multi-device-site-per-rank memory module, the buffer device comprising:
   a chip select (CS) decoder; and
   a secondary-side CS interface having multiple CS signal outputs for each memory module rank, the buffer device capable of using the CS signal outputs to independently select different subgroups of device sites that are each less than a half rank of device sites, and wherein,
   in a first mode, the buffer device receives a chip select (CS) signal group, and asserts multiple corresponding ones of the multiple CS signal outputs on the secondary-side CS interface to select multiple subgroups of device sites to provide a corresponding full rank selection; and
   in a second mode, the buffer device receives a fully encoded CS signal group, the CS decoder decodes the encoded CS signal group to determine one or more of the subgroups of device sites to select, and the buffer device asserts at least one of the multiple CS signal outputs on the secondary-side CS interface to provide a corresponding partial rank selection.

6. The buffer device of claim 5, wherein,
   in at least the second mode, the fully encoded CS signal group contains CS information that applies to more than one slot in a multiple-slot memory system.

7. The buffer device of claim 5, wherein the buffer device comprises a registering clock driver integrated circuit and a plurality of data buffer integrated circuits, each of which comprises at least a partial CS decoder and performs at least a portion of the CS signal group decoding in the second mode.

8. The buffer device of claim 7, wherein the registering clock driver integrated circuit receives the fully encoded CS signal group and retransmits at least a portion of the fully encoded CS signal group to each of the data buffer integrated circuits.

9. The buffer device of claim 8, wherein each of the data buffers is paired with multiple ones of the device sites, and generates, for the paired device sites, the CS signal outputs that select those device sites.

10. The buffer device of claim 5, wherein,
    in the first mode, the buffer device receives a point-to-point on-die termination (ODT) signal and drives a corresponding secondary-side ODT signal; and
    in the second mode, the memory module does not receive an explicit ODT signal, and drives a secondary-side ODT signal based at least in part on an output of the CS decoder.

11. The buffer device of claim 5, wherein the memory module is capable of use in a multi-slot memory channel, the buffer device further comprising a first register that is programmable to contain a module total related to a number of memory channel slots that are populated, the CS decoder using the module total in a determination of which of the subgroups of devices to select for different values of the encoded CS signal group.

12. The buffer device of claim 11, the buffer device further comprising a second register that is programmable to contain a slot ID identifying the memory channel slot to which the memory module connects, the CS decoder using the slot ID in the determination of which of the subgroups of devices to select for different values of the encoded CS signal group.

13. The buffer device of claim 11, wherein in the first mode the module total is 1.

14. The buffer device of claim 5, wherein in the first mode the received CS signal group comprises at least one decoded chip select.

15. The buffer device of claim 5, wherein, in a third mode, the buffer device receives a CS signal group and, at least when the CS signal group identifies a rank assertion, the buffer device communicates CS signal group information to a buffer device on another module.

16. An apparatus comprising:
    a memory controller comprising a modal register to store a value indicative of at least two modes of operation, wherein,
    in a first mode, the controller asserts a first decoded chip select (CS) output to select multiple subgroups of device sites on one of a plurality of memory modules to provide a corresponding full rank selection; and
    in a second mode, the controller drives a fully encoded CS signal group output to each of the plurality of memory modules, the fully encoded CS signal group output identifying one or more of the subgroups of device sites to select to provide a corresponding partial rank selection.

17. The apparatus of claim 16, the memory controller comprising multiple output groups that can each function as a CS signal group output in the second mode, the memory controller in the second mode driving the same fully encoded CS signal group output on each of the output groups.

18. The apparatus of claim 17, wherein the multiple output groups also can each function as a command address (CA) signal group output in the second mode, the CS signal group outputs transmitted as part of the CA signal group output, the memory controller in the second mode driving the same CA signal group output on each of the output groups.

19. The apparatus of claim 18, wherein in the first mode the memory controller transmits a single CA signal group, not including the first decoded CS output, on a wider group output that includes outputs from at least two of the multiple output groups.

* * * * *